United States Patent
Nitsuma

(10) Patent No.: US 8,632,126 B2
(45) Date of Patent: Jan. 21, 2014

(54) VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 45 days.

(21) Appl. No.: 13/145,418

(22) PCT Filed: Jan. 21, 2010

(86) PCT No.: PCT/JP2010/050705
§ 371 (c)(1),
(2), (4) Date: Jul. 20, 2011

(87) PCT Pub. No.: WO2010/084910
PCT Pub. Date: Jul. 29, 2010

(65) Prior Publication Data
US 2011/0278886 A1  Nov. 17, 2011

(30) Foreign Application Priority Data

Jan. 21, 2009  (JP) .................................. 2009-011459
Jan. 28, 2009  (JP) .................................. 2009-017396
Feb. 4, 2009   (JP) .................................. 2009-024202
Feb. 4, 2009   (JP) .................................. 2009-024352

(51) Int. Cl.
*B60N 2/64* (2006.01)
*B60N 2/66* (2006.01)

(52) U.S. Cl.
USPC .................................. 297/216.13; 297/284.4

(58) Field of Classification Search
USPC ............................. 297/216.13, 216.12, 284.4
See application file for complete search history.

(56) References Cited

U.S. PATENT DOCUMENTS

| | | | |
|---|---|---|---|
| 4,564,235 A | 1/1986 | Hatsutta et al. | |
| 4,896,918 A | 1/1990 | Hoshihara | |
| 6,199,947 B1 | 3/2001 | Wiklund | |
| 6,250,714 B1 | 6/2001 | Nakano et al. | |
| 6,520,577 B2 | 2/2003 | Kitagawa | |
| 6,523,892 B1 | 2/2003 | Kage et al. | |
| 6,769,737 B2 * | 8/2004 | Choi | 297/216.14 |
| 6,866,339 B2 | 3/2005 | Itoh | |
| 7,284,794 B2 * | 10/2007 | Yamaguchi et al. | 297/216.12 |
| 7,530,633 B2 | 5/2009 | Yokota et al. | |
| 7,641,280 B2 | 1/2010 | Uno et al. | |
| 7,677,657 B2 | 3/2010 | Park et al. | |
| 7,717,512 B2 * | 5/2010 | Wissner et al. | 297/284.4 |
| 7,731,285 B2 | 6/2010 | Koike | |
| 7,758,114 B2 | 7/2010 | Yokota et al. | |

(Continued)

FOREIGN PATENT DOCUMENTS

| | | | |
|---|---|---|---|
| JP | 2000-272395 A | 10/2000 | |
| JP | 2003-341402 A | 12/2003 | |

(Continued)

*Primary Examiner* — David Dunn
*Assistant Examiner* — Timothy J Brindley
(74) *Attorney, Agent, or Firm* — Drinker Biddle & Reath LLP

(57) ABSTRACT

A vehicle seat is provided that includes a seat back frame, a headrest, a pressure receiving member that supports the body of the occupant and moves independently from the headrest, and pivoting members that are disposed in at least one of side portions of the seat back frame, are linked to the pressure receiving member, and can move independently from the headrest under a predetermined impact load. The entirety of the pressure receiving member moves toward the rear of the vehicle under a predetermined impact load that is greater than a normal seating load.

13 Claims, 38 Drawing Sheets

(56) References Cited

U.S. PATENT DOCUMENTS

| | | | |
|---|---|---|---|
| 7,926,872 B2 * | 4/2011 | Chida et al. | 297/216.14 |
| 7,963,599 B2 | 6/2011 | Omori et al. | |
| 7,984,945 B2 | 7/2011 | Sayama | |
| 7,997,650 B2 | 8/2011 | McMillen et al. | |
| 8,061,774 B2 | 11/2011 | Omori et al. | |
| 8,113,578 B2 | 2/2012 | Furuta et al. | |
| 8,162,392 B2 | 4/2012 | Humer et al. | |
| 8,162,394 B2 | 4/2012 | Yasuda et al. | |
| 2002/0030392 A1 | 3/2002 | Kitagawa | |
| 2002/0043832 A1 | 4/2002 | Watanabe | |
| 2002/0053819 A1 | 5/2002 | Itoh | |
| 2003/0085600 A1 | 5/2003 | Mori | |
| 2005/0040686 A1 | 2/2005 | Van-Thournout et al. | |
| 2006/0232114 A1 * | 10/2006 | Sugiyama et al. | 297/284.4 |
| 2008/0088158 A1 | 4/2008 | Yokota et al. | |
| 2009/0020988 A1 * | 1/2009 | Sato et al. | 280/730.2 |
| 2010/0176630 A1 * | 7/2010 | Nitsuma | 297/216.13 |
| 2010/0187876 A1 | 7/2010 | Nitsuma | |
| 2010/0264704 A1 | 10/2010 | Yasuda et al. | |
| 2011/0272978 A1 | 11/2011 | Nitsuma | |
| 2011/0278886 A1 | 11/2011 | Nitsuma | |
| 2012/0299343 A1 | 11/2012 | Yasuda et al. | |

FOREIGN PATENT DOCUMENTS

| | | | | |
|---|---|---|---|---|
| JP | 2005-022473 A | | 1/2005 | |
| JP | 2005-028956 A | | 2/2005 | |
| JP | 2005-510399 A | | 4/2005 | |
| JP | 2006-020733 A | | 1/2006 | |
| JP | 2007-062523 A | | 3/2007 | |
| WO | WO 2007/142162 A1 | | 12/2007 | |
| WO | WO2009/011388 | * | 1/2009 | B60N 2/44 |

* cited by examiner

A-A CROSS SECTIONAL VIEW

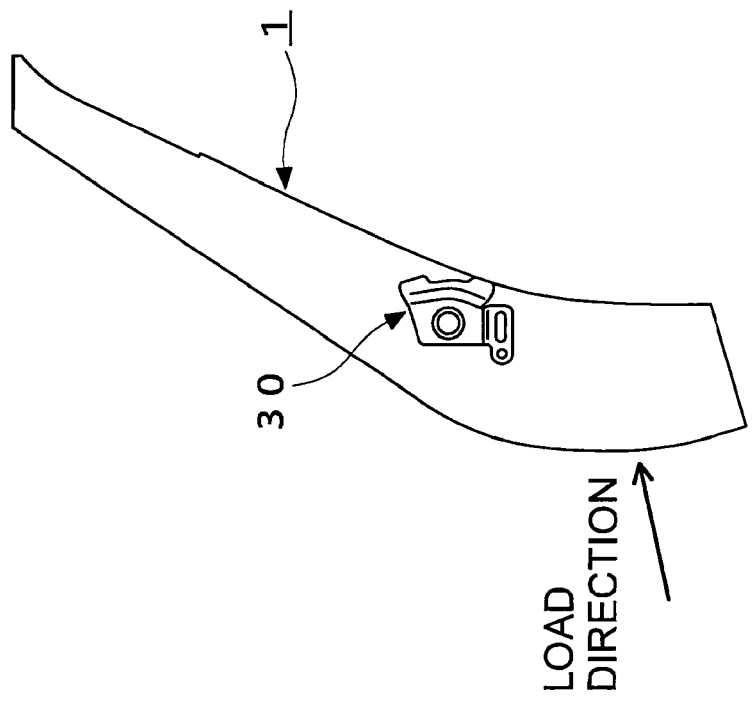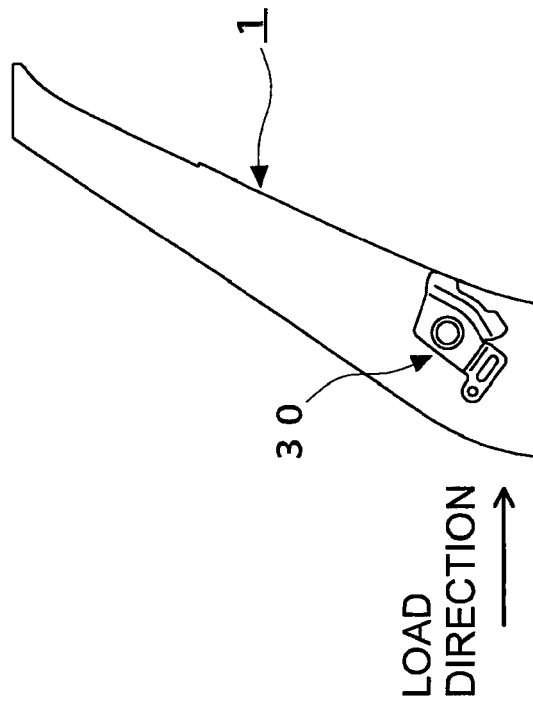
FIG. 21A
FIG. 21B

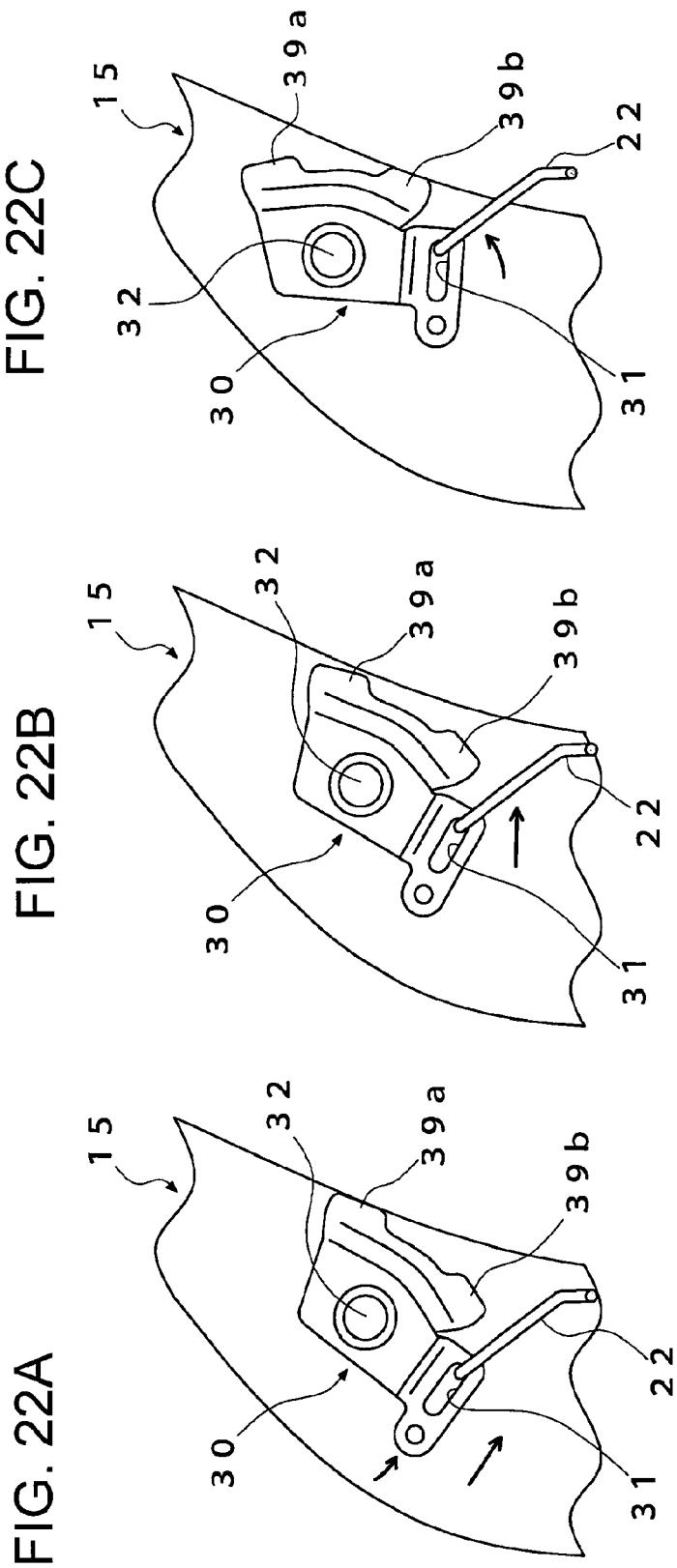

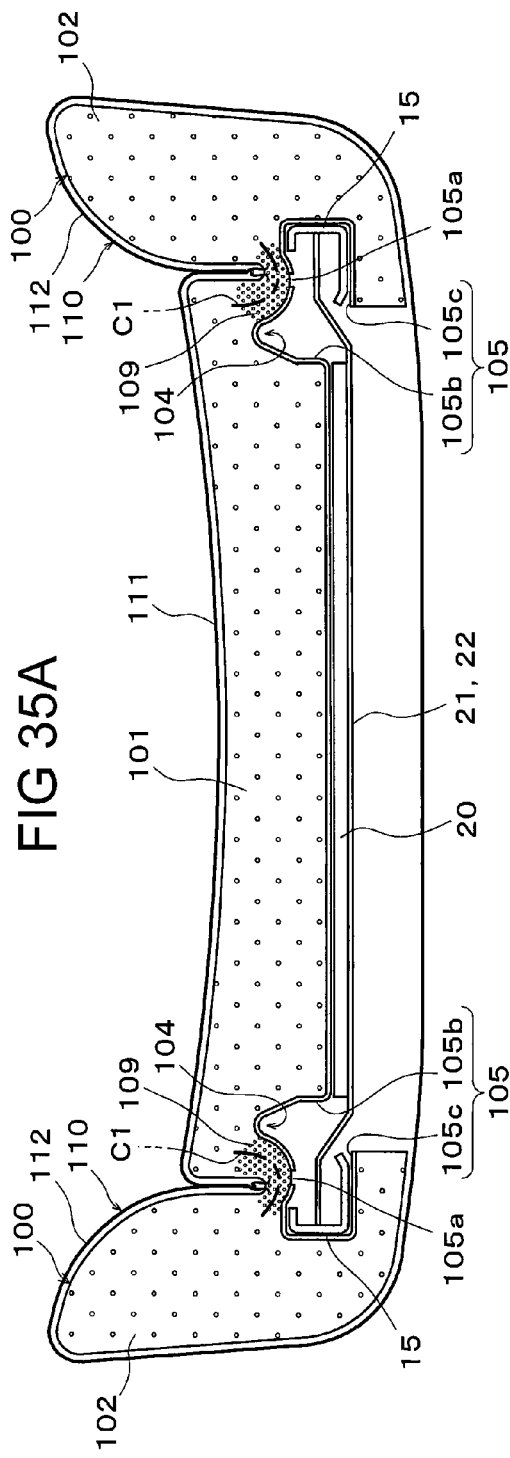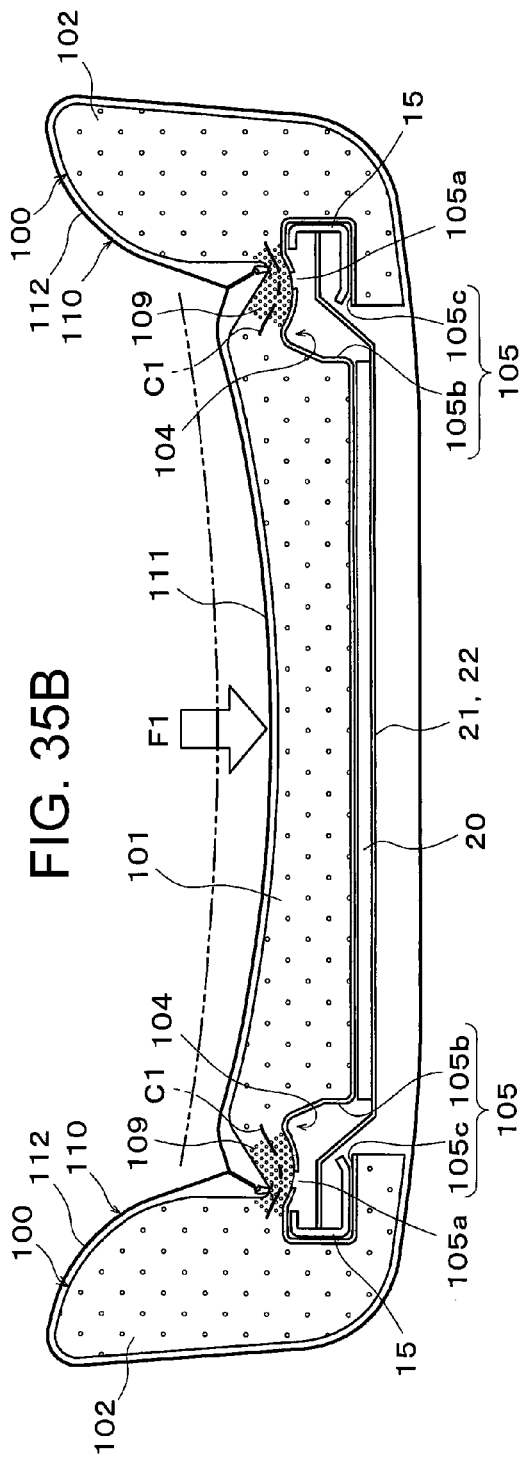

VEHICLE SEAT

CROSS REFERENCE TO RELATED APPLICATIONS

This application is the U.S. national phase of the International Patent Application No. PCT/JP2010/050705, filed Jan. 21, 2010, which claims the benefit of Japanese Patent Application No. 2009-011459, filed Jan. 21, 2009, Japanese Patent Application No. 2009-017396, filed Jan. 28, 2009, Japanese Patent Application No. 2009-024352, filed Feb. 4, 2009, and Japanese Patent Application No. 2009-024202, filed Feb. 4, 2009, the entire content of all being incorporated herein by reference.

BACKGROUND

The present invention relates to vehicle seats, and particularly relates to vehicle seats to reduce the impact at the time of a rear-end collision.

In general, when a vehicle such as an automobile experiences a rear-end collision by being rear-ended, a large impact when traveling in reverse, or the like, there is a risk that the head region of an occupant sitting in a seat in the vehicle will snap backwards suddenly due to inertia force, resulting in an impact on the neck region.

For this reason, vehicle seats in automobiles and the like have conventionally included headrests in the upper area of the seat backs that support the heads of occupants from behind in order to protect the head regions, neck regions, and the like, of occupants from impacts caused by rear-end collisions, thereby reducing impact on the neck regions of the occupants.

However, simply providing a headrest cannot reduce impacts on the body, and furthermore, if the gap between the head region of the occupant and the headrest cannot quickly be reduced at the time of a rear-end collision, there may be the cases where the impact upon the neck region cannot sufficiently be reduced.

In order to solve this problem, a technique in which the headrest is caused to move forward at the time of a rear-end collision due to the backward moving load of the occupant, thus supporting the head region of the occupant and reducing the impact on the neck region, has been proposed (for example, see Japanese Patent Application Publication No. 2003-341402 ("the '402 Publication")).

In addition, a technique in which, in a vehicle seat provided with a seat back that supports a seat back cushion using a seat back frame, the area of the seat back that makes contact with the back of the occupant at the time of a rear-end collision has a lower spring coefficient and a higher damping coefficient than those of the other areas, is known (for example, see Japanese Patent Application Publication No. 2005-028956 ("the '956 Publication")).

Furthermore, a vehicle seat has been proposed in which, in a backrest that includes a headrest, a mobile frame having a spring member that supports a cushion member is attached to a fixed frame on the top of which the headrest is mounted so that the upper portion of the mobile frame rotates backward along the lower portion of the mobile frame; furthermore, a spring that supports a normal seating load but allows the mobile frame to move backward when an impact load greater than or equal to a predetermined load is exerted thereon is provided between the fixed frame and the mobile frame (for example, see Japanese Patent Application Publication No. 2000-272395 ("the '395 Publication")).

Although both of the techniques disclosed in the '402 and '956 Publications soften the impact on an occupant, the technique disclosed in the '402 Publication receives the backward movement of the chest area of the occupant with a pressure receiving member at the time of a rear-end collision, and causes the headrest to move forward along with the backward movement of the pressure receiving member. With such a technique, it is necessary to provide a separate movement mechanism for the headrest in order to allow the tandem movement with the headrest, which complicates the mechanism and increases the cost thereof. Furthermore, because it is necessary to provide a mobile portion in the seat back frame in order to move the headrest, it is also necessary to prevent a resulting rigidity degradation of the structure. Therefore, an increased rigidity beyond what is normally required is necessary.

The technique disclosed in the '956 Publication increases the backward movement of the upper body and decreases the relative amount of movement between the head region and the back region by reducing the spring coefficient of the area that makes contact with the back region of the seat back (the "chest region" in the '956 Publication), and, by increasing the damping coefficient by way of a cushion of low rebound resilience, reduces the shearing force that acts on the neck region by suppressing rebounding of the upper body and reducing the relative speed between the head region and the back region.

However, with a technique that reduces the spring coefficient, a technique that employs a cushion of low rebound resilience, or the like, there has been a problem in that the amount by which the body sinks toward the back of the vehicle (in other words, the amount of movement) cannot be increased.

Furthermore, the technique disclosed in the '395 Publication simply sets the elastic force of the spring relative to the impact load, and thus the operational load at which a central support portion moves backward can reliably be predicted, ensuring that that portion moves backward without fail. This technique thus has an advantage of ensured operations.

However, with the technique disclosed in the '395 Publication, the fixed frame and the mobile frame are fixed at their lower portions using an attachment shaft, and thus there is a quite small movement of the mobile frame allowed relative to the fixed frame in the vicinity of the lower areas thereof. So, there is a problem in that the entire body of a seated occupant cannot be caused to sink toward the back of the vehicle. Furthermore, the spring disclosed in the '395 Publication experiences reaction force increase along with an increase of the amount of movement, which disturbs the movement. Furthermore, the range of mobility between the fixed frame and the mobile frame is extremely limited, and there has thus been a problem in that it is difficult to ensure a movement amount that allows a high degree of sinking. Furthermore, because the mobile frame is used, the overall size of the apparatus increases and achieving a lighter weight is difficult.

Accordingly, in vehicle seats, it is desirable to increase the amount by which the entire body of an occupant sinks into the seat at the time of a rear-end collision, and it is particularly desirable to increase the amount of movement of the lower back region.

Furthermore, it is desirable for vehicle seats to cause the entire body of an occupant to sink therein at the time of a rear-end collision with a high load transfer efficiency. In particular, because the seat back tilts backward at the time of a rear-end collision, it is desirable, while the movement of the seat back is considered, to make use of the load from the occupant in order to ensure that a supporting member (a pressure receiving member) supporting the body of the occupant has a sufficient amount of movement.

It is an object herein to provide a vehicle seat that, using a simple configuration that is independent from a headrest, increases the amount of sinking (movement) of the entire body of a seated occupant, including the lower back region of the occupant, toward the rear of the vehicle at the time of a rear-end collision, and effectively reduces the impact on the occupant at the time of a rear-end collision.

In addition, it is another object herein to provide a vehicle seat that, using a configuration that does not require rigidity beyond what is normally required, with a suppressed number of components, a smaller size and lighter weight, and a low cost, effectively reduces the impact on the neck region and the like of an occupant by causing the entire body of the occupant to sink toward the rear of the vehicle at the time of a rear-end collision.

It is yet another object herein to provide a vehicle seat that, while the backward tilting movement of a seat back at the time of a rear-end collision is took into consideration, increases the amount by which the entire body of an occupant sinks, including the amount of movement of the lower back region of the occupant, by making use of the load from an occupant in order to ensure that a supporting member has a sufficient amount of movement, and effectively reduces the impact on the neck region and the like of the occupant.

It is still another object herein to provide a vehicle seat that effectively provides side portions having rigidity with impact reduction members that move independently from headrests in order to reduce the impact on the neck region and the like of an occupant at the time of a rear-end collision, and prevents interference with other provided members.

The problems described above are solved by a vehicle seat including: a seat back frame including at least side portions located on both sides of the seat back frame and an upper portion disposed in an upper area of the seat back frame; a headrest disposed in an upper area of the seat back frame; a supporting member that supports the body of an occupant, the supporting member moving independently from the headrest; and an impact reduction member that is disposed in at least one of the side portions of the seat back frame, is linked to the supporting member, and is movable independently from the headrest under a predetermined impact load, in which an entirety of the supporting member moves toward the rear of the vehicle under a predetermined impact load that is greater than a normal seating load.

In this manner, the entirety of the supporting member that supports the occupant and moves independently from the headrest moves toward the rear of the vehicle under a predetermined impact load that is greater than a normal seating load, and thus the entire body of the seated occupant sinks toward the rear of the vehicle without requiring a mechanism or the like for transmitting the load to the headrest. In other words, the entirety of the seat back sinks without, as in the case of the techniques according to the prior art in which a mobile frame moves backward along a rotation shaft, the problem of the insufficient amount of sinking or the problem of the lack of sinking in the vicinity of the rotation shaft.

Furthermore, because the entirety of seat back sinks, the body of the occupant moves toward the rear of the vehicle in a state where the seated posture of the body of the occupant is maintained. This makes it possible for the head region of the occupant to approach the headrest and make contact with the headrest in a state where the seated posture of the occupant is maintained, without providing a mechanism linked with the headrest for causing the headrest to move forward. Accordingly, impacts exerted on the head region or the neck region at the time of a rear-end collision can effectively be reduced.

In an embodiment, the supporting member is linked, by a deformable coupling member, to each of the side portions in at least an upper portion and a lower portion of the supporting member, and the lower part is a location that corresponds to the lower back region of the occupant.

In this manner, the side portions on both sides are linked in at least two locations above and below the supporting member by the deformable coupling member, and the lower part is a location that corresponds to the lower back region of the occupant. Accordingly, the lower back region that receives the greatest load when the occupant is seated has a large amount of sinking (movement), and thus the head region of the occupant can make contact with the headrest without fail in a state where the seated posture of the occupant is maintained. Accordingly, impacts on the neck region of the occupant are reduced by supporting the head region of the occupant without movement along with that of the headrest.

In an embodiment, the supporting member moves more in the lower part than the upper part under the predetermined impact load.

In this manner, the lower part moves more than the upper part of the supporting member that is linked to the seat back frame in two locations. Therefore, it facilitates to ensure a larger amount of movement of the lower back region, which receives a large load, and a larger amount of movement is ensured for the entire body of the occupant.

In an embodiment, a linking portion between the impact reduction member and the supporting member move upward under the predetermined impact load.

In this manner, the linking portion between the impact reduction member and the supporting member moves upward and the entirety of the supporting member moves toward the rear of the vehicle. Accordingly, even if the seat back tilts backward due to a rear-end collision, the supporting member is moved backward along with the tilting movement. Thus, a sufficient amount of sinking of the entire body of the occupant is ensured at the time of a rear-end collision with a high load transfer efficiency.

In an embodiment, a linking portion between the impact reduction member and the supporting member may move in the horizontal direction and then move upward under the predetermined impact load.

In this manner, the linking portion between the impact reduction member and the supporting member moves in the horizontal direction and then moves upward, and the entirety of the supporting member moves toward the rear of the vehicle. Accordingly, it is possible to ensure a sufficient amount of movement of the supporting member by making effective use of the load from the occupant, while the tilting movement of the seat back in the backward direction at the time of a rear-end collision is took into consideration.

In an embodiment, a linking portion between the impact reduction member and the supporting member may move downward and then move upward under the predetermined impact load.

In this manner, the linking portion between the impact reduction member and the supporting member moves downward and then moves upward, so that the entirety of the supporting member moves toward the rear of the vehicle. The downward movement can ensure the stability of the seating of the occupant by suppressing unstable movement at the time of the initial movement state. Further, the linking portion moves in the upward direction along with the backward tilting of the seat back, making it possible to increase the load transfer efficiency.

In an embodiment, a linking portion between the impact reduction member and the supporting member move upward under the predetermined impact load after a load received by the supporting member from the occupant has passed a maximum load point.

In this manner, the linking portion between the impact reduction member and the supporting member moves upward after the supporting member exceeds the maximum load point received from the occupant, and the entirety of the supporting member moves toward the rear of the vehicle. Accordingly, efficient movement is achieved even in lower load regions that are below the maximum load point, and effective sinking is ensured even in the case where the load decreases.

In an embodiment, the seat back frame includes a lower portion disposed in a lower area, and the impact reduction member is disposed within a range enclosed by the seat back frame.

In this manner, because the impact reduction member is disposed within a range enclosed by the seat back frame, the portion of the seat back corresponding to the lower- to mid-back region of the occupant is moved significantly backward when an impact has occurred, without interference with the various elements disposed on the outside of the seat back frame. This makes it possible to cause the occupant to sink to a sufficient extent.

In an embodiment, the impact reduction member is disposed in a range that is below the upper end of the supporting member.

This makes it possible to efficiently transmit the load from the supporting member that supports the body of the occupant to the impact reduction member, the portion of the seat back corresponding to the lower- to mid-back region of the occupant is moved significantly backward when an impact has occurred, and thus to cause the occupant to sink to a sufficient extent.

In an embodiment, the seat back frame includes a pipe portion that spans across the side portions and the upper portion, and a reclining mechanism has a rotation shaft, and the impact reduction member is disposed between the lower end of the pipe portion and the rotation shaft of the reclining mechanism.

With this configuration, the impact reduction member can effectively be disposed in the side portions having rigidity, and the impact reduction member is disposed in a position where the amount of sinking is large, so that the load can efficiently be transmitted. Accordingly, the portion of the seat back corresponding to the lower- to mid-back of the occupant is moved significantly backward when an impact has occurred, and it makes possible to cause the occupant to sink to a sufficient extent.

In an embodiment, a disposal range for an airbag apparatus is formed in the side portions of the seat back frame, and the impact reduction member is disposed between the upper end and the lower end of the disposal range for an airbag apparatus.

With this configuration, interference with other disposed elements is prevented, and the impact reduction member is disposed using the small space more effectively.

In an embodiment, a recess portion is formed in the supporting member in an area that opposes the seat back frame, and the impact reduction member is disposed in a location that opposes the recess portion of the supporting member.

With this configuration, because the recess portion is provided, the impact reduction member is checkable when and after it is assembled and when the skin material is opened.

In an embodiment, the impact reduction member is disposed in the upper part in at least one of the side portions, and is rotatable or movable under a predetermined impact load. By providing the impact reduction member in the upper part of the side portions in this manner, a sufficient amount of sinking is ensured for the upper part. Thus, the impact reduction member moves smoothly and can sink to a large extent at the time of a rear-end collision.

In an embodiment, the impact reduction member is disposed in the upper part and the lower part in at least one of the side portions, and is rotatable or movable under a predetermined impact load. By providing the impact reduction member in the upper part and the lower part in this manner, the sinking caused by an impact load can smoothly be carried out.

In an embodiment, by making the upper part smaller than the lower part in the side portions, the impact reduction member is disposed in the small space of the upper part without fail.

With an embodiment of the vehicle seat described above, the entire body of the seated occupant sinks toward the rear of the vehicle without requiring a mechanism or the like for transmitting the load to the headrest. In other words, the entirety of the seat back sinks without, as in the case of the techniques according to the prior art in which a mobile frame moves backward along a rotation shaft, the problem of the insufficient amount of sinking or the problem of the lack of sinking in the vicinity of the rotation shaft. This makes it possible to effectively reduce impacts exerted on the head region or the neck region at the time of a rear-end collision.

With an embodiment of the vehicle seat described above, the lower back region that receives the largest load when the occupant is seated has a large amount of sinking (movement), and thus the head region of the occupant can make contact with the headrest without fail while the seated posture of the occupant is maintained.

With an embodiment of the vehicle seat described above, the lower part moves more than the upper part of the supporting member that is linked to the seat back frame in two locations. It is therefore easier to ensure a larger amount of movement for the lower back region of the occupant, and a larger amount of movement of the entire body of the occupant is ensured as a result.

With an embodiment of the vehicle seat described above, the linking portion between the impact reduction member and the supporting member moves upward and the entirety of the supporting member moves toward the rear of the vehicle. Accordingly, even if the seat back tilts backward due to a rear-end collision, the supporting member moves along with the tilting direction. This makes it possible to ensure a large amount of sinking for the entire body of the occupant, which provides a high load transfer efficiency, at the time of a rear-end collision.

With an embodiment of the vehicle seat described above, the linking portion between the impact reduction member and the supporting member initially moves in the horizontal direction and then moves upward. Accordingly, it is possible to ensure a sufficient amount of movement of the supporting member by making effective use of the load from the occupant, while the tilting movement of the seat back in the backward direction at the time of a rear-end collision is took into consideration.

With an embodiment of the vehicle seat described above, the linking portion between the impact reduction member and the supporting member moves downward, to ensure the stability of the seating of the occupant during the initial movement state. The linking portion moves in the upward direction along with the backward tilting of the seat back, and this makes it possible to increase the load transfer efficiency.

With an embodiment of the vehicle seat described above, the impact reduction member can efficiently move even in lower load regions that are below the maximum load point. Thus, sinking can effectively be ensured even in the case where the load decreases.

With an embodiment of the vehicle seat described above, the portion of the seat back corresponding to the lower- to mid-back region of the occupant moves significantly backward when an impact has occurred, without interference with the various elements disposed on the outside of the seat back frame. This makes it possible to cause the occupant to sink to a sufficient extent.

With an embodiment of the vehicle seat described above, it is possible to efficiently transmit the load from the supporting member that supports the body of the occupant to the impact reduction member, and thus the portion of the seat back corresponding to the lower- to mid-back region of the occupant moves significantly backward when an impact has occurred. This makes it possible to cause the occupant to sink to a sufficient extent.

With an embodiment of the vehicle seat described above, the impact reduction member is disposed in a position where the amount of sinking is large, and thus it is possible to efficiently transmit the load. Accordingly, the portion of the seat back corresponding to the lower- to mid-back of the occupant moves significantly backward when an impact has occurred. This makes it possible to cause the occupant to sink to a sufficient extent.

With an embodiment of the vehicle seat described above, interference with other disposed elements is prevented, and the impact reduction member is disposed using the small space more effectively.

With an embodiment of the vehicle seat described above, the impact reduction member can be checked when and after the seat back is assembled and when the skin material is opened.

With an embodiment of the vehicle seat described above, by providing the impact reduction member in the upper part of the side portions, a sufficient amount of sinking for the upper part is ensured. Thus, the impact reduction member moves smoothly and can sink to a large extent at the time of a rear-end collision.

With an embodiment of the vehicle seat described above, by providing the impact reduction member in the upper part and the lower part, the sinking caused by an impact load can smoothly be carried out.

With an embodiment of the vehicle seat described above, the impact reduction member is disposed in the small space of the upper part without fail.

As described thus far, because the entirety of the seat back sinks, the body of the occupant moves toward the rear of the vehicle while the seated posture of the body of the occupant is maintained. Thus, the head region of the occupant can make contact with the headrest in a state where the seated posture of the occupant is maintained, without providing a mechanism linked with the headrest for causing the headrest to move forward. This makes it possible to effectively reduce impacts on the neck region and the like.

Accordingly, it is possible to provide a vehicle seat that, with a simple configuration that is independent from a headrest, increases the amount of sinking (movement) of the entire body of a seated occupant including the lower back region of the occupant into the rear of the vehicle at the time of a rear-end collision, and effectively reduces the impact on the occupant at the time of a rear-end collision.

In addition, it is possible to provide a vehicle seat that, using a configuration that does not require rigidity beyond what is normally required, with a suppressed number of components, a smaller size and lighter weight, and a low cost, effectively reduces the impact on the neck region and the like of an occupant by causing the entire body of the occupant to sink into the rear of the vehicle at the time of a rear-end collision.

Furthermore, while the backward tilting movement of a seat back at the time of a rear-end collision is took into consideration, by efficiently making use of the load from an occupant, it is possible to increase the amount by which the overall body of an occupant sinks, including the amount of movement of the lower back region of the occupant, in order to ensure that a supporting member has a sufficient amount of movement, and it is possible to effectively reduce the impact on the neck region and the like of the occupant.

Finally, it is possible to effectively provide side portions having rigidity with impact reduction members that move independently from headrests, in order to reduce the impact on the neck region and the like of an occupant at the time of a rear-end collision, and it is possible to prevent interference with other members that are provided.

BRIEF DESCRIPTION OF THE DRAWINGS

Various embodiments of the invention are illustrated in the drawings and described in more detail below.

FIGS. 21A, B are side view illustration diagrams illustrating a relation between the tilting of a seat back in the backward direction, the direction of a load, and an impact reduction member;

FIGS. 22A-C are side view illustration diagrams illustrating an impact reduction member from the start to the end of rotating thereof;

FIGS. 35A, B are horizontal cross-sectional views illustrating a seat back cushion in a normal state and at the time of a rear-end collision;

DETAILED DESCRIPTION

Hereinafter, embodiments of the invention will be described with reference to the drawings. Note that the constituent elements, the positions thereof, and the like indicated hereinafter are not intended to limit the present invention, and it goes without saying that many variations can be made within the scope of the present invention. In this specification, "vehicle" refers to a moving vehicle in which a seat can be installed, such as a surface-driving vehicle that includes wheels such as an automobile, a train, or the like, as well as airplanes, ships, and the like that do not travel on a surface. A "normal seating load" includes the seating impact occurring when an occupant sits down, a load occurring when the vehicle suddenly moves forward during acceleration, and the like. Finally, a "load at the time of a rear-end collision" refers to a large load occurring due to a rear-end collision, and includes a large impact on the vehicle from the rear, a large impact occurring while traveling in reverse, and the like; however, a load within the same range as a load occurring during normal seating is not included.

First Embodiment

FIGS. 1 through 10 illustrate a first embodiment of a vehicle seat according to the present invention.

Figure 1:
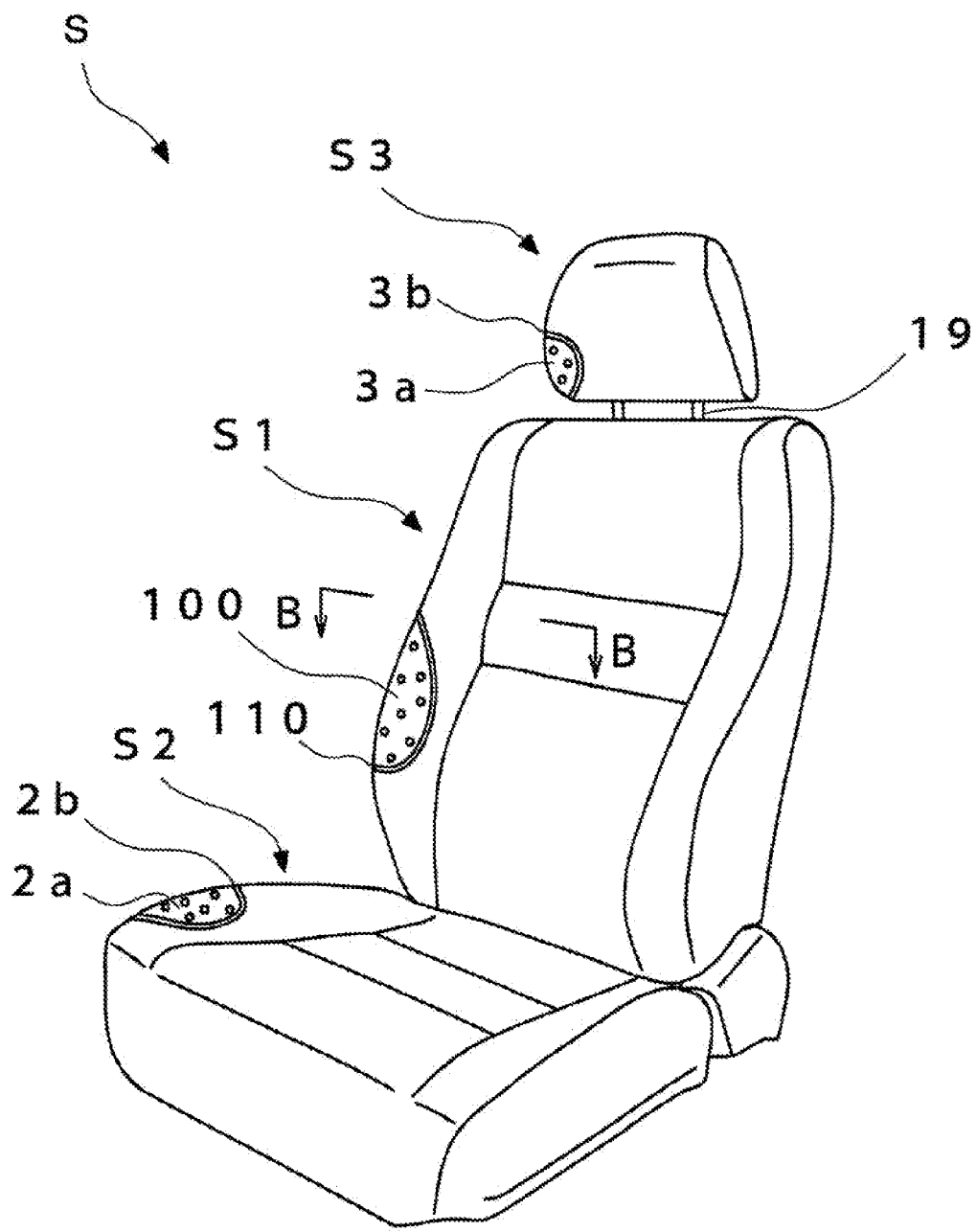
FIG. 1 is an overall perspective view of a seat according to a first embodiment of the present invention.

A vehicle seat S according to the present embodiment is, as shown in FIG. 1, configured of a seat back 51 (a back portion), a seat top portion S2, and a headrest S3; the seat back 51 (back portion) and the seat top portion S2 include cushion pads 100 (a seat back cushion) and 2a on a seat frame F, and are covered by skin materials 110 and 2b. Note that the headrest S3 is formed by disposing a padding material 3a around the core of a head portion (not shown) and covering this with a skin material 3b. Reference numeral 19 indicates headrest pillars that support the headrest S3.

Figure 2:
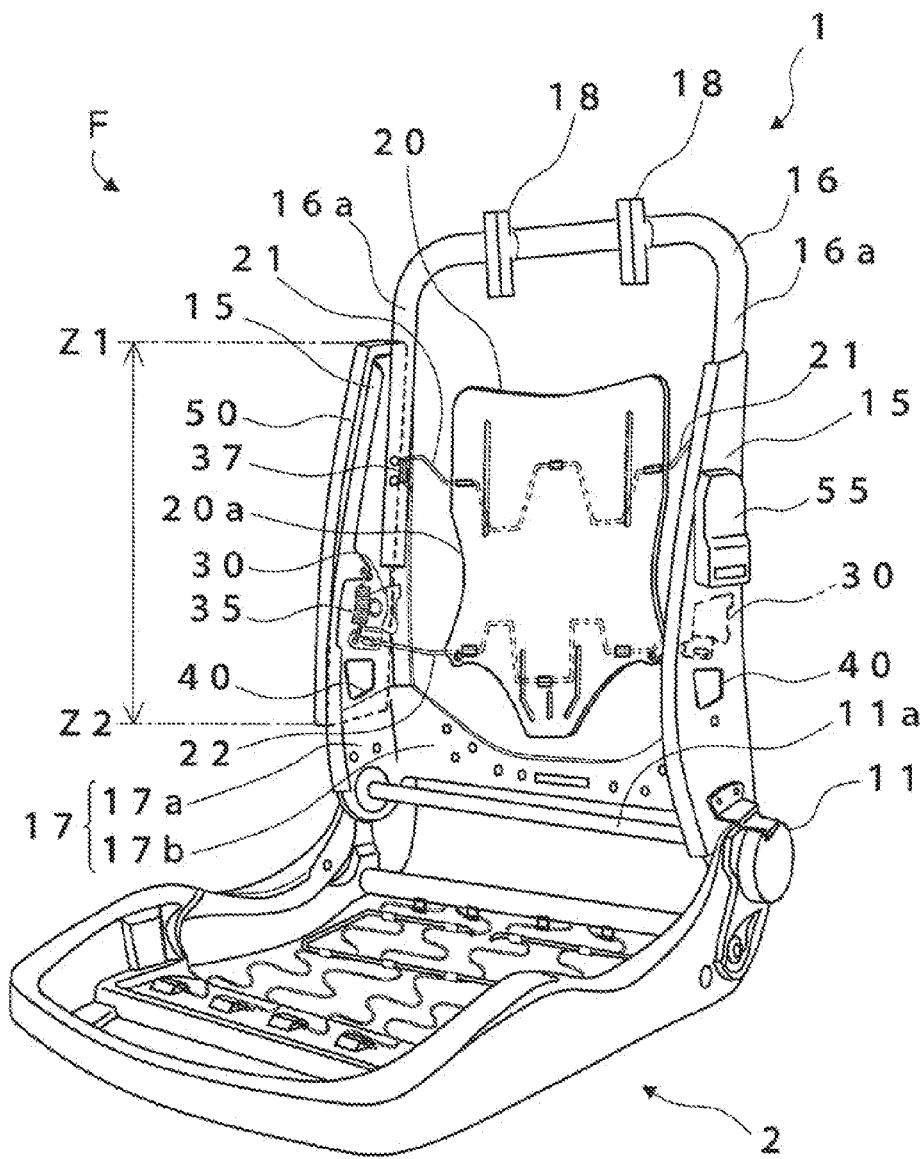
FIG. 2 is an overall perspective view of a seat frame.

The seat frame F of the vehicle seat S is, as shown in FIG. 2, comprises a seat back frame 1 that configures the seat back 51 and a seating frame 2 that configures the seat top portion S2. Note that FIG. 2 illustrates a state in which a known airbag apparatus 50 and an electrical component unit (ECU) 55 are attached to the seat back frame 1 according to the present embodiment.

The seat top portion S2 has the cushion pad 2a installed in the seating frame 2, as mentioned above, and is configured so that the cushion pad 2a is covered by the skin material 2b from above and supports an occupant from below. The seating frame 2 is supported by leg portions, and an inner rail (not shown) is attached to these leg portions; the seating frame 2 is provided, between outer rails disposed on the vehicle floor, as a sliding type whose position is adjustable forward and backward.

The rear end of the seating frame 2 is linked to the seat back frame 1 through a reclining mechanism 11.

The seat back S1 has the seat back cushion (cushion pad) 100 installed in the seat back frame 1 as mentioned above, is covered from above the seat back cushion 100 by the skin material 110, and supports the back of the occupant from the rear. In the present embodiment, the seat back frame 1 is, as shown in FIG. 2, an approximately rectangular frame member, and includes side portions, an upper portion, and a lower portion. Note that the seat back cushion 100 and the skin material 110 will be described below.

The side portions are disposed at a distance from each other in the left and right directions to set the width of the seat back, and have two side frames 15 extending in the vertical direction. A pipe-shaped upper frame 16 that links the side frames 15 at their upper ends extends upward from the side portions, thus configuring the upper portion. To be more specific, the pipe-shaped upper frame 16 is linked to the side frames 15, and side surface portions 16a of the upper frame 16 where the side frames 15 and the pipe-shaped upper frame 16 overlap are configured as pipe portions that span across the side portions and the upper portion.

The lower portion of the seat back frame 1 is formed by linking the lower ends of the side frames 15 using a lower frame 17. The lower frame 17 includes extension portions 17a that are linked to the respective lower sides of the side frames 15 and extend downward, and a middle portion 17b that links the extension portions 17a; the extension portions 17a extend within a range that does not cause problems in terms of the relation with the seating frame 2.

Note that, although the seat back frame 1 according to the present embodiment is formed of separate components, or the side frames 15, the upper frame 16, and the lower frame 17, the seat back frame 1 can also be formed of a single pipe frame, a single plate-shaped frame, or the like.

Figure 6:
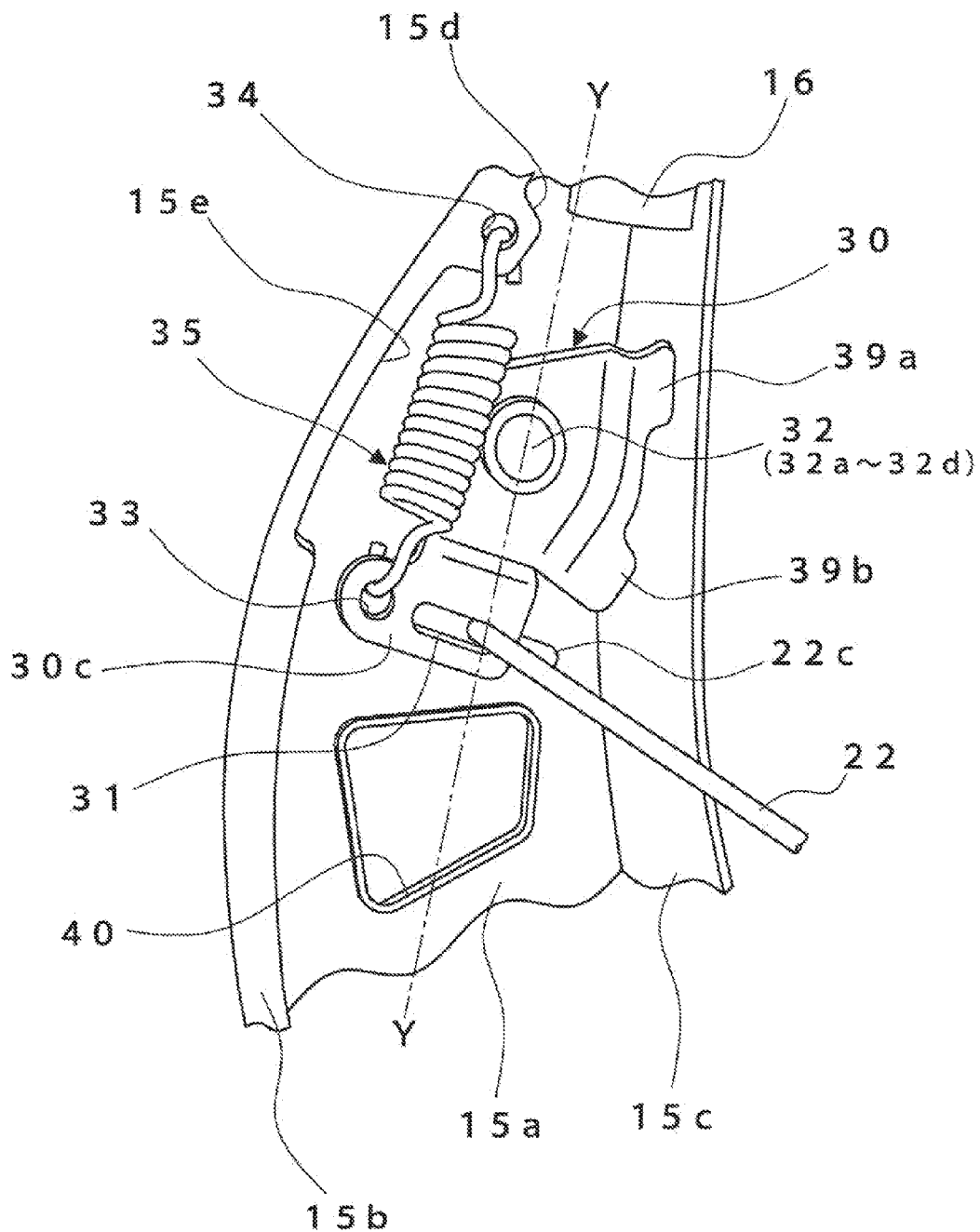
FIG. 6 is an enlarged perspective view diagram illustrating a relation between the impact reduction member and a biasing element.

The side frames 15 according to the present embodiment are extending members that configure the side surfaces of the seat back frame 1, and, as shown in FIG. 6, each of the side frames 15 includes: a flat plate-shaped side plate 15a; a front edge 15b that bends backwards toward the inside in a U shape from the front end (the end located toward the front of the vehicle) of the side plate 15a, and a rear edge 15c that curves toward the inside in an L shape from the rear end of the side plate 15a.

As shown in FIG. 2, both of the side plates 15a according to the present embodiment are located in the lower side of the respective side frames 15, and a wire hole 40 for such as a wire harness or the like is formed in the upper side of the lower frame 17. Note that as shown in FIG. 2, in the side frames 15 according to the present embodiment, a known airbag apparatus 50 is attached to the outer left side of the side frames 15 when facing forward in FIG. 2, and the electrical component unit (ECU) 55, which is configured as a box, is attached to the outer right side. The stated airbag apparatus is attached to the side frames 15 using attachment tools such as bolts, screws, and the like (not shown).

Figure 3:
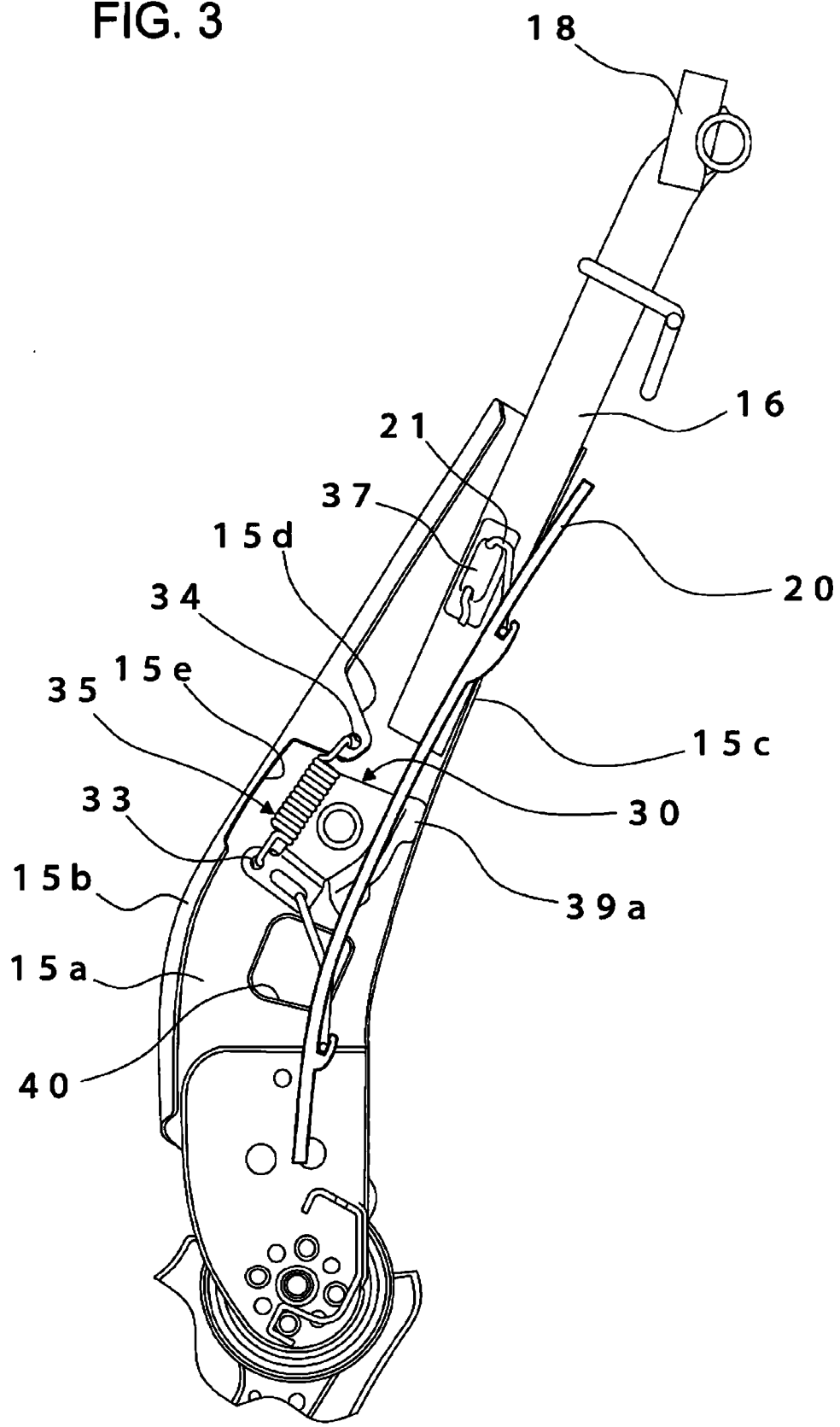
FIG. 3 is an overall cross-sectional view of a seat back frame prior to the movement of an impact reduction member.
Figure 7:
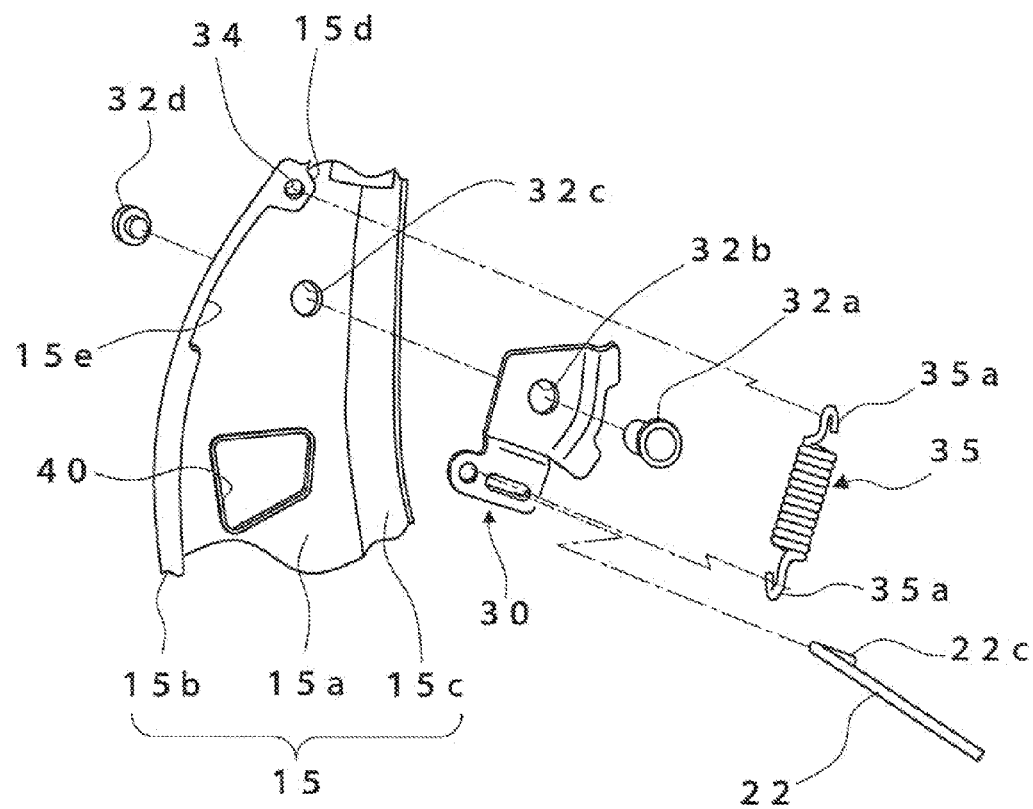
FIG. 7 is an exploded explanation diagram illustrating the impact reduction member and the biasing element.

As shown in FIG. 3, FIG. 6, and FIG. 7, a protruding portion 15d that protrudes toward the rear edge 15c is formed in the front edge 15b according to the present embodiment, and a locking hole 34 serving as a locking portion for locking an extension spring 35 is formed in this protruding portion 15d.

Furthermore, a cutout portion 15e is formed in the front edge 15b below the protruding portion 15d, extending to an area that opposes the position at which the extension spring 35 serving as a biasing element is disposed, and cutting toward the front of the vehicle and reducing the width of the front edge 15b. This cutout portion 15e makes it possible to prevent interference with the extension spring 35.

As shown in FIG. 2, the upper frame 16 is an approximately U-shaped member, and the side surface portions 16a of the upper frame 16 are disposed to partially overlap with the side plates 15a of the side frames 15 and are then welded to the side frames 15 at the overlapping portions.

The headrest S3 is disposed above the upper frame 16 that configures the upper portion. As described above, the headrest S3 configured by providing a padding material 3a around a core (not shown) and covering the outside of the padding material 3a with the skin material 3b. Pillar support portions 18 are provided in the upper frame 16. The headrest pillars 19 (see FIG. 1) that support the headrest S3 are attached to the pillar support portions 18 via guide locks (not shown), and to attach the headrest S3.

The side frames 15, serving as side portions that configure part of the seat back frame 1, are, as described above, configured having a predetermined length in the vertical direction, and are disposed to oppose each other with a predetermined interval therebetween in the horizontal direction. A pressure receiving member 20, which supports the seat back cushion 100 from the rear and serves as a supporting member that supports the body of the occupant and that can move independently from the headrest S3, is disposed within the seat back frame 1 (between the two side frames 15) and in the inner region of the seat back frame 1.

Figure 5:
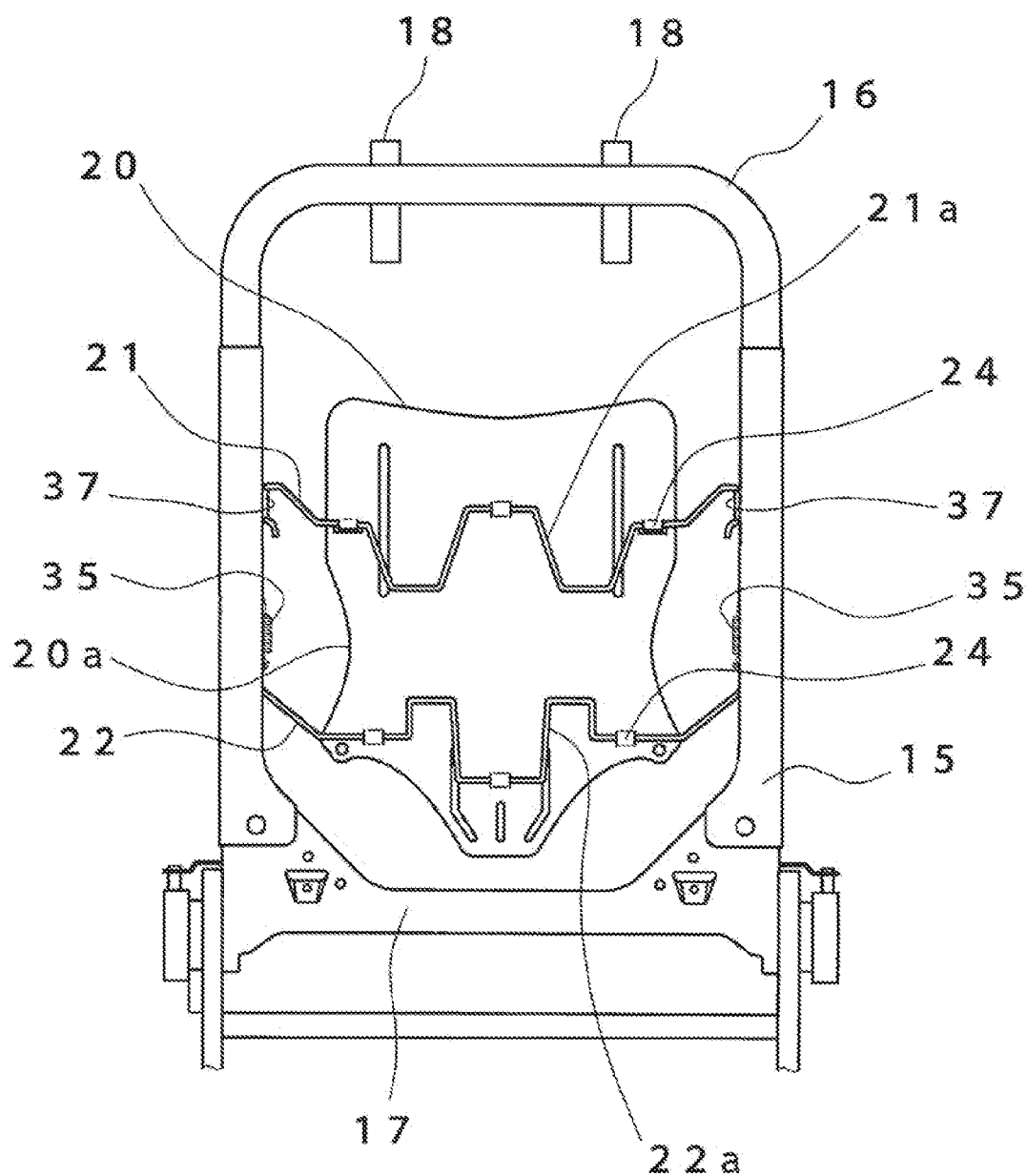
FIG. 5 is an overall rear-view diagram viewing the seat back frame from the rear.

The pressure receiving member 20 according to the present embodiment is configured to not be linked to the headrest S3, and is a member formed of a resin in an approximately rectangular plate shape; recess portions 20a are formed in both sides of the pressure receiving member 20. Furthermore, gentle bumps and depressions are formed in the surface of the pressure receiving member that makes contact with the seat back cushion 100. As shown in FIG. 5, claw portions 24 for locking wires 21 and 22 are formed in the upper side and lower side of the rear side of the pressure receiving member 20.

The pressure receiving member 20 according to the present embodiment is supported by a coupling member. In other words, the two wires 21 and 22 serving as the coupling member are installed between the two side frames 15, and are locked to the pressure receiving member 20 by the claw portions 24 formed in predetermined locations at the upper side and lower side of the rear side of the pressure receiving member 20; thus the pressure receiving member 20 is supported by the rear surface of the seat back cushion 100. The wires 21 and 22 are formed of steel wires having spring force, and as shown in FIG. 5, recess and protrusion portions 21a and 22a, which are bent areas, are formed in the wires 21 and 22 partway between the side frames 15.

In particular, of the two wires 21 and 22 that are locked into the pressure receiving member 20 according to the present embodiment, the wire 22 that is positioned on the lower side is configured to deform significantly due to a load that is greater than or equal to a predetermined load (that is, a load greater than a load that causes an impact reduction member, mentioned below, to move or pivot) as the result of the recess and protrusion portion 22a, and thus the pressure receiving member 20 moves backward with a higher amount of movement.

Figure 4:
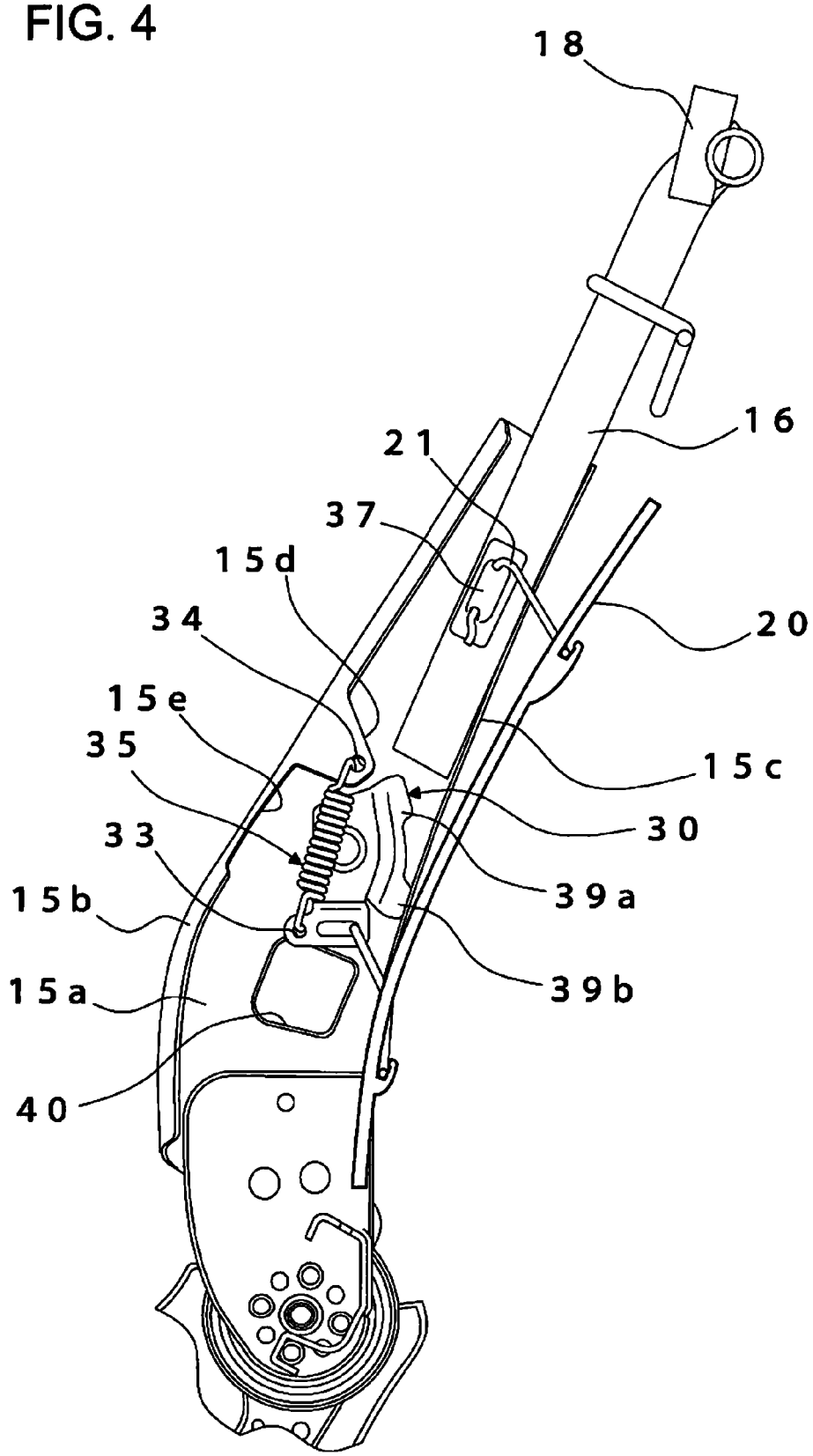
FIG. 4 is an overall cross-sectional view of the seat back frame following the movement of the impact reduction member.

As shown in FIGS. 3 and 4 and FIG. 6, of the two wires 21 and 22 that are locked into the pressure receiving member 20 of the present embodiment, both ends of the wire 21 that is locked into the upper side are engaged with attachment hooks 37 provided on both sides of the side frames 15 (and specifically, on the pipe portion serving as the upper frame 16 attached to the side frames 15). Both ends of the wire 22 locked on the lower side are engaged with locking portions 31 in pivoting members 30 mounted on the left and right side frames 15.

In the present embodiment, the pivoting members 30 are employed as the impact reduction member that coordinates with the pressure receiving member 20, which serves as a supporting member that supports the body of the occupant, and can move independent from the headrest S3. The pivoting members 30 are movable or pivotable, toward the rear of the vehicle due to an impact load transmitted through a coupling member (the wire 22) when an impact load greater than or equal to a predetermined load has been exerted upon the pressure receiving member 20 due to a rear-end collision or the like; due to the movement of the pivoting members 30 toward the rear of the vehicle, the pressure receiving member 20 is movable significantly toward the rear of the vehicle, which makes it possible to reduce the impact upon the occupant.

As shown in FIG. 2, the pivoting members 30 according to the present embodiment are disposed within a range enclosed within the seat back frame 1 and that is lower than the upper end of the pressure receiving member 20; the pivoting members 30 are axially supported in a freely-rotatable state by shaft portions 32 (mentioned below) on the inner sides of the side plates 15a of the side frames 15, which are located on both sides of the stated range. More specifically, the pivoting members 30 are disposed in locations in the side plates 15a of the side frames 15 that oppose the recess portions 20a of the pressure receiving member 20.

To see the pivoting members from a different angle, as shown in FIG. 2, the pivoting members 30 are disposed between the lower ends of the side surface portions 16a implemented as pipe portions and a rotation shaft 11a of the reclining mechanism 11. It is preferable for the pivoting members 30 to be disposed in a location that is within a range of 50 mm to 270 mm above a hip point. Here, the "hip point" is based on the "Road vehicles—Procedure for H-point Determination" (JIS D0024-1985); the apparatus for determining the measured hip point of a vehicle is called a three-dimensional mannequin, and the hip point is the rotational center point between the trunk region and the femoral region of the three-dimensional mannequin. This is located in the center between aiming points on both sides of the three-dimensional mannequin. The height range of 50 mm to 270 mm for the hip point is a location that, taking the body type of the occupant into consideration, sinks the most at the time of a collision, and disposing the pivoting members 30 in this range is suited to the efficient transmission of the load from the occupant.

The locations at which the pivoting members 30 serving as the impact reduction member is disposed in the present embodiment will be described in further detail. As shown in FIG. 2, a disposal range Z1 to Z2 for the airbag apparatus 50 is formed in the side frames 15 according to the present embodiment, and attachment tools such as bolts, screws, and the like (not shown) for attaching the airbag apparatus 50 are provided toward the upper end Z1 and the lower end Z2 of the disposal range for the airbag apparatus 50; the pivoting members 30 are disposed in a range that does not interfere with these attachment tools, and thus the pivoting members 30 do not interfere when the airbag apparatus 50 is attached, which makes it possible to use the small space more effectively.

Furthermore, as shown in FIG. 2, in the present embodiment, the pivoting member 30 is disposed between the wiring hole 40 and the electrical component unit (ECU) 55 on the left side frame 15, and the pivoting members 30 can thus be disposed using a narrow space while ensuring the compactness of a harness and the like.

As described above, the pivoting members 30 are disposed in a region that does not interfere with the attachment tools for the various types of apparatuses such as the airbag apparatus 50, the electrical component unit (ECU) 55, and the like that is attachable to the side frames 15 later, and thus the configuration is such that the pivoting members 30 do not interfere with the attachment of the various types of apparatuses.

Furthermore, the pivoting members 30 lock the lower wire 22 serving as a coupling member, and are linked to the extension spring 35, which serves as a biasing element that biases the wire 22. In other words, the configuration is such that the pivoting members 30 are linked to the biasing element, and the pressure receiving member 20 is biased toward the front of the seat back frame 1 via the coupling member. Employing such a configuration makes it possible to effectively transmit a load from the pressure receiving member 20 to the pivoting members 30.

Figure 8:
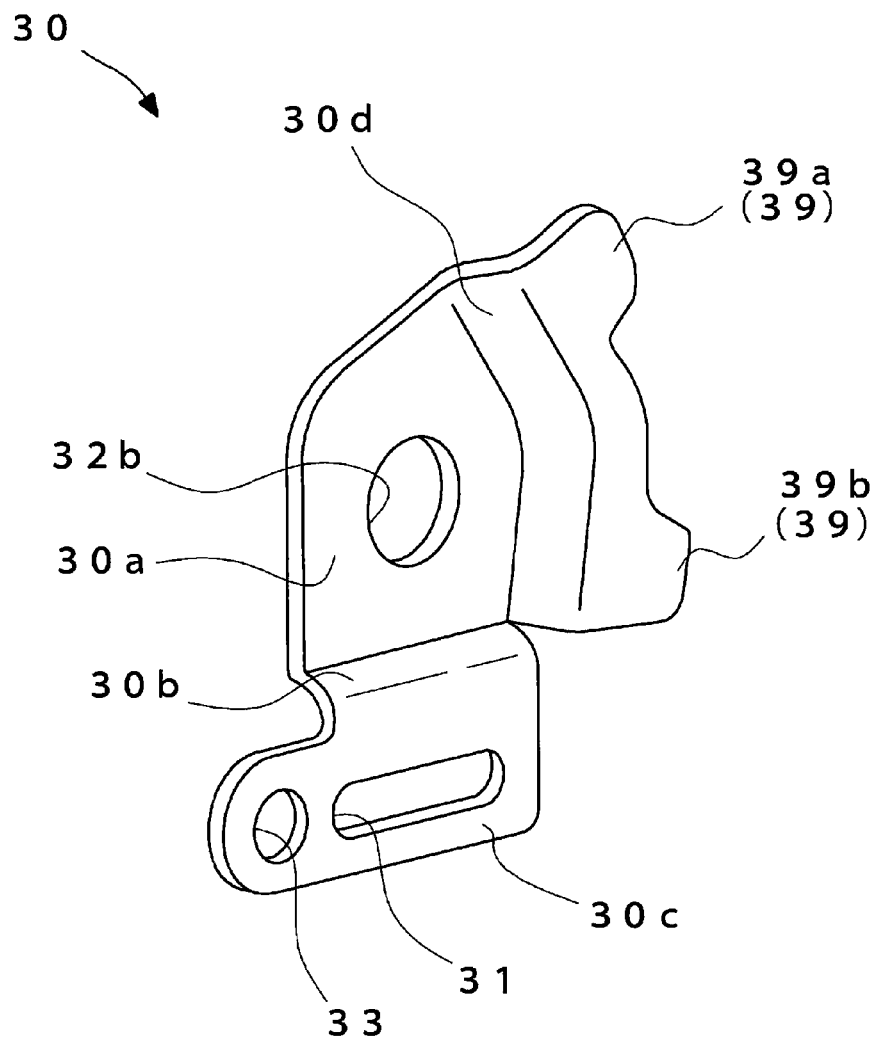
FIG. 8 is a perspective view diagram illustrating the impact reduction member.

As shown in FIGS. 6 through 8, the pivoting members 30 according to the present embodiment include the shaft portions 32, which are rotatable, the locking portions 31 of the coupling members formed in locations that are a predetermined distance from the shaft portions 32, locking portions (locking holes 33) of the biasing element, and rotation blocking portions 39 (stopper portions 39a and 39b) that block rotation.

As shown in FIG. 7, the shaft portions 32 comprise shaft members 32a, shaft holes 32b provided in the pivoting members 30, holes 32c provided in the side plates 15a of the side frames 15, and matching members 32d; the shaft members 32a are inserted into the shaft holes 32b and fitted into the holes 32c and the matching members 32d are interlocked from the tip end sides of the shaft members 32a, thus axially supporting the pivoting members 30 in a freely-rotatable state.

The locking portions 31 of the coupling member (wire 22) according to the present embodiment are formed as long holes in order to facilitate the attachment of the bent, hook-shaped ends of the wire 22 serving as the coupling member. Formation portions 30c of the locking portions 31 are formed to continue from an outer side of base portions 30a that configure the pivoting members 30 and so that first upright portions 30b protrude upright from the base portions 30a; the first upright portions 30b are formed to extend in the outward direction. The first upright portions 30b are formed in locations that, when the shaft portions 32 are taken as the centers, are distanced from a position in a predetermined interval between the stopper portions 39a and 39b of the rotation blocking portions 39 by approximately 90 degrees.

The locking portions (locking holes 33) of the biasing element according to the present embodiment lock the ends of the extension spring 35, which serves as the biasing element, and are formed further toward the front of the vehicle than the locking portions 31 in the formation portions 30c in which the locking portions 31 are formed. In other words, as shown in FIG. 6, the locking holes 33 are formed in a location further toward the front of the vehicle than a line Y that connects the shaft portions 32 and the locations of the wire 22 in the locking portions 31.

The biasing element according to the present embodiment is the extension spring 35 formed by coiling a spring wire member, and as shown in FIG. 6, each extension spring 35 is locked into the locking holes 33 of the pivoting members 30 and the locking holes 34 in the protruding portions 15d of the side frames 15; as a result, the pivoting members 30 are biased toward the front of the seat back frame 1. Hooks 35a for locking both ends of the extension spring 35 are formed as semicircles in both ends of the extension spring 35.

The rotation blocking portions 39 (stopper portions 39a and 39b) according to the present embodiment block rotation when the pivoting members 30 rotate, and as shown in FIG. 8, extending portions extending further in the outer direction from second upright portions 30d that protrude upright from the base portions 30a and continue from the outer sides of the base portions 30a that slide along the side plates 15a when the pivoting members 30 rotate along the shaft portions 32 are formed at a predetermined interval (with a recess therebetween).

These extending portions are the stopper portions 39a and 39b, and regulate the rotation of the pivoting members 30. The predetermined interval between the stopper portions 39a and 39b is set so that the stopper portions 39a constantly make contact with the rear edges 15c of the side frames 15 and prevent the rotation of the pivoting members 30, but the stopper portions 39b make contact with the rear edges 15c and block the rotation when the pivoting members 30 have rotated due to a rear-end collision, in order to regulate the rotation of the pivoting members 30 between upper and lower limit positions within a set rotational range. In other words, the stopper portions 39a that set the pre-rotation initial position and the stopper portions 39b that set the post-rotation stopping position are formed at a predetermined interval to regulate the upper and lower limit positions of the set rotational range of the pivoting members 30.

The rotation blocking portions 39 (stopper portions 39a and 39b) are formed at locations that do not interfere with the biasing elements (extension springs 35), the coupling member (wire 22), and the like, as will be mentioned below.

The aforementioned pivoting members 30 are attached to both side frames 15, and hook portions 22c that are the ends of the wire 22 are engaged with the locking portions 31 of the pivoting members 30 on both sides; thus the configuration is such that the respective pivoting members 30 operate independently. The configuration is also such that the pivoting members 30 operate independently from the headrest S3.

In the present embodiment, the pivoting members 30 are attached to both of the side frames 15, and the pivoting members 30 that have been attached to both of these frames are configured to rotate independently of each other. For this reason, in the case where an off-balance load has occurred, the pivoting members 30 on the side portions on both sides rotate independently of each other in accordance with the load, and thus the body of the occupant sinks in accordance with the severity of the impact load.

During normal seating, in which an occupant is seated, tension that causes the pivoting members 30 to rotate backwards occurs via the seat back cushion 100, the pressure receiving member 20, and the wire 22 within the seat back S1; the extension springs 35 bias the pivoting members 30 to rotate toward the front of the seat back frame 1. Here, the extension springs 35 linked to the pivoting members 30 have load properties in which the extension springs 35 do not warp with a load region occurring during normal seating, and thus the pivoting members 30 are constantly stopped in the initial position by the stopper portions 39a on the initial position side making contact with the rear edge sides 15c of the side frames 15. In other words, the configuration is such that a force that resists the force that rotates the pivoting members 30 and that restores the pivoting members 30 into the initial state is greatest during normal seating.

Figure 9:
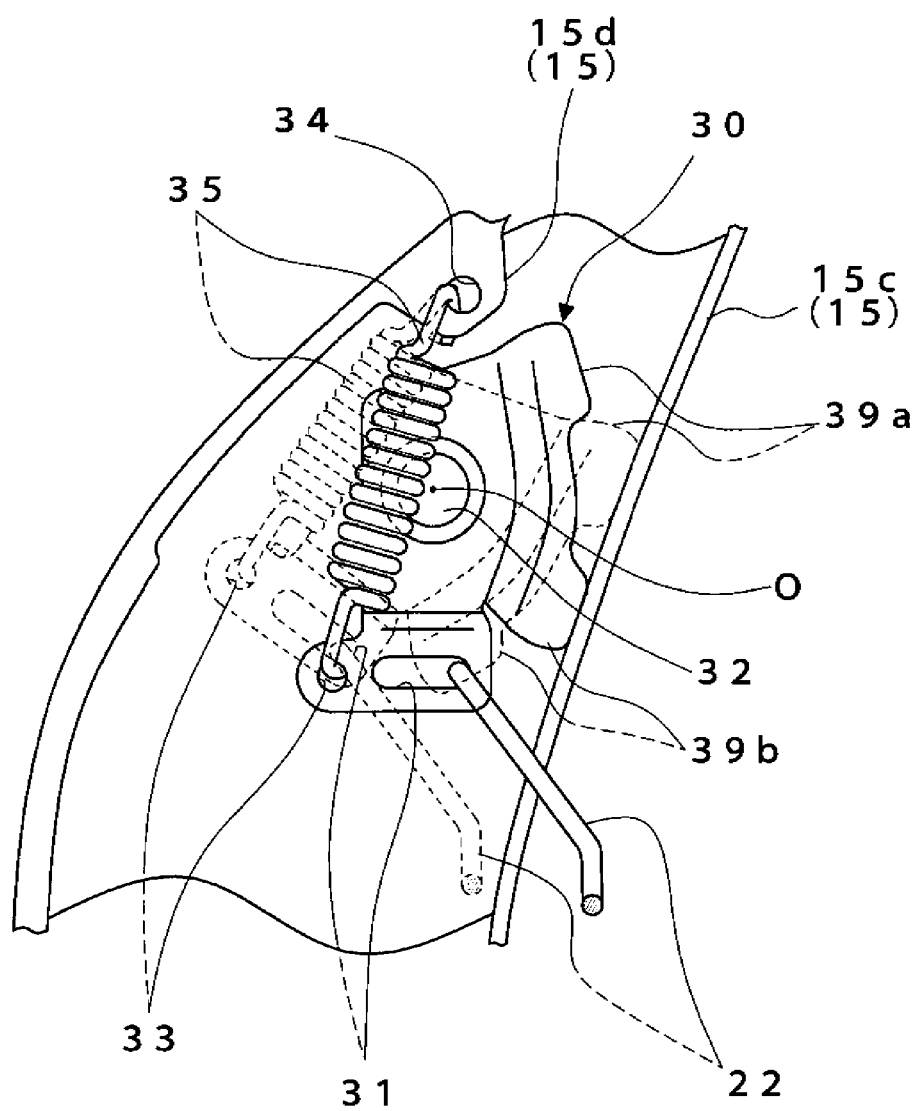
FIG. 9 is a side view diagram illustrating the states of the impact reduction member and the biasing element before and after a rear-end collision.
Figure 10A:
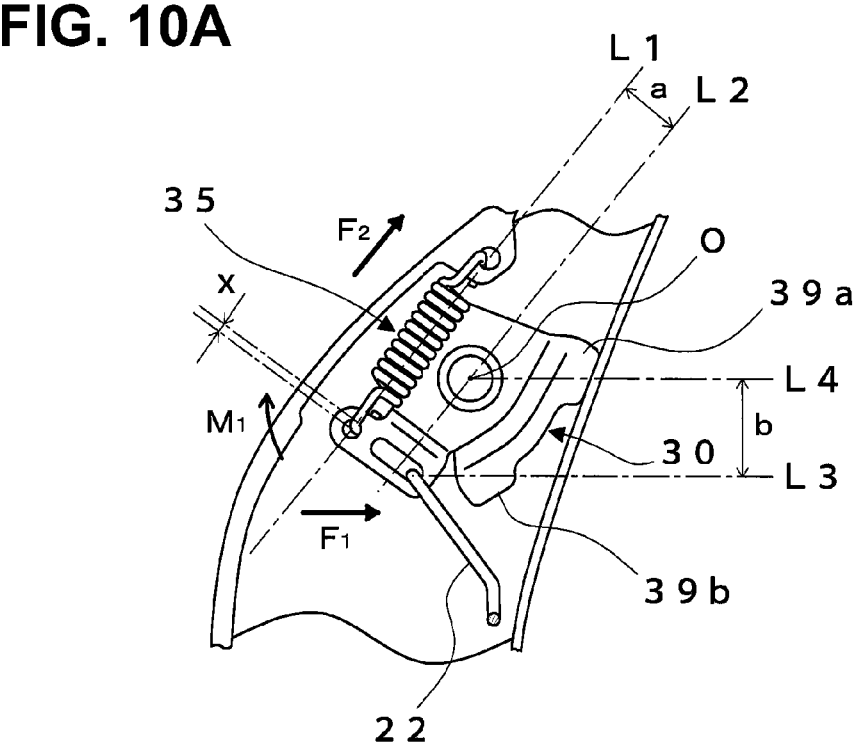
FIGS. 10A, B are side view diagrams illustrating the states of the impact reduction member and the biasing element before and after a rear-end collision.
Figure 10B:
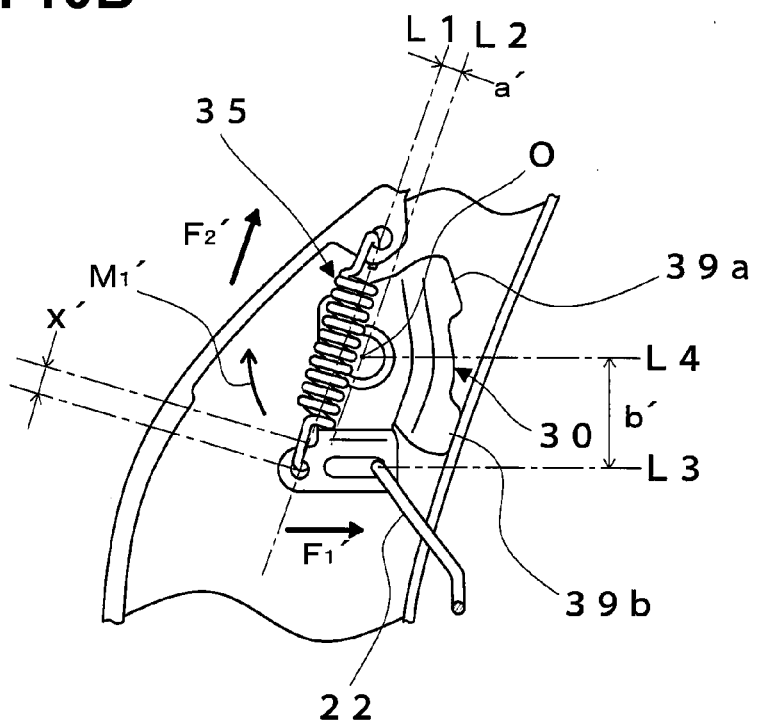

With respect to the pivoting members 30 at the time of a rear-end collision, FIG. 3 indicates the pre-rotation impact reduction member, FIG. 4 indicates the post-rotation impact reduction member, and in FIG. 9, the dotted line indicates a state prior to a rear-end collision while the solid line indicates a state after a rear-end collision; finally, FIG. 10A indicates a state prior to a rear-end collision and FIG. 10B indicates a state following a rear-end collision. At the time of a rear-end collision, as shown in FIG. 9 and FIGS. 10A, B, the impact occurs from the rear, and inertia force causes the occupant to move backward; this load goes through the pressure receiving member 20 (not shown in FIG. 9 and FIGS. 10A, B) and the wire 22 that is locked in the pressure receiving member 20, and tension in the direction that causes the pivoting members 30 to rotate backward (that is, to the right in FIG. 9 and FIGS. 10A, B) is generated. The tension at this time causes the extension springs 35 that hold the pivoting members 30 in their initial positions to extend, and thus the load becomes a load that is sufficient to rotate the pivoting members 30 backward.

The threshold for the force that causes the rotation of the pivoting members 30 to start is set to a value that is greater than the normal seating load.

Here, with respect to the threshold for the force that causes the rotation of the pivoting members 30, the load upon the seat back S1 during normal seating (excluding small impacts arising due to seating impacts, sudden movements of the vehicle forward, and the like) is approximately 150 N, and thus it is preferable for the threshold to be a value that is greater than 150 N. If the value is lower than this, movement will occur even during normal seating, which results in less stability and is therefore undesirable.

Furthermore, taking into consideration seating impacts occurring during normal seating, loads arising during acceleration caused by sudden forward movement of the vehicle, and the like, it is preferable to set the value to be greater than 250 N; doing so makes it possible to maintain a stable state, with the pivoting members 30 operating only at the time of a rear-end collision.

As described above, by rotating the pivoting members 30 backward, the wire 22 that is engaged in the locking portions 31 moves backward; along with this, the pressure receiving member 20 that is locked to the wire 22 and the seat back cushion 100 that is supported by the pressure receiving member 20 move backward, which makes it possible to cause the occupant to sink into the seat back S1.

Hereinafter, the rotational properties of the pivoting members 30 at the time of a rear-end collision will be described in further detail with reference to FIG. 9 and FIGS. 10A, B.

In a pre-rotation initial position of the pivoting members 30, the locking portions 31 that lock the wire 22 and the locking holes 33 that lock the lower ends of the extension springs 35 are disposed in a position that is closer to the front of the vehicle than the shaft portions 32, and the upper ends of the extension springs 35 are locked into the locking holes 34 formed in the protruding portions 15d of the side frames 15 located above the pivoting members 30.

In other words, in the initial state, the extension springs 35 are extended by a distance x, and as a result, the pivoting members 30 are biased in the rotational direction indicated by the arrow in FIG. 10A at a rotational momentum $M_1$; the coupling member (wire 22) that is linked to the pivoting members 30 is also biased in the forward direction. At this time, the stopper portions 39a of the rotation blocking portions 39 make contact with the rear edges 15c of the side frames 15, thus preventing the pivoting members 30 from rotating in the direction of $M_1$ due to the extension springs 35.

When a rear-end collision occurs, a tension that is greater than or equal to a predetermined tension is exerted on the wire 22, and the pivoting members 30 begin to rotate against the extension springs 35; as a result, the extension springs 35 extend, and the locking holes 33 provided in the pivoting members 30 move backward while rotating around a rotational center O of the shaft portions 32. Then, as shown in FIG. 9, the pivoting members 30 rotate until the rotation of the pivoting members 30 is blocked by the stopper portions 39b of the rotation blocking portions 39 making contact with the rear edges 15c of the side frames 15. Through this, the pressure receiving member 20 move significantly backward from the seat frame 1, from the state shown in FIG. 3 to the state shown in FIG. 4, and the amount of sinking increases as a result.

In the present embodiment, when the pivoting members 30 rotate and the pressure receiving member 20 moves, the upper ends of the extension springs 35 are anchored to the locking holes 34 that are above the pivoting members 30, and thus the configuration is such that the direction in which the locking holes 33 move and in the direction in which the extension springs 35 extend do not match.

In other words, the configuration is such that the rotational amount of the pivoting members 30 and the extension load (the warp amount) of the extension springs 35 are not in proportion with each other; to rephrase, the rotational angle of the pivoting members 30 and the forward rotational direction torque (rotational force) applied by the extension springs 35 are in a relation that is not in a simple proportion.

In other words, the locking holes 33 that lock the lower ends of the extension springs 35 trace an arc-shaped trajectory with the shaft portions 32 as the rotational centers thereof, whereas the locking holes 34 that lock the upper ends of the extension springs 35 are formed as fixed ends that are anchored and affixed to the upper ends of the pivoting members 30.

For this reason, the extension load (warp amount) of the extension springs 35 is maximum when the rotational center O of the shaft portions 32 and the locking holes 33 and 34 to which both ends of the extension springs 35 are locked are arranged on a straight line, but the amount of change in the distance between the locking holes 33 and the locking holes 34 that lock the extension springs 35 is low at an area immediately before this maximum load point, or in other words, in the vicinity of the rotational amount at which the trajectory traced by the locking holes 33 provided in the pivoting members 30 is at the furthest position from the locking holes 34 that lock the other ends of the extension springs 35; therefore, a region arises in which the amount of change in the extension load of the extension springs 35 relative to the rotational angle is minute.

In the present embodiment, the amount of backward rotation at the position at which the pivoting members 30 are stopped by the stopper portions 39b is set to be immediately before the maximum load point of the extension springs 35.

For this reason, when the pivoting members 30 begin to rotate, the tension arising when the pivoting members 30 make contact with the stopper portions 39b and the rotation thereof is stopped (that is, when the rotation ends) is approximately the same value as the tension arising through the wire 22.

Here, a relation among the biasing elements (extension springs 35), the coupling member (wire 22), the impact reduction member (pivoting members 30), and a load will be further described. The reference numerals indicated in FIGS. 10A and 10B are as follows.

$$M_1 = F_2 \times a, M_1' = F_2' \times a'$$

where
$M_1$, $M_1'$ rotational momentum
$F_1$, $F_1'$ load in the backward direction
$F_2$, $F_2'$ extension force of the spring
a, a' the distance between the rotational center and the fixed position of the biasing element (spring); specifically, the distance between a first imaginary line L1 that connects both ends of the biasing element and a second imaginary line L2 that is parallel to the first imaginary line $L_1$ and passes through the rotational center, where a is the pre-rotation distance, and a' is the post-rotation distance
b, b': the distance between the rotational center and the coupling member (wire); specifically, the distance between a third imaginary line L3 that is parallel to a horizontal line passing through the area where the impact reduction member and the coupling member (wire) are linked and a fourth imaginary line L4 that is parallel to the third imaginary line L3 and passes through the rotational center, where b is the pre-rotation distance, and b' is the post-rotation distance
x, x' extension of the spring $$F_2' = F_2 + \Delta_x \times k,$$

where k represents a spring constant and $\Delta_x = x' - x$.

In the present embodiment, in order to favorably maintain a seating state during normal seating, a certain degree of resistance is necessary, and it is thus preferable to keep the holding load of the pivoting members 30 constant during normal seating and reduce the operational load at the time of a collision. For this reason, it is preferable to set the load to be low when the pivoting members 30 operate, and thus the resistance to the force with which the pivoting members 30 rotate, or in other words, the momentum by which the extension springs 35 rotate the pivoting members 30, is set to be highest in the initial state (during normal seating) and lower during rotation.

In the present embodiment, as shown in FIGS. 10A, B, the configuration is such that the extension springs 35 grow closer to the rotational center O the further the pivoting members 30 rotate, causing the distance a to become short. Accordingly, the extension springs 35 that are used ensure that the rotational momentum $M_1$ in the initial state ($F_2 \times a$) is the highest and the rotational momentum $M_1'$ ($F_2' \times a'$) during rotation (and post-rotation) is lower than the rotational momentum $M_1$; the rotational momentum that rotates the pivoting members 30 is high initially and gradually tapers off as the rotation continues.

For example, if the extension force $F_2'$ of the spring is doubled and the distance a' between the rotational center and the fixed position of the spring is less than half, it can be seen that the force that rotates the impact reduction member has weakened.

In this manner, with the pivoting member 30 serving as the impact reduction member, the rotational momentum $M_1$ in the initial state ($F_2 \times a$) is the highest and the rotational momentum $M_1'$ ($F_2' \times a'$) becomes lower than the rotational momentum $M_1$ in accordance with the rotation, or in other words, the force by which the extension springs 35 restore the pivoting members 30 into their initial states gradually decreases, and thus when the pivoting members 30 begin to rotate at the time of a rear-end collision, the pivoting members 30 move with more ease thereafter.

In FIGS. 10A and 10B, in order for the pivoting members 30, the extension springs 35, and the coupling member (wire 22) to be balanced when at rest, it is necessary for $F_1 \times b$, or the force from the occupant (the force that moves the pivoting members 30), and $F_2 \times a$, or the rotational momentum (resting force), to reach equilibrium or for the rotational momentum to be greater, as expressed by Equation 1 (below), where the rotational momentum is ($M_1 = F_2 \times a$), the load in the backward direction is ($F_1$), the extension force of the spring is ($F_2$), the distance between the rotational center and the fixed position of the spring is (a), the distance between the rotational center and the coupling member (wire 22) is (b). Note that in the case where the rotational momentum is great, the rotation of the pivoting members 30 is blocked by the stopper portions 39a.

$$F_1 \times b \leq F_2 \times a \qquad \text{(Equation 1)}$$

On the other hand, in order to achieve balance in a state in which the pivoting members 30 have moved, it is necessary for $F_1' \times b'$, or the force from the occupant (the force that moves the pivoting members 30), and $F_2' \times a'$, or the rotational momentum (resting force), to reach equilibrium or for the force from the occupant to be greater, as expressed by Equation 2 (below). Note that in the case where the force from the occupant is greater and the pivoting members 30 have moved to a predetermined position, the rotation of the pivoting members 30 is blocked by the stopper portions 39b.

$$F_1' \times b' \geq F_2' \times a' \qquad \text{(Equation 2)}$$

As described thus far, the threshold of the tension when the pivoting members 30 begin to rotate is set to a high value at which the pivoting members 30 do not rotate during a normal seating load. Because the tension exerted on the pivoting members 30 through the wire 22 at the time of a rear-end collision is impact energy, the tension has a higher value compared to the threshold. Furthermore, the force by which the extension springs 35 restore the pivoting members 30 into their initial states decreases in accordance with the rotation of the pivoting members 30.

For this reason, when the pivoting members 30 begin to rotate due to a rear-end collision, the pivoting members 30 rotate without stopping partway through until the pivoting members 30 are stopped by the stopper portions 39b, which makes it possible to cause the occupant to sink into the seat back S1 with certainty.

Second Embodiment

Figure 11:
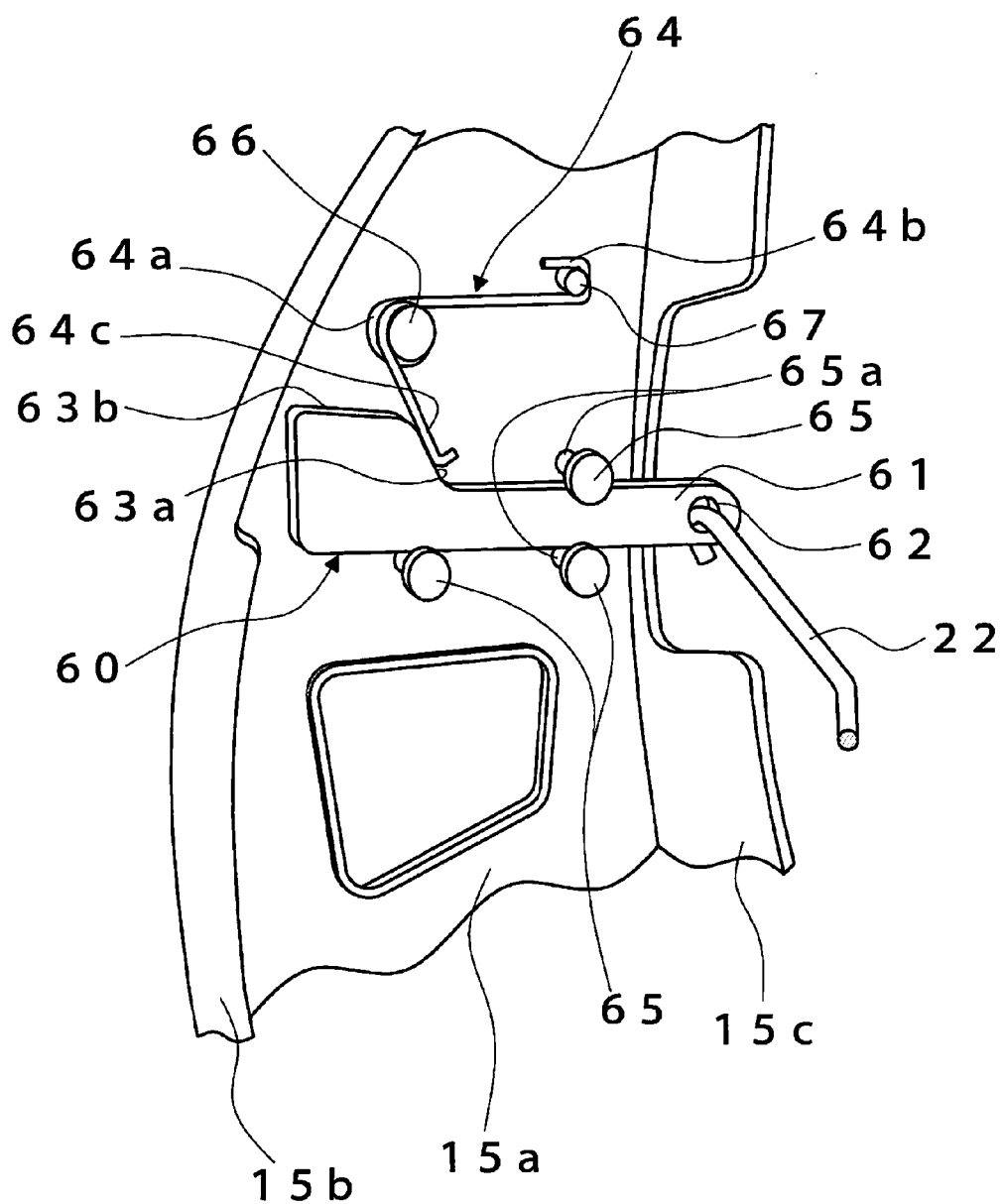
FIG. 11 is a perspective explanation diagram illustrating an impact reduction member and a biasing element according to a second embodiment of the present invention.
Figure 12:
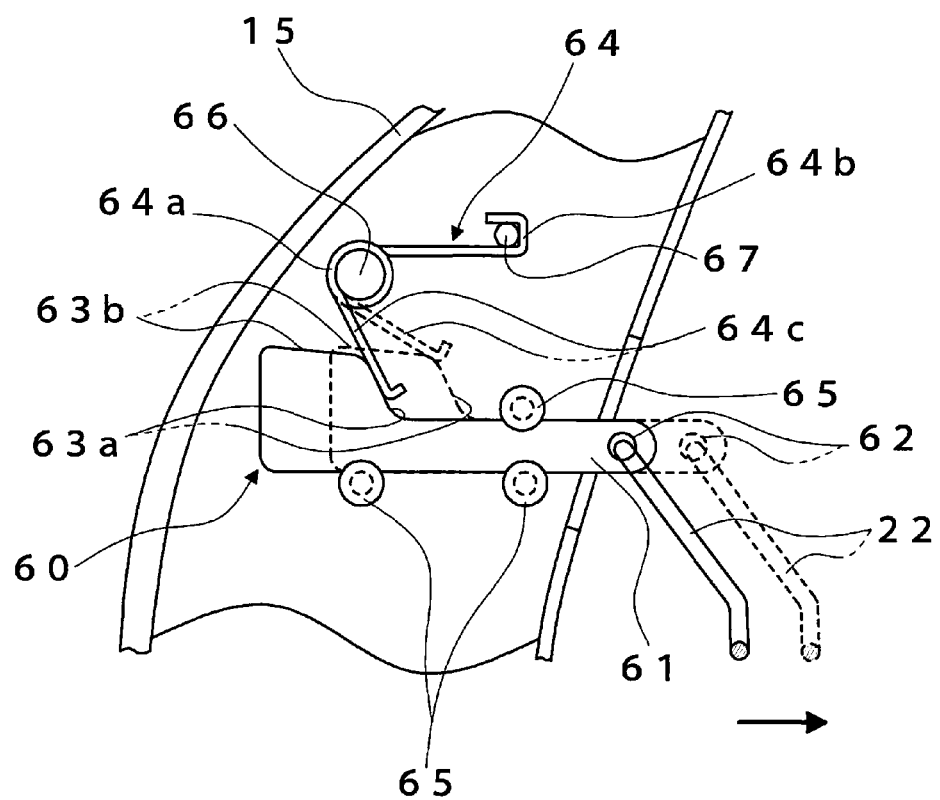
FIG. 12 is a side view diagram illustrating the states of the impact reduction member and the biasing element before and after a rear-end collision according to the second embodiment.

FIG. 11 and FIG. 12 illustrate a second embodiment. Elements, components, and the like that are the same as those in the foregoing embodiment will be given the same reference numerals in the present embodiment, and descriptions thereof will be omitted.

The present embodiment illustrates an example in which slide members 60 are employed as the impact reduction members disposed on both sides. As shown in FIG. 12, the slide members 60 comprise sliding portions 61, locking portions 62 serving as linking portions, and contact portions 63 (63a and 63b); the contact portions 63 comprise first contract portions 63a that make contact with an end of torsion springs 64 serving as biasing elements (mentioned below) and second contact portions 63b, where the first contact portions 63a have a steep slope downward (FIG. 11) and the second contact portions 63b have a gentle slope.

Each torsion spring 64 is formed so that a coil portion 64a is held by a holding pin 66, one end 64b is engaged by a locking pin 67, and the other end 64c makes contact with the corresponding contact portion 63.

Furthermore, multiple guide pins 65 are disposed in the sliding direction, and in positions in the side plates 15a of the side frames 15 that correspond to the upper and lower areas of the sliding portions 61; the guide pins 65 guide the movement of the slide members 60. The guide pins 65 have enlarged head regions and shaft portions 65a, and pullout stopping members 65d (not shown in FIGS. 11 and 12) are disposed so that the guide pins 65 cannot be pulled out.

As shown in FIG. 12, during a normal seating load, the other ends 64c of the torsion springs 64 make contact with the steeply-sloped first contract portions 63a, and thus the slide members 60 have difficulty moving; however, when the wire 22 serving as the coupling member is pulled in the direction of the arrow due to a predetermined impact load exerted on the pressure receiving member 20, the slide members 60 are guided by the guide pins 65 and move against the torsion springs 64 and toward the rear of the vehicle as indicated by the dotted line. At this time, the other ends 64c of the torsion springs 64 move from the steeply-sloped first contract portions 63a to the gently-sloped second contact portions 63b.

The torsion springs 64 and slide members 60 have movement properties in which the force that pushes the slide members 60 of the torsion springs 64 toward the initial position when the gently-sloped second contact portions 63b are in contact is less than the force that pushes the slide members 60 of the torsion springs 64 toward the initial position when the steeply-sloped first contract portions 63a are in contact.

Accordingly, when the slide members 60 start to move due to a rear-end collision, the slide members 60 move without stopping partway, and thus the occupant sinks into the seat back S1 with certainty.

Figure 13:
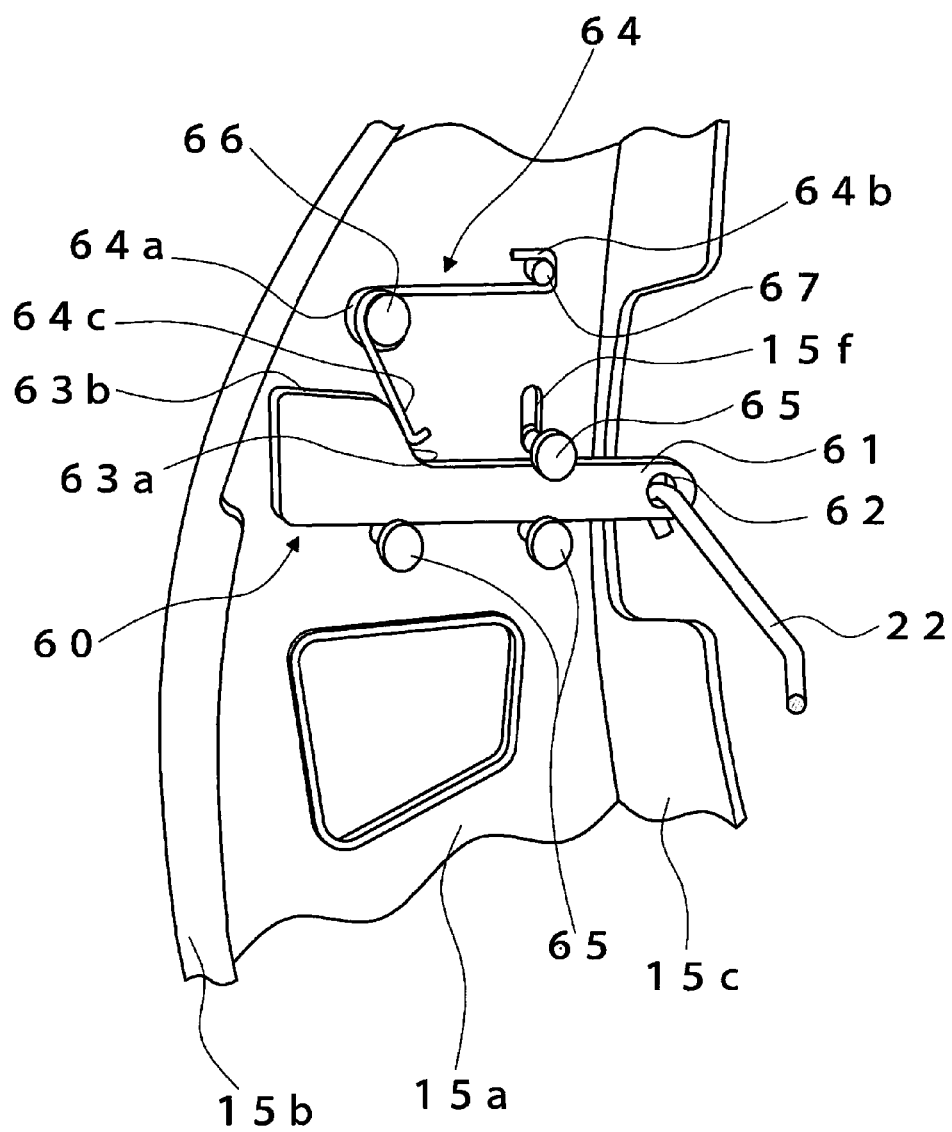
FIG. 13 is a perspective diagram illustrating an impact reduction member and a biasing element according to a variation on the second embodiment.
Figure 14:
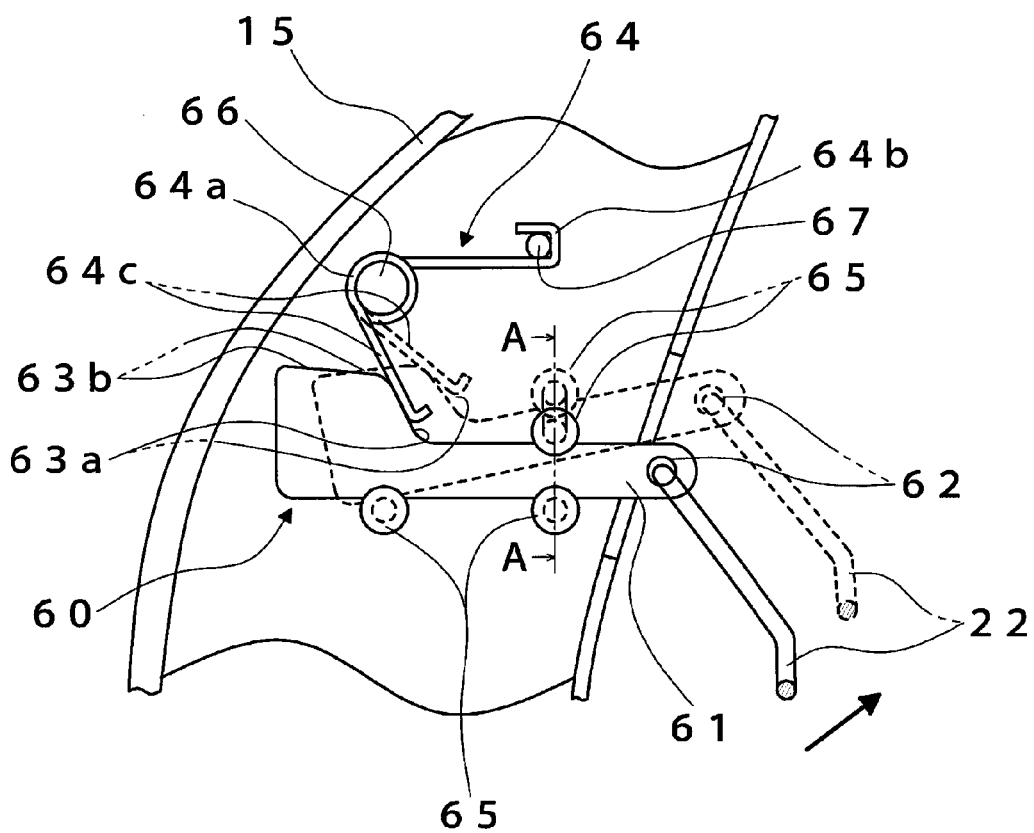
FIG. 14 is a side view diagram illustrating the states of the impact reduction member and the biasing element illustrated in FIG. 13, before and after a rear-end collision.
Figure 15:
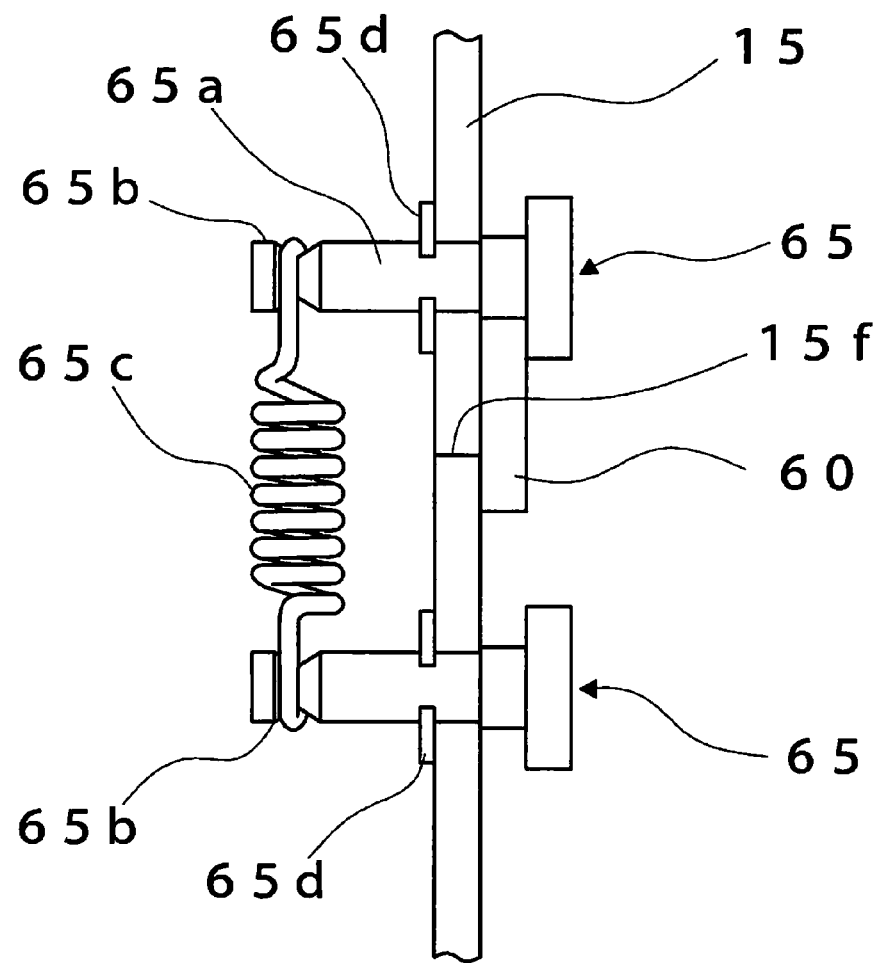
FIG. 15 is a cross-sectional view taken along the A-A line in FIG. 14.

FIG. 13 through FIG. 15 illustrate a variation on the second embodiment, where FIG. 13 is a perspective diagram illustrating an impact reduction member and a biasing element, FIG. 14 is a side view diagram illustrating the states of the impact reduction member and the biasing element before and after a rear-end collision, and FIG. 15 is a cross-sectional view taken along the A-A line shown in FIG. 14. Elements, components, and the like that are the same as those in the foregoing embodiment and indicated in FIG. 11 and FIG. 12 will be given the same reference numerals in the present embodiment, and descriptions thereof will be omitted.

In this embodiment, long holes 15f that guide the shaft portions 65a of the guide pins 65 so that the guide pins 65 in an upward location (FIG. 13) can slide are formed in the side plates 15a. The long holes 15f are formed at a predetermined angle relative to the sliding direction of the slide members 60 (in this embodiment, 90°), as shown in FIG. 13.

In addition, with two of the guide pins 65, the shaft portions 65a protrude toward the rear of the side plates 15a, and linking springs 65c that bias the two guide pins 65 toward the direction so that the two guide pins 65 become closer are disposed at the end portions 65b of these shaft portions 65a. Note that the reference numeral 65d indicates a pullout stopping member (E ring) for the guide pins 65.

With respect to the operations of the present embodiment, when a load is exerted on the wire 22 serving as the coupling member in the direction of the arrow indicated in FIG. 14, a force is also exerted on the slide members 60 in the movement direction of the wire 22, and the guide pins 65 are guided by the long holes 15f against the linking springs 65c and move along the movement direction of the wire 22, as indicated by the dotted line in FIG. 14.

Because the seat back S1 tilts backward at the time of a rear-end collision, the load from the occupant that follows the movement of the seat back S1 is effectively used; this in turn makes it possible to ensure a sufficient amount of movement for the pressure receiving member 20, which serves as the supporting member, and makes it possible for the entire body of the occupant to sink to a sufficient extent.

Figure 16:
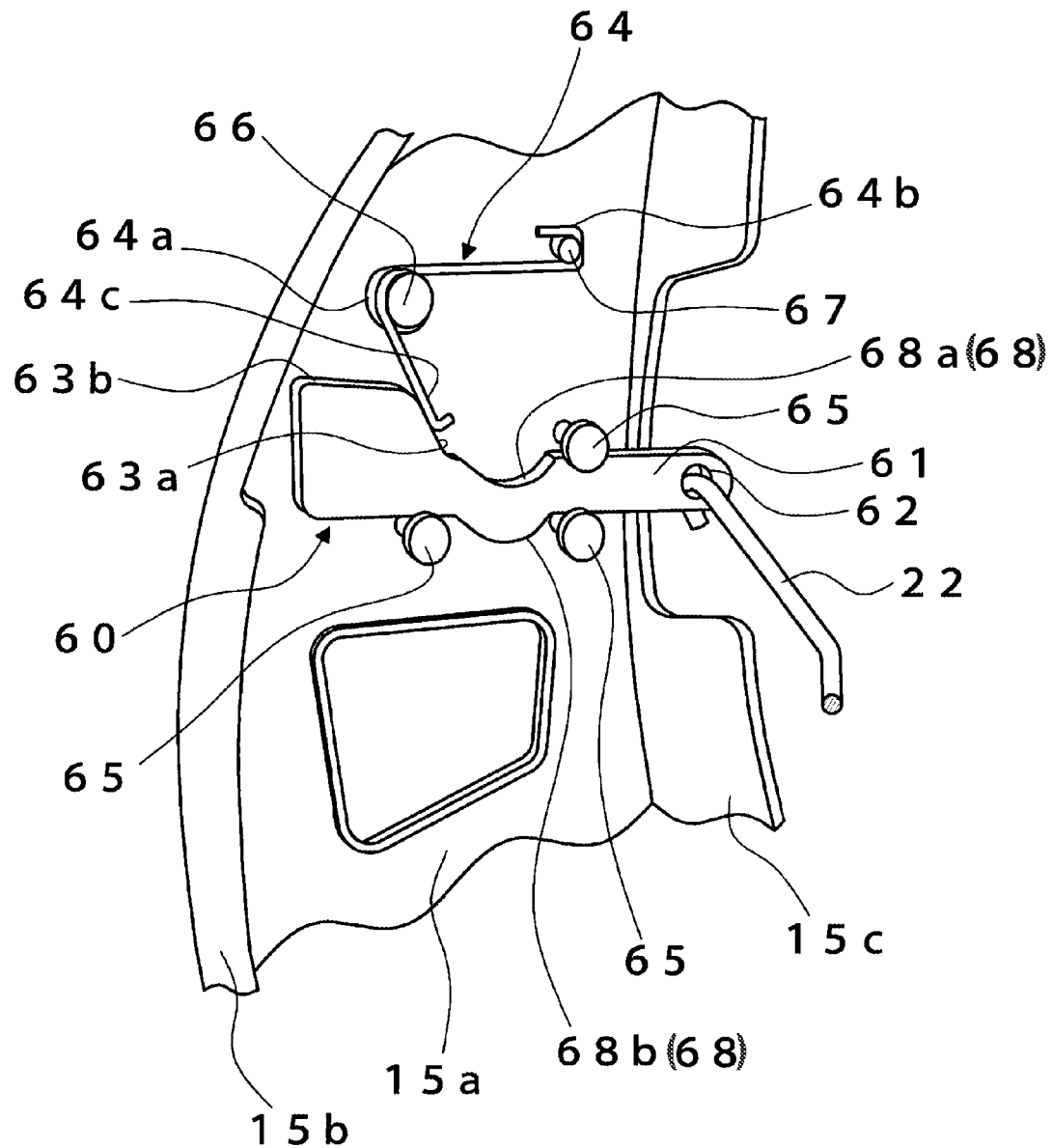
FIG. 16 is a perspective view diagram illustrating an impact reduction member and a biasing element according to another variation on the second embodiment.
Figure 17:
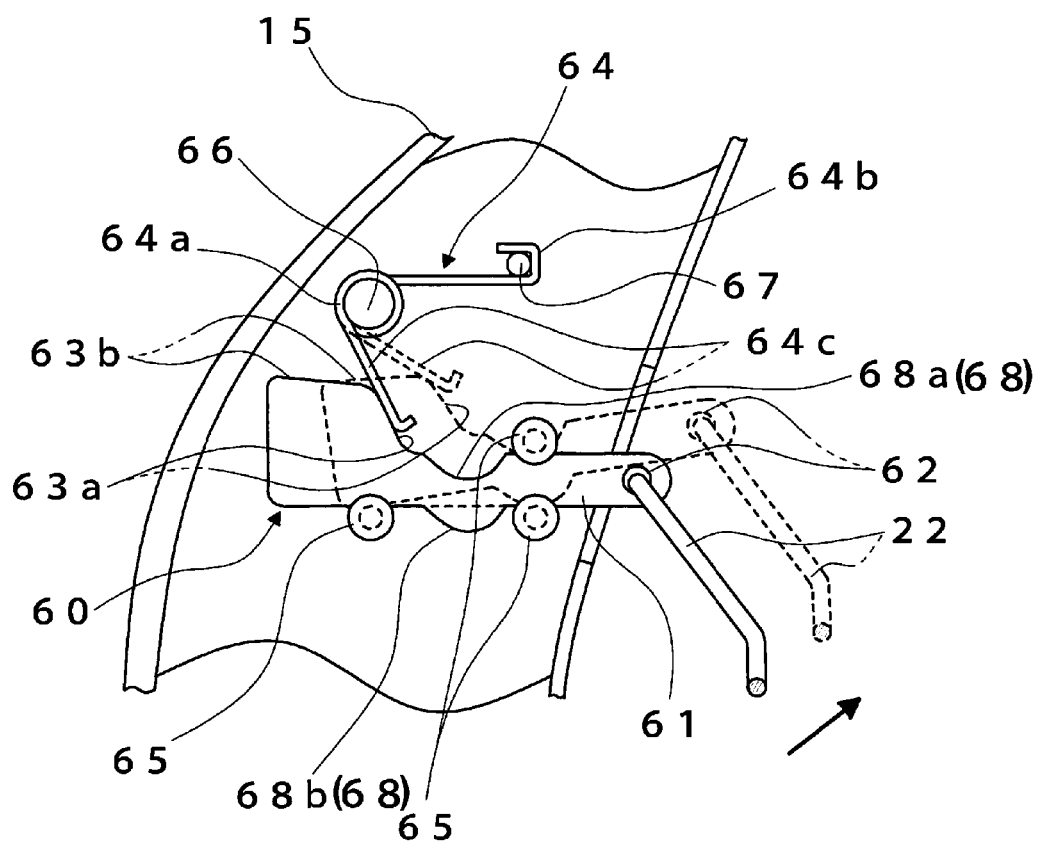
FIG. 17 is an explanation diagram illustrating the states of the impact reduction member and the biasing element illustrated in FIG. 16, before and after a rear-end collision.

FIG. 16 and FIG. 17 illustrate another variation on the second embodiment illustrated in FIG. 11, where FIG. 16 is a perspective view diagram illustrating an impact reduction member and a biasing element, and FIG. 17 is an explanation diagram illustrating the states of the impact reduction member and the biasing element shown in FIG. 16 before and after a rear-end collision. Elements, components, and the like that are the same as those in the embodiments illustrated in FIG. 11 through FIG. 15 will be given the same reference numerals in the present embodiment, and descriptions thereof will be omitted.

This embodiment is characteristic in terms of the shapes of guide surfaces 68 (68a and 68b) that guide the guide pins 65 and that continue from the contact portions 63 of the slide members 60, and as shown in FIG. 16, arc-shaped recesses 68a, which are guide surfaces that continue from the first contact portions 63a, are formed in the slide members 60, in the first contact portions 63a on the opposite side as the second contact portions 63b; arc-shaped protrusions 68b are formed in the surface on the opposite side as the arc-shaped recesses 68a.

With respect to the operations of the present embodiment, when a load is exerted on the wire 22 serving as the coupling member in the direction indicated by the arrow in FIG. 17, a force also acts on the slide members 60 in the movement direction of the wire 22; the slide members 60 are guided by the guide pins 65 and move toward the rear of the vehicle against the torsion springs 64 as indicated by the dotted line, but the other ends 64c of the torsion springs 64 move from the steeply-sloped first contract portions 63a to the gently-sloped second contact portions 63b. At this time, the slide members 60 are moved along the arc-shaped recesses 68a and the arc-shaped protrusions 68b, which are the guide surfaces 68, by the guide pins 65, and are moved along the movement direction of the wire 22, as indicated by the dotted line in FIG. 17.

At this time, the load from the occupant that follows the movement of the seat back S1 tilting backward at the time of a rear-end collision is effectively used by changing the curvature factor of the arc-shaped recesses 68a and the arc-shaped protrusions 68b; this in turn makes it possible to secure a sufficient amount of movement for the pressure receiving member 20, which serves as the supporting member, and makes it possible for the entire body of the occupant to sink to a sufficient extent.

Third Embodiment

Figure 18:
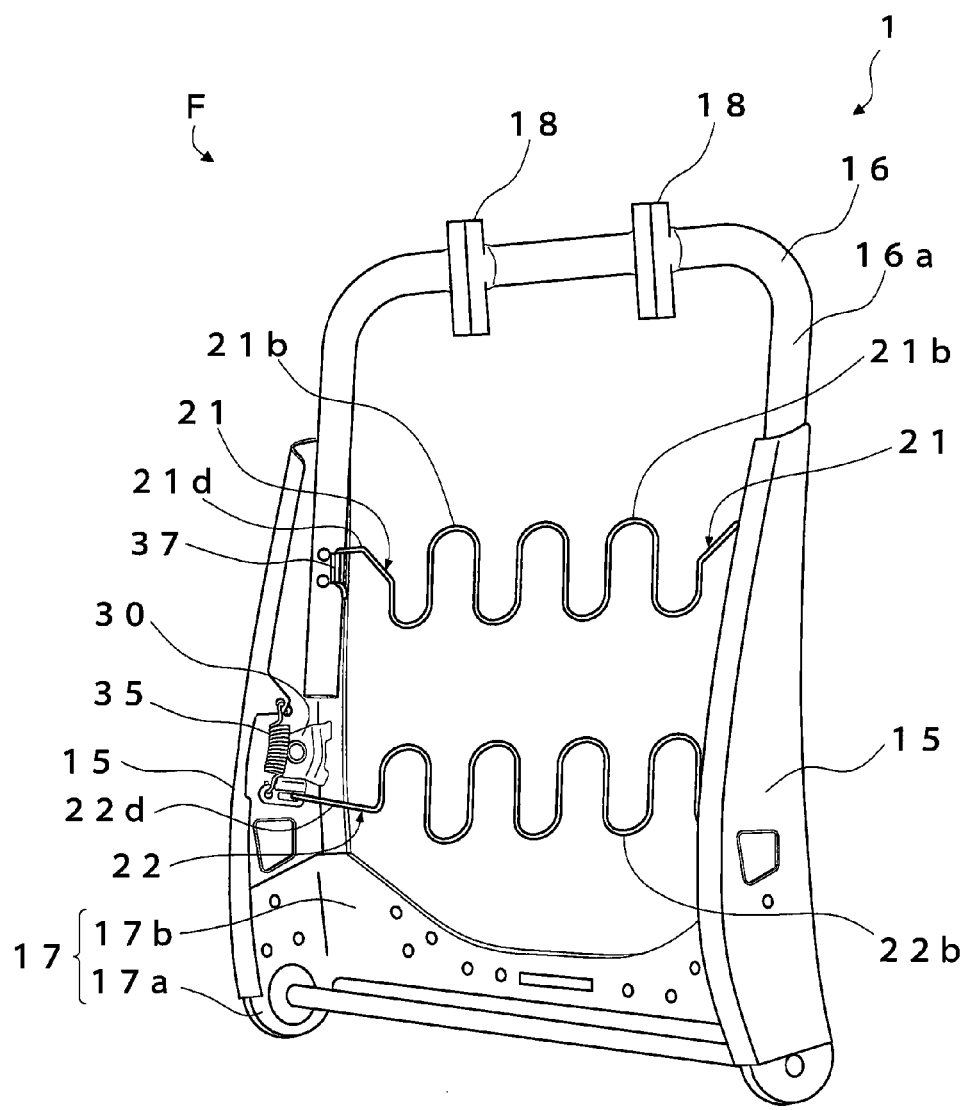
FIG. 18 is an overall perspective view of a seat frame according to a third embodiment of the present invention.
Figure 19:
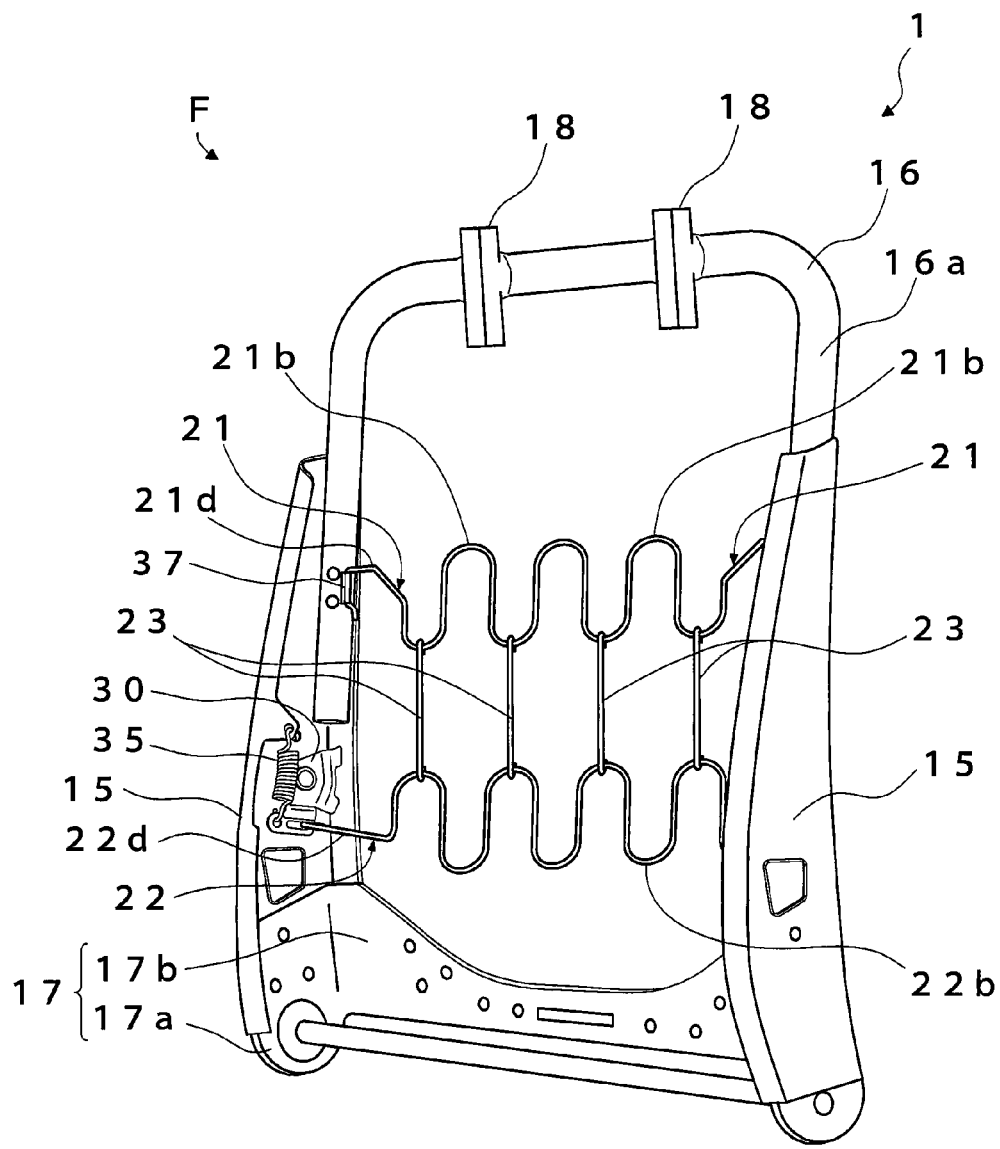
FIG. 19 is an overall perspective view of a seat frame according to a variation on the third embodiment.

FIG. 18 and FIG. 19 illustrate a third embodiment, where FIG. 18 is an overall perspective view of a seat frame according to the third embodiment, and FIG. 19 is an overall perspective view of a seat frame according to a variation on the third embodiment shown in FIG. 18. In these embodiments, the supporting member that supports the body of the occupant is configured of the same material as the member that configures the coupling member, and is configured to continue therefrom.

With the embodiment shown in FIG. 18, the supporting member and the coupling member are configured using the wires 21 and 22, which are the same members. As shown in FIG. 18, the upper wire 21 and the lower wire 22 are each configured of wire end areas 21d and 22d that function as the coupling member and wire center areas 21b and 22b that function as the supporting member. The wire center areas 21b and 22b that function as the supporting member are formed in a zigzag shape with multiple U shapes, and are configured to receive a load on the side facing the seat back.

Employing such a configuration not only reduces the number of components, but can also enable a higher efficiency in the assembly process, as it is not necessary to assemble the supporting member and the coupling member separately and the assembly process need only be carried out once.

FIG. 19, illustrates an example in which the wires 21 and 22 illustrated in FIG. 18 are linked to each other by linking wires 23. Linking the wires 21 and 22 to each other has an advantage, in addition to the advantages of the embodiment illustrated in FIG. 18, of increasing the stability of the wires 21 and 22, which makes it possible to alleviate an issue in which only one of the wires 21 and 22 sinks to an extreme degree. Note that by making the diameter of the lower wire 22 smaller than that of the upper wire 21, the configuration is such that the lower wire 22 bends to a greater extent, which makes it possible to ensure a greater degree of sinking at the location of the lower back region than with the upper wire 21.

Figure 20C:
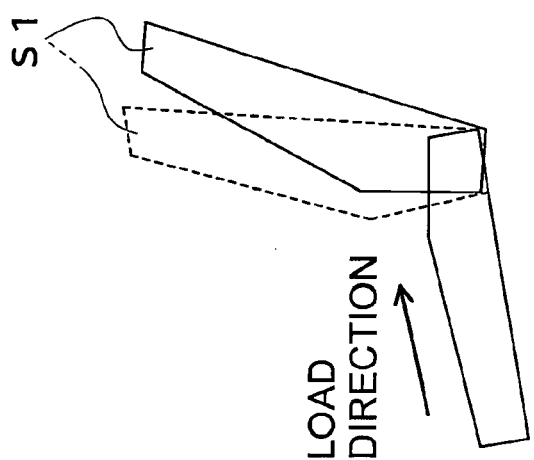
FIGS. 20A-C are side view illustration diagrams illustrating a relation between the tilting of a seat back in the backward direction and the direction of a load.
Figure 20B:
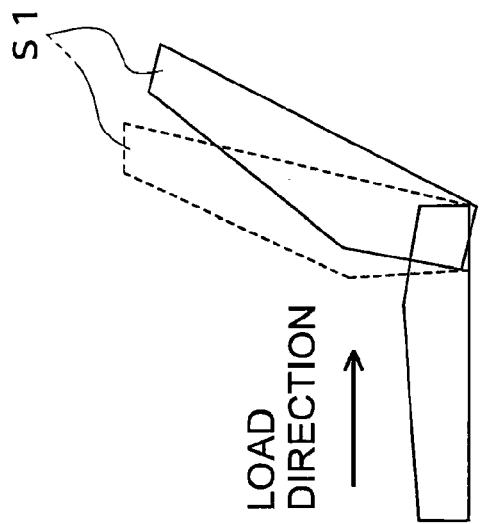

Here, operations before and after a rear-end collision will be described with reference to FIG. 20 through FIG. 22, using the pivoting members 30 serving as impact reduction members as an example. FIGS. 20A-C are side view illustration diagrams illustrating a relation among the tilting of a seat back in the backward direction and the direction of a load, and FIGS. 21A, B are side view illustration diagrams illustrating a relation among the tilting of a seat back in the backward direction, the direction of a load, and the impact reduction member; these diagrams illustrate a state when the seat back tilts backward, and illustrate the position prior to the backward tilting and the direction of the load. FIGS. 22A-C are side view illustration diagrams illustrating the impact reduction member from the start to the end of rotating thereof. Because the seat back tilts backward at the time of a rear-end collision, the vehicle seat according to the present embodiment takes into consideration the backward movement of the seat back, and effectively makes use of the load from the occupant to ensure that the supporting member has a sufficient amount of movement and ensures that the entire body of the occupant, which has higher load transfer efficiency, sinks at the time of a rear-end collision, as will be described hereinafter with reference to these figures.

Figure 20A:
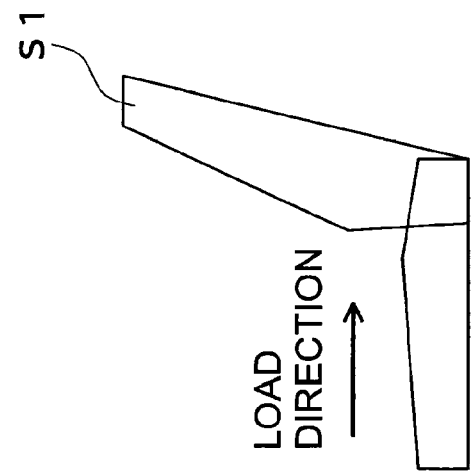

Generally, during a normal seating load, the load direction is applied in an approximately horizontal direction, as indicated by the arrow in FIG. 20A. However, at the time of a rear-end collision, the seat back S1 tilts backward due to the effects of the collision, as shown in FIG. 20B. If the backward-tilted state of the seat back S1 then returned to the state prior to the seat back S1 tilting backward, the load direction corresponds to a load direction in an upper-diagonal direction, as shown in FIG. 20C.

Here, to use the pivoting members 30 serving as the impact reduction members as an example and describe a case that takes into consideration the backward tilting of the seat back S1, the direction of the movement (rotation) of the pivoting members 30 serving as the impact reduction members is, in the initial state at the time of a rear-end collision, in the horizontal direction from below, as shown in FIG. 21A; thereafter, the movement direction gradually moves in the upward-diagonal direction, where the load transfer efficiency becomes the highest.

In general, it is difficult to cause the angle at which the pivoting members 30 move to match the angle at which the seat back S1 tilts backward, and thus causing the angle of rotation of the pivoting members 30 to match the load direction, or in other words, to go in the upper-diagonal direction at the end of the rotation, where the load value is low, rather than at the beginning of the rotation, where the load value is high, makes it possible to increase the load transfer efficiency.

Furthermore, during a normal seating load, it is preferable to set the initial load when the pivoting members 30 begin rotation to be high in order to prevent rattling and the like from occurring when the vehicle drives, and thus the rotational operations of the pivoting members match the load direction, from the downward direction to the horizontal direction to the upper-diagonal direction, from the beginning to the end of the rotation.

To describe this using FIGS. 21A, B, FIG. 21A indicates a normal seating load prior to a rear-end collision (an initial state), whereas FIG. 21B indicates the end of rotation after the rear-end collision. As shown in FIGS. 21A, B, the load direction moves downward to the upper-diagonal direction from the state shown in FIG. 21A to the state shown in FIG. 21B, due to the seat back S1 tilting backward. In the case of the pivoting members 30 illustrated in FIGS. 22A-C, the linking portions in the pivoting members 30 that link with the coupling member (wire 22) rotate from the downward direction (the state shown in FIG. 22A) to the horizontal direction (the state shown in FIG. 22B) to the upper-diagonal direction (the state shown in FIG. 22C), which makes it possible to cause the pivoting members 30 to move along with the backward tilting of the seat back; this in turn makes it possible to secure sinking movement for the entire body of an occupant, which has a high load transfer efficiency, at the time of a rear-end collision.

As described above, once the pivoting members 30 have started rotating due to a rear-end collision, the pivoting members 30 move or rotate, without stopping partway, until the movement is stopped by the stopper portions 39b, so that the locking portions 31 of the wire 22 serving as the coupling member are in the downward direction in the initial state, the horizontal direction partway through, and the upper-diagonal direction in the final state; this makes it possible to cause the occupant to sink into the seat back S1 with certainty when the load transfer efficiency is the highest.

Although the above descriptions use the pivoting members 30 as an example of the impact reduction member, the same applies in the case where the slide members 60 serve as the impact reduction member.

In other words, the vehicle seat S is configured so that the linking portions (locking portions 31, 62) between the impact reduction member (pivoting members 30, slide members 60) and the supporting member (pressure receiving member 20, central areas 21b and 22b) are moved upward and the entirety of the supporting member (pressure receiving member 20, central areas 21b and 22b) moves toward the rear of the vehicle due to a predetermined impact load that is greater than the normal seating load.

In addition, the vehicle seat S can be configured so that the linking portions (locking portions 31, 62) between the impact reduction member (pivoting members 30, slide members 60) and the supporting member (pressure receiving member 20, central areas 21b and 22b) are moved upward after being moved in the horizontal direction and the entirety of the supporting member (pressure receiving member 20, central areas 21b and 22b) move toward the rear of the vehicle due to a predetermined impact load that is greater than the normal seating load.

Furthermore, the vehicle seat S can be configured so that the linking portions (locking portions 31, 62) between the impact reduction member (pivoting members 30, slide members 60) and the supporting member (pressure receiving member 20, central areas 21b and 22b) are moved upward after being moved downward and the entirety of the supporting member (pressure receiving member 20, central areas 21b and 22b) moves toward the rear of the vehicle due to a predetermined impact load that is greater than the normal seating load.

In addition, the vehicle seat S can be configured so that the linking portions (locking portions 31, 62) between the impact reduction member (pivoting members 30, slide members 60) and the supporting member (pressure receiving member 20, central areas 21b and 22b) are moved downward, in the horizontal direction, and then upward, and the entirety of the supporting member (pressure receiving member 20, central areas 21b and 22b) moves toward the rear of the vehicle due to a predetermined impact load that is greater than the normal seating load.

Further, the vehicle seat S can be configured so that the linking portions (locking portions 31, 62) between the impact reduction member (pivoting members 30, slide members 60) and the supporting member (pressure receiving member 20, central areas 21b and 22b) are moved upward after the maximum load point for the load received by the supporting member (pressure receiving member 20, central areas 21b and 22b) from an occupant has been passed, and the entirety of the supporting member (pressure receiving member 20, central areas 21b and 22b) moves toward the rear of the vehicle due to a predetermined impact load that is greater than the normal seating load.

Fourth Embodiment

FIG. 23 through FIG. 26 illustrate a fourth embodiment. Elements, components, and the like that are the same as those in the first embodiment will be given the same reference numerals in the present embodiment, and descriptions thereof will be omitted.

The seat back frame 1 according to the present embodiment is configured to include two impact reduction members, or the pivoting members 30 serving as a lower impact reduction member provided in the lower part of the side portions and pivoting members 80 serving as an upper impact reduction member provided in the upper part of the side portions. Note that the pivoting members 30 serving as the lower impact reduction member are provided along the side plates 15a of the side frames 15 and have the same configurations as in the first embodiment, and thus descriptions thereof will be omitted.

Figure 23:
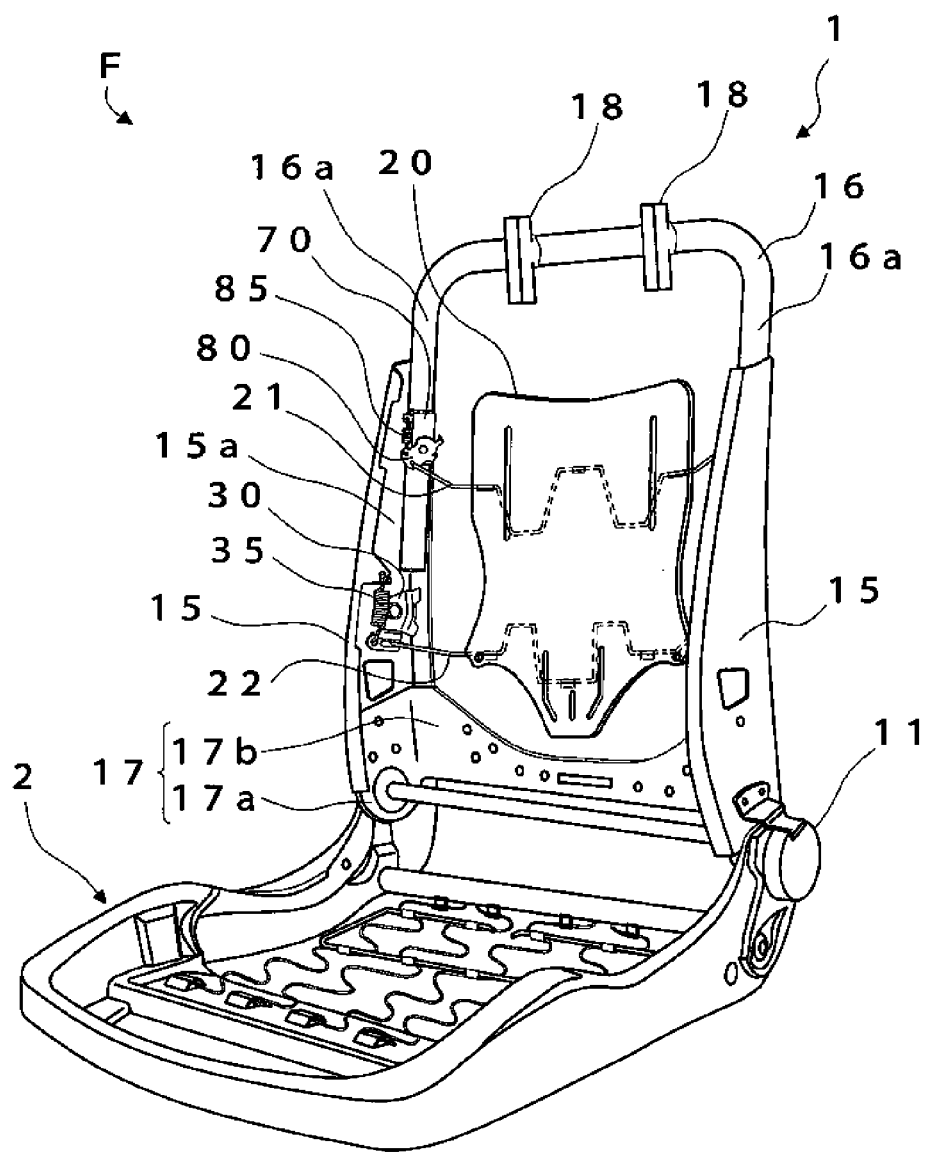
FIG. 23 is an overall perspective view of a seat frame according to a fourth embodiment of the present invention.
Figure 24A:
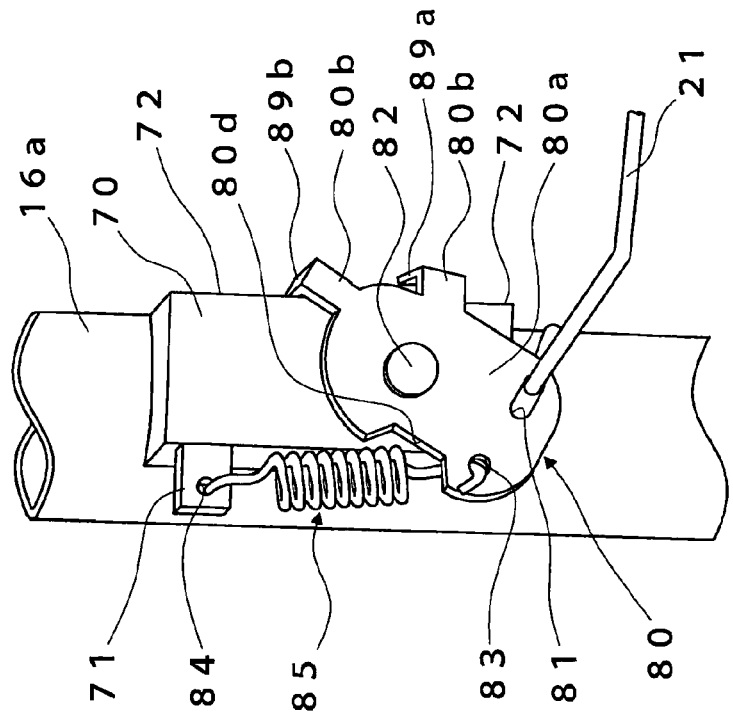
FIGS. 24A, B are perspective view diagrams illustrating the states of the upper portions of an impact reduction member and a biasing element before and after a rear-end collision according to the fourth embodiment.
Figure 24B:
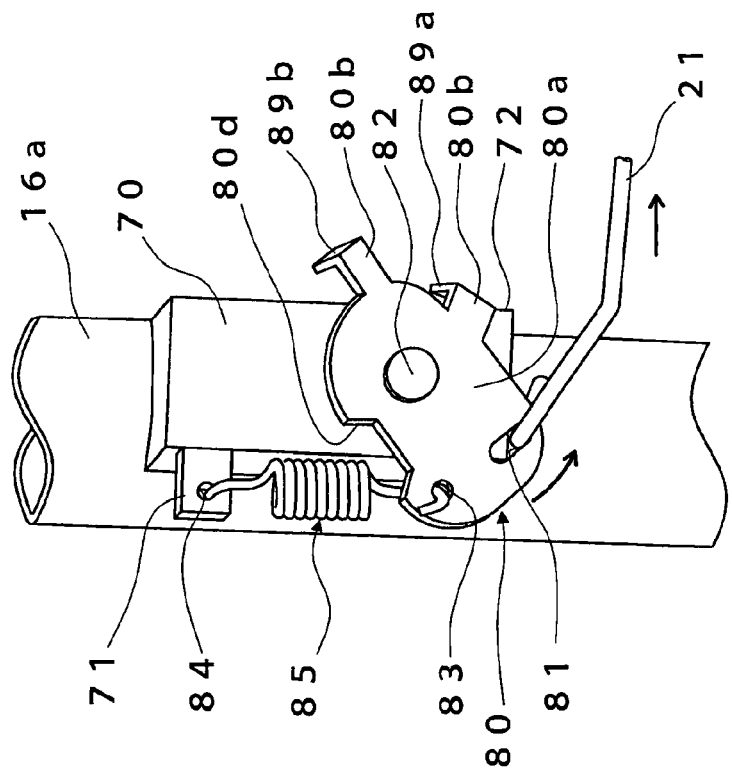

As shown in FIG. 23 and FIGS. 24A, B, base sections 70 are provided in the side surface portions 16a of the upper frame 16 through welding or the like, and the pivoting members 80, which serve as the upper impact reduction member and move under a predetermined impact load, are disposed upon these base sections 70.

Locking protrusions 71 that protrude sideways toward the front edges 15b are formed in the base sections 70, and locking holes 84, serving as locking portions for locking upper springs, are formed in the locking protrusions 71. Side surfaces 72 on the opposite side of the locking protrusions 71 make contact with rotation blocking portions 89, which will be mentioned below.

The pivoting members 80 on the upper side are supported in a freely-rotatable state by shaft portions 82 on the inner sides of the side plates 15a in the both side frames 15, lock the upper wire 21 serving as the coupling member, and are connected to extension springs 85, serving as an upper biasing element, that bias the wire 21. In other words, the configuration is such that the pivoting members 80 are linked to the biasing element, and the pressure receiving member 20 is biased toward the front of the seat back frame 1 via the coupling member.

In addition, the upper pivoting members 80 according to the present embodiment include the shaft portions 82, which are rotatable, locking portions 81 of the coupling members formed in locations that are a predetermined distance from the shaft portions 82, locking holes 83 serving as locking portions of biasing elements, and the rotation blocking portions 89 (stopper portions 89a and 89b) that block rotation.

The upper biasing element according to the present embodiment is the extension springs 85 formed by coiling a spring wire; the extension springs 85 are locked in the locking holes 83 of the pivoting members 80 and the locking holes 84 formed in the locking protrusions 71 of the base sections 70, which biases the pivoting members 80 toward the front of the seat back frame 1. Hooks for locking both ends of the extension springs 85 are formed as semicircles in both ends of the extension springs 85.

The upper rotation blocking portions 89 (stopper portions 89a and 89b) according to the present embodiment block rotation when the pivoting members 80 rotate, and extending portions 80b extending further in the outer direction than base portions 80a and continue from the outer sides of the base portions 80a that slide along the base sections 70 when the pivoting members 80 rotate along the shaft portions 82 are formed at a predetermined interval in two locations. Furthermore, cutout portions 80d are formed in a region of the base portions 80a that opposes the extension springs 85. In addition, cutout portions are also formed in the front edges 15b of the side frames 15, cutting toward the front of the vehicle and reducing the width of the front edges 15b in a region that opposes the extension springs 85; as a result, it is possible to prevent interference with the extension springs 85.

Portions of the extending portions 80b in which the ends thereof have been bent back (the backwards direction on paper in FIGS. 24A, B) form the stopper portions 89a and 89b, which regulate the rotation of the pivoting members 80. The predetermined interval between the stopper portions 89a and 89b is set so that the stopper portions 89a constantly make contact with the side surfaces 72 of the base sections 70 and block the rotation of the pivoting members 80, but the stopper portions 89b make contact with the side surfaces 72 of the base sections 70 and block the rotation when the pivoting members 80 have rotated due to a rear-end collision, in order to regulate the rotation of the pivoting members 80 between upper and lower limit positions within a set rotational range. In other words, the stopper portions 89a that set the pre-rotation initial position and the stopper portions 89b that set the post-rotation stopping position are formed at a predetermined interval to regulate the upper and lower limit positions of the set rotational range of the pivoting members 80.

The rotation blocking portions 89 (stopper portions 89a and 89b) are formed at locations that do not interfere with the upper biasing element (extension springs 85), the coupling member (wire 21), and the like. The upper and lower pivoting members 30 and 80 are configured to operate independently, and furthermore, the configuration is such that the pivoting members 30 and 80 operate independently from the headrest S3.

In the present embodiment, the pivoting members 80 are attached to the base sections 70 provided on both side surface portions 16a, and the pivoting members 80 that have been attached to both of these sections are configured to rotate independently of each other. For this reason, in the case where an off-balance load has occurred, the pivoting members 80 on the side portions on both sides rotate independently of each other in accordance with the load, and thus the body of the occupant sinks in accordance with the severity of the impact load.

During normal seating, in which an occupant is seated, tension that causes the pivoting members 80 to rotate backwards occurs via the seat back cushion 100, the pressure receiving member 20, and the wire 21 within the seat back S1; the extension springs 85 bias the pivoting members 80 to rotate toward the front of the seat back frame 1. Here, the extension springs 85 linked to the pivoting members 80 have load properties in which the extension springs 85 do not warp with a load range occurring during normal seating, and thus the pivoting members 80 are constantly stopped in the initial position by the stopper portions 89a on the initial position side making contact with the side surfaces 72 of the base sections 70. In other words, the configuration is such that a force that resists the force that rotates the pivoting members 80 and restores the pivoting members 80 into the initial state is greatest during normal seating.

Figure 25:
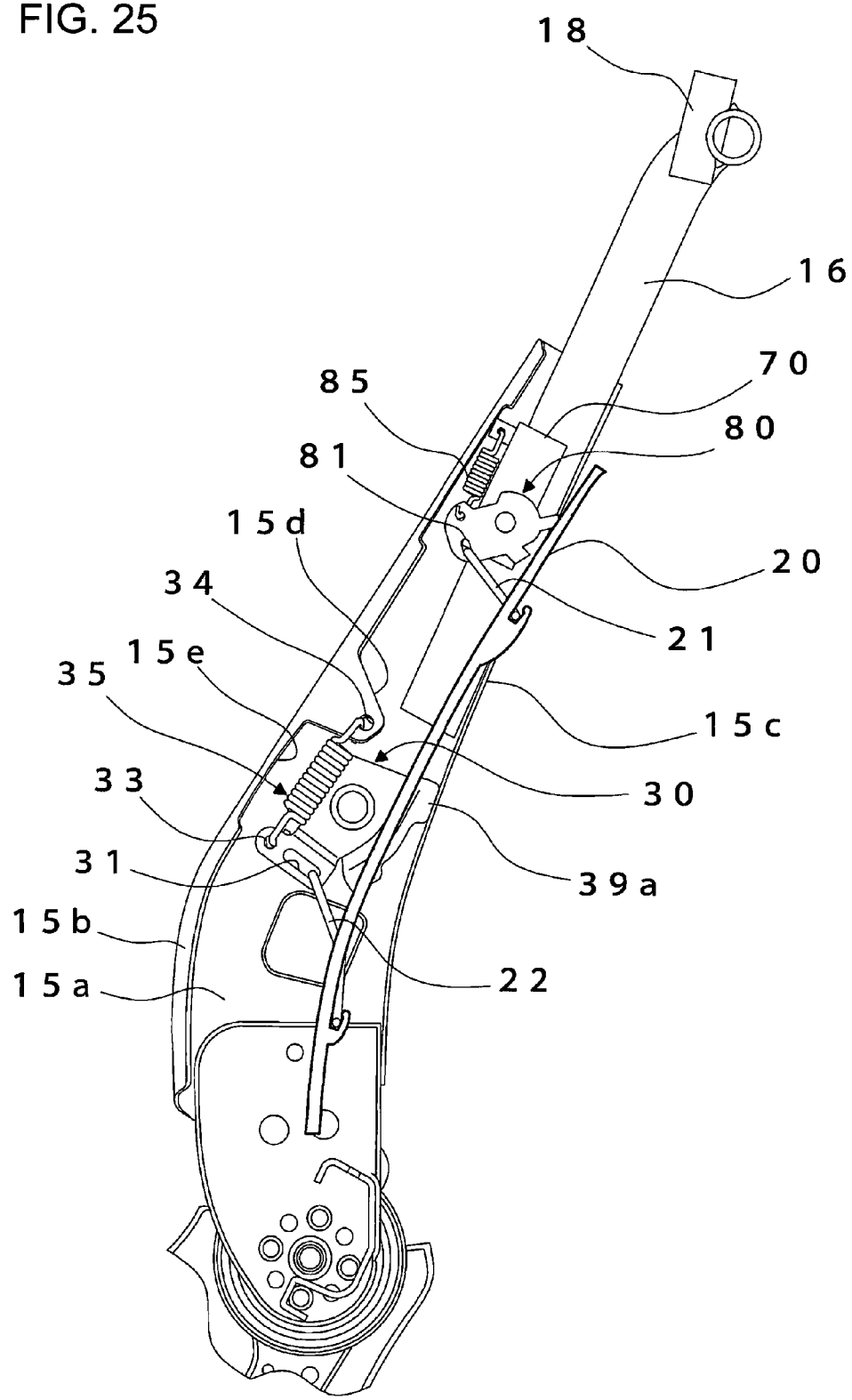
FIG. 25 is an overall cross-sectional view of a seat back frame prior to the movement of the impact reduction member according to the fourth embodiment.
Figure 26:
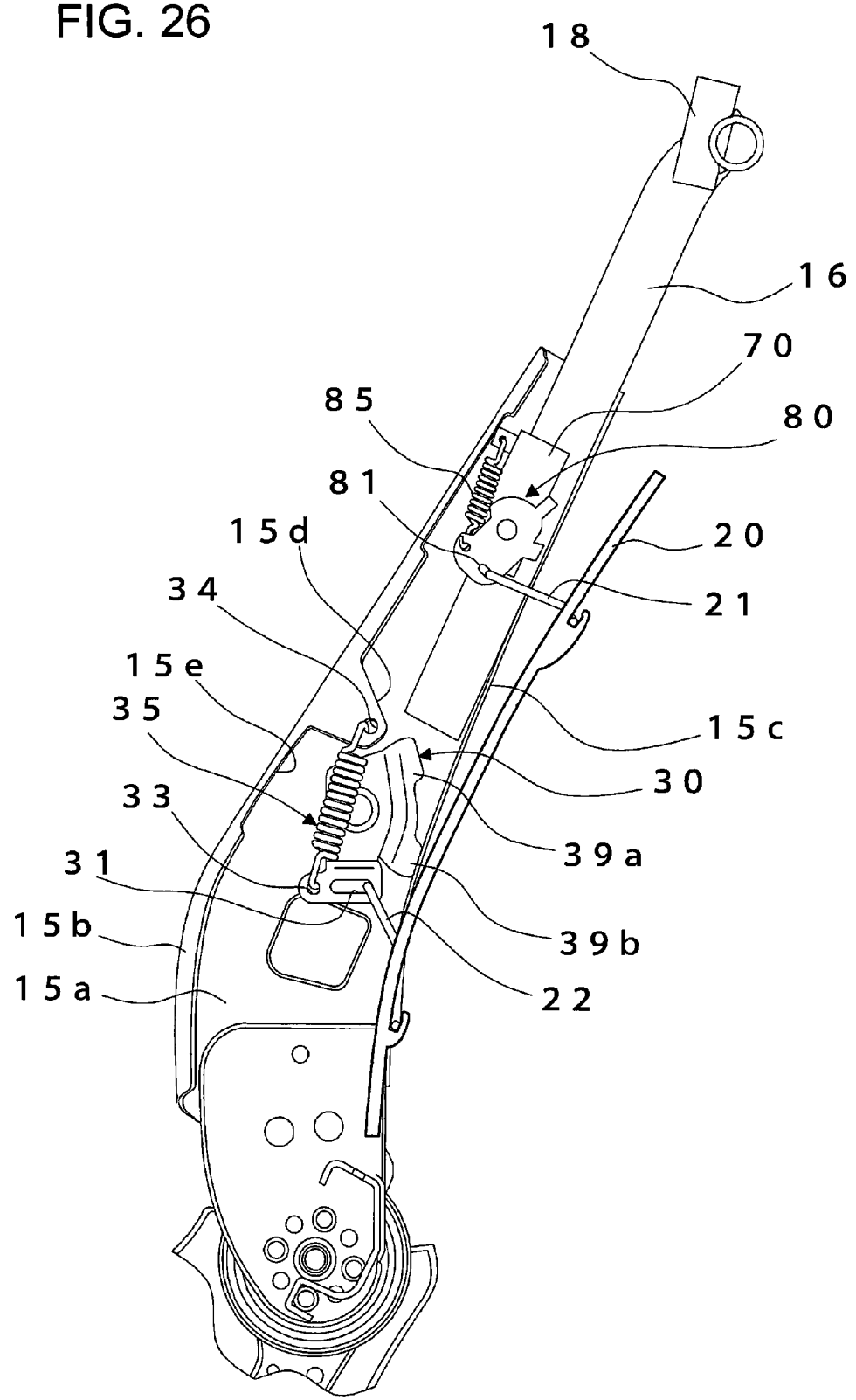
FIG. 26 is an overall cross-sectional view of the seat back frame following the movement of the impact reduction member according to the fourth embodiment.

With respect to the pivoting members 30 and 80 at the time of a rear-end collision, FIG. 25 indicates the pre-rotation impact reduction member and FIG. 26 indicates the post-rotation impact reduction member.

As shown in FIG. 26, at the time of a rear-end collision, the impact occurs from the rear, and inertia force causes the occupant to move backward; this load goes through the pressure receiving member 20 and the wires 21 and 22 that are locked in the pressure receiving member 20, and tension in the direction that causes the pivoting members 30 and 80 to rotate backward (that is, to the right in FIG. 26) is generated. The tension at this time causes the extension springs 35 and 85 that hold the pivoting members 30 and 80 in their initial positions to extend, and thus the load becomes a load that is sufficient to rotate the pivoting members 30 and 80 backward.

Then, when the pivoting members 30 and 80 rotate backward, the wires 21 and 22 that are engaged in the locking portions 31 and 81, respectively, move backward; along with this, the pressure receiving member 20 that is locked to the wires 21 and 22 and the seat back cushion 100 that is supported by the pressure receiving member 20 move backward, which makes it possible to cause the occupant to sink into the seat back S1. Note that the two wires 21 and 22 locked in the pressure receiving member 20 according to the present embodiment have concavo-convex shapes formed therein, and thus deform significantly due to a load that is greater than or equal to a predetermined load (that is, a load greater than a load that causes the pivoting members 30 and 80 to rotate), and thus the pressure receiving member 20 moves backward with a higher amount of movement. Accordingly, the body of the occupant sinks into the seat back S1 to a higher degree.

Fourth Embodiment Variations

FIG. 27 through FIG. 33 are overall perspective views illustrating different variations on the fourth embodiment. Elements, disposal locations, and the like that are the same as those in the first or fourth embodiments will be given the same reference numerals in the variations, and descriptions thereof will be omitted.

Figure 27:
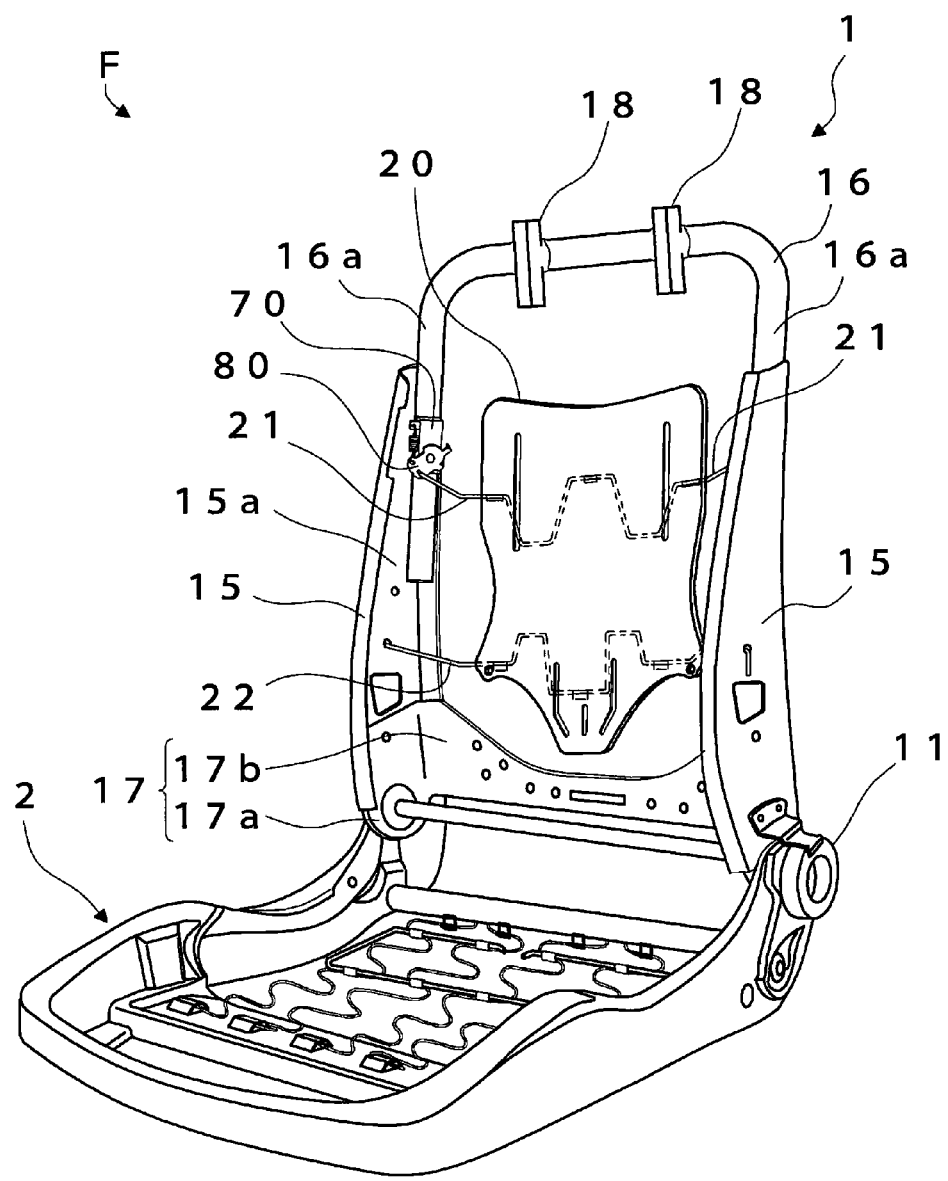
FIG. 27 is an overall perspective view of a seat frame according to a variation on the fourth embodiment.

FIG. 27 illustrates an example in which the pivoting members 80 are employed as the upper impact reduction member and the pivoting members 30 are not provided below; the wire 22 serving as the coupling member is directly locked in the side plates 15a of the side frames 15. In this example, holes are formed in the side plates 15a, and the wire 22 is attached thereto. The attachment of the wire 22 to the side plates 15a shown in FIG. 27 is merely an example, and the ends of the wire 22 may have bent portions or the like formed therein in order to prevent the wire 22 from pulled out, permit the wire 22 to warp, and the like.

Figure 28:
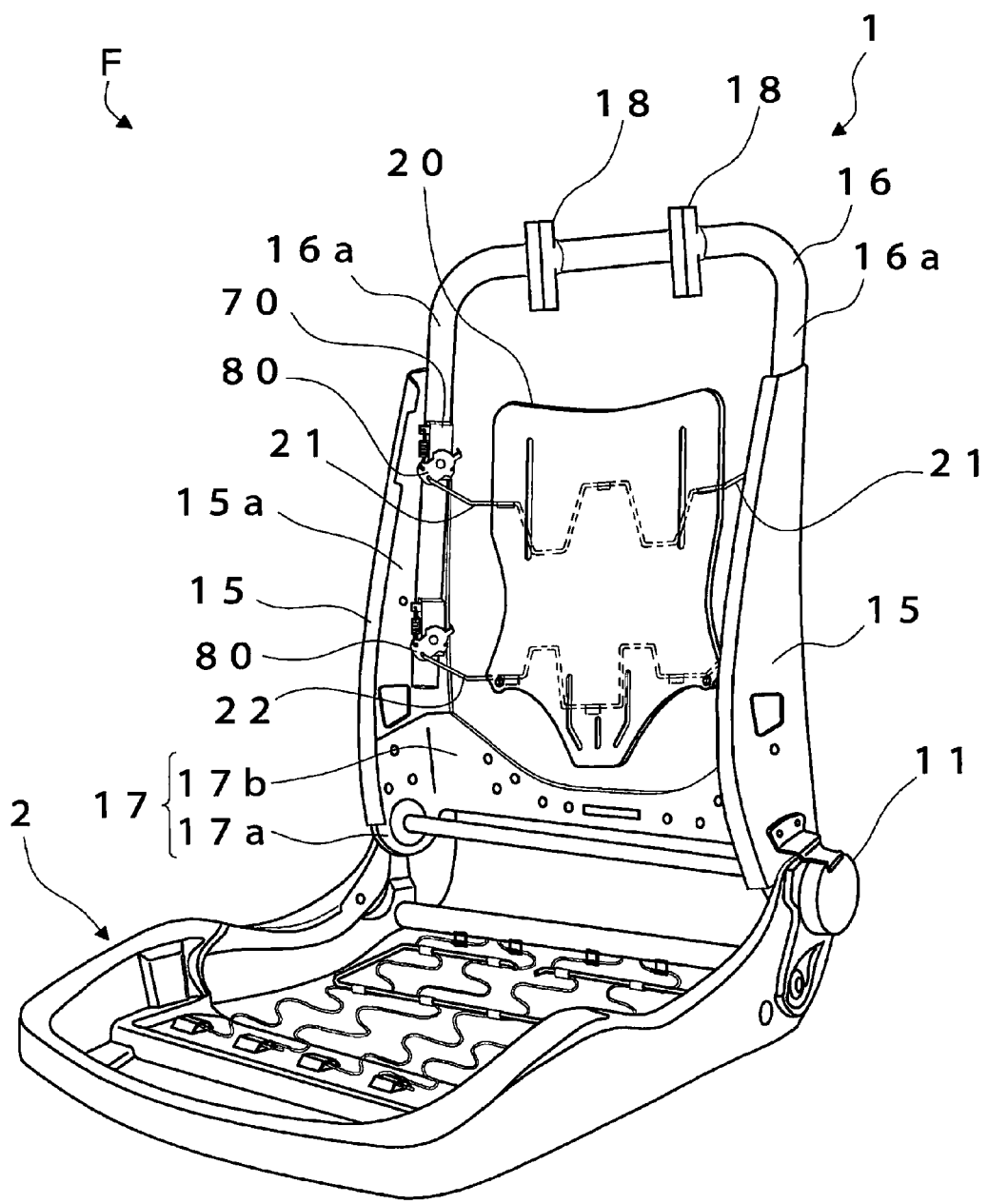
FIG. 28 is an overall perspective view of a seat frame according to another variation on the fourth embodiment.

FIG. 28 illustrates an example in which the upper and lower impact reduction members employ the same pivoting members 80. Using the same members in this manner makes it possible to reduce the number of components and prevent mistaken assemblies.

Figure 29:
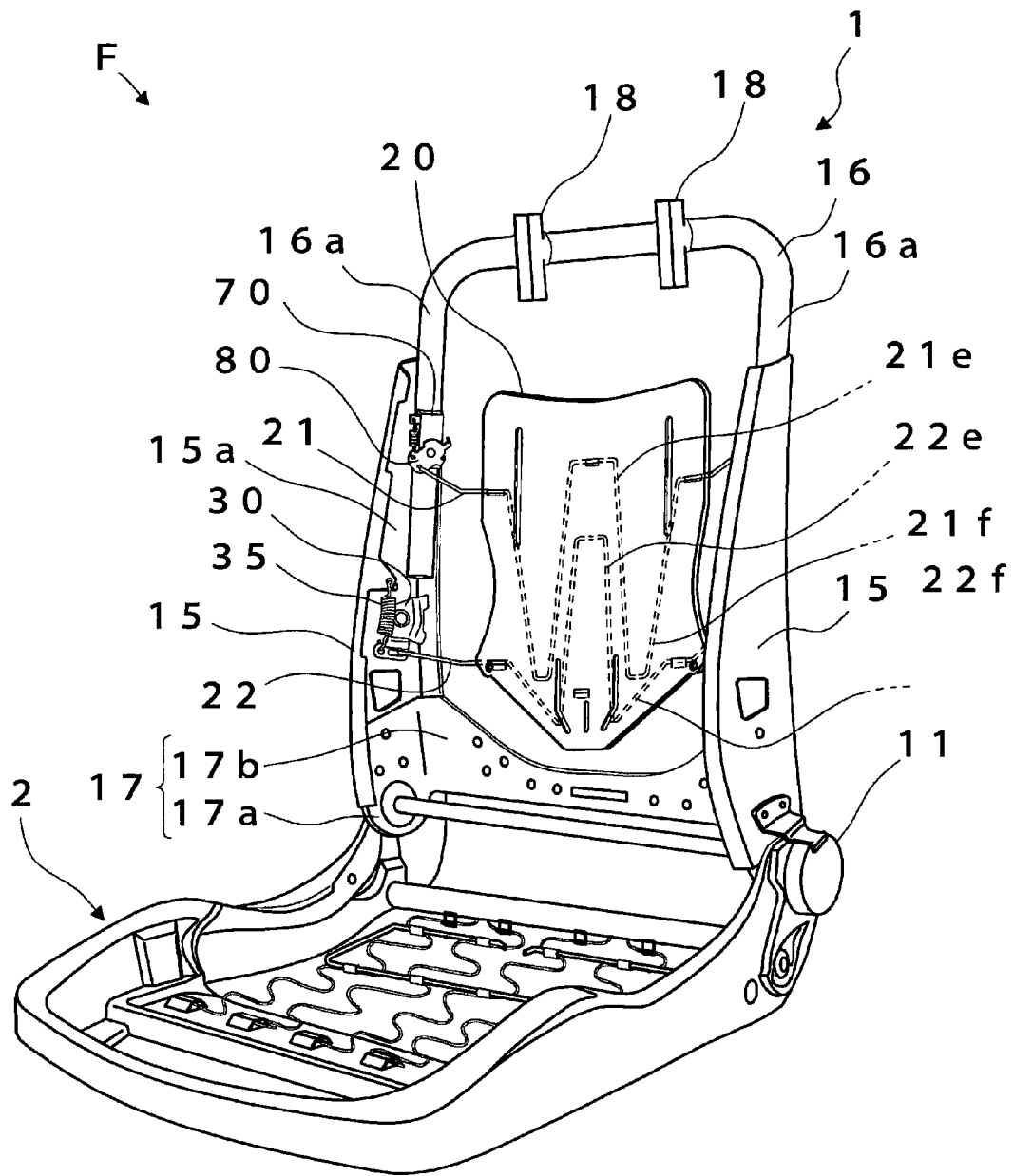
FIG. 29 is an overall perspective view of a seat frame according to another variation on the fourth embodiment.

FIG. 29 illustrates an example in which the disposal regions of the two wires 21 and 22, serving as the coupling member and extending on the upper side and the lower side, overlap in the upward and downward directions. In other words, protruding and recessed portions 21e, 21f, 22e, and 22f are formed in the wires 21 and 22, respectively, that lock with the pressure receiving member 20.

In other words, the lower wire 22 and the upper wire 21 are formed in a bent manner so that the protruding and recessed portions 21e, 21f, 22e, and 22f oppose each other, and the lower wire 22 is provided to follow the shape of the lower end of the pressure receiving member 20. The wires 21 and 22 are disposed so that the protruding portion 22e of the lower wire 22 enters into the protruding portion 21e of the upper wire 21, and the recessed portion 21f of the upper wire 21 enters into the recessed portion 22f of the lower wire 22 to extend downward to the lower back region of the occupant. Because the upper wire 21 extends downward to the lower back region of the occupant, the load from the lower back region of the occupant is even easier to transmit.

In this example, the recessed portion 21f of the upper wire 21 extends to a position that is further below the locking portions 31, which serve as linking portions between the lower wire 22 and the pivoting members 30. The transmission efficiency is further improved by extending the recessed portion 21f downward in this manner.

Furthermore, forming the protruding and recessed portions 21e, 21f, 22e, and 22f makes it easier to effectively transmit the load from the occupant to the pivoting members 30 and 80. This is particularly useful when transmitting the load from the lower back region of the occupant to the upper pivoting members 80.

Furthermore, as shown in FIG. 29, because the upper wire 21 extends downward to the lower back region of the occupant, the load from the lower back region of the occupant is even easier to transmit.

Figure 30:
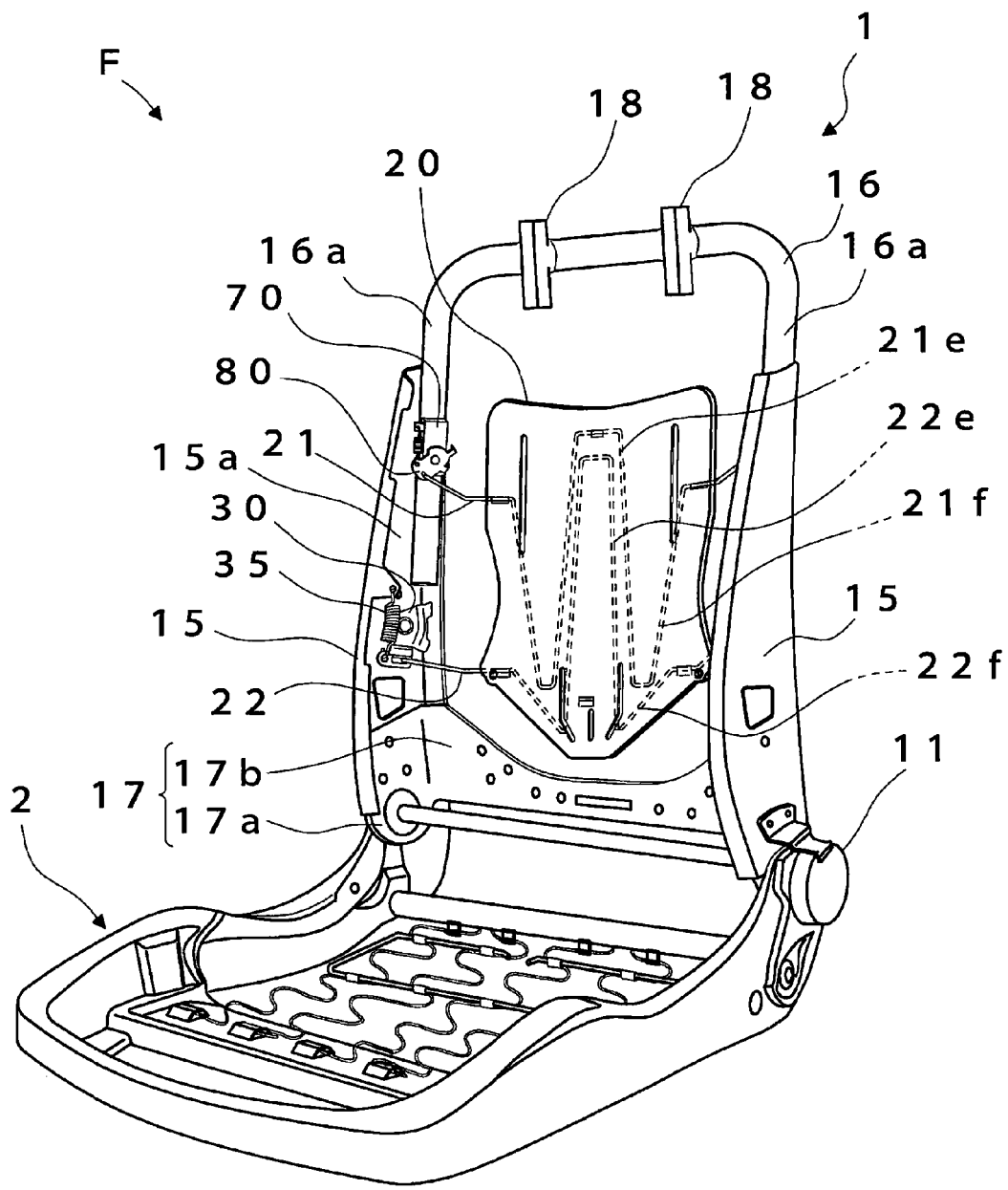
FIG. 30 is an overall perspective view of a seat frame according to another variation on the fourth embodiment.

Here, if the lower wire 22 extends to a position that is higher than the linking portions between the upper wire 21 and the pivoting members 80 as shown in the example in FIG. 30, the lower wire 22 extends upward, and thus the transmission efficiency is further improved.

Figure 31:
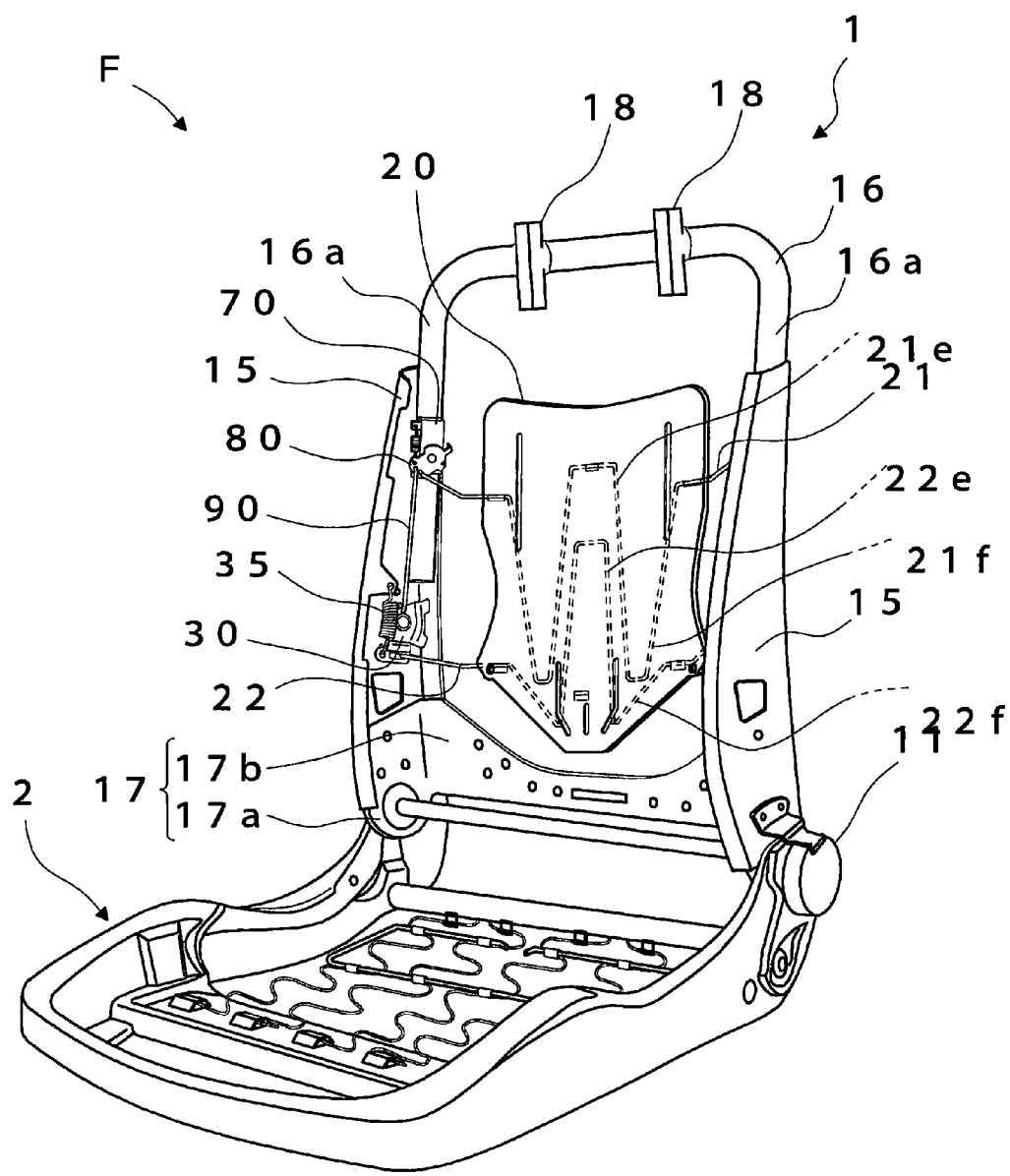
FIG. 31 is an overall perspective view of a seat frame according to another variation on the fourth embodiment.

In addition, linking portions that link the upper pivoting members 80 and the lower pivoting members 30 may be provided, as shown in the example illustrated in FIG. 31. For example, if the upper pivoting members 80 and the lower pivoting members 30 are linked using wires or linkages, the loads on the upper and lower sides are transmitted by the linking portions, which makes it possible to ensure a certain amount of movement for the occupant.

Figure 32:
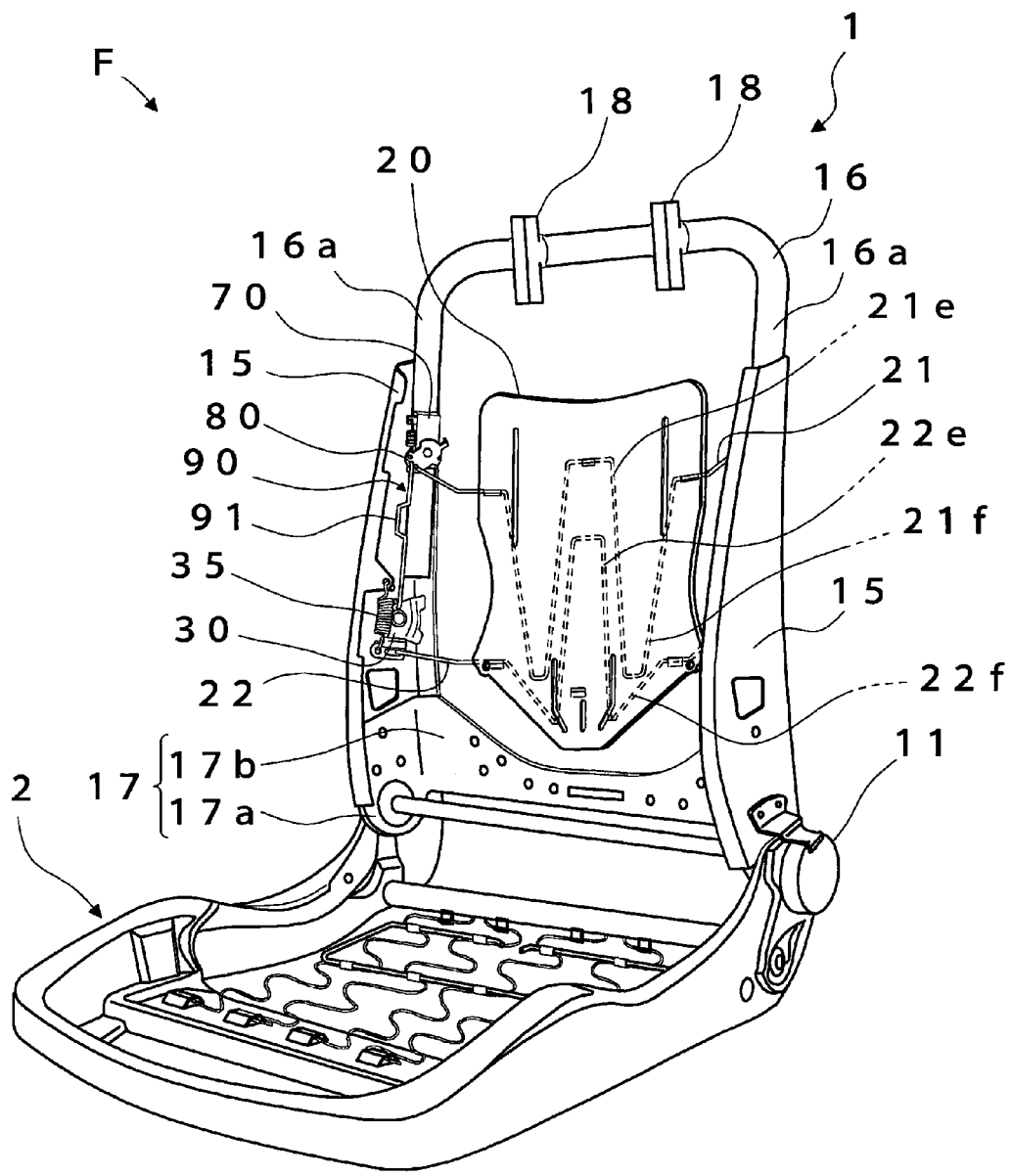
FIG. 32 is an overall perspective view of a seat frame according to another variation on the fourth embodiment.

In the example shown in FIG. 31, in the case where wires 90 are used as the linking portions, it is preferable for, for example, bent areas 91 (protruding bent areas that extend toward the front of the vehicle, in this example) to be formed in the wires 90, as shown in the example illustrated in FIG. 32. The wires 90 are configured to deform when a set load has been passed. According to this configuration, even if sticking has occurred between the upper and lower sides, the bent area 91 of the wire 90 on one of the sides deforms, thus making it possible to ensure that the body of the occupant sinks.

Figure 33:
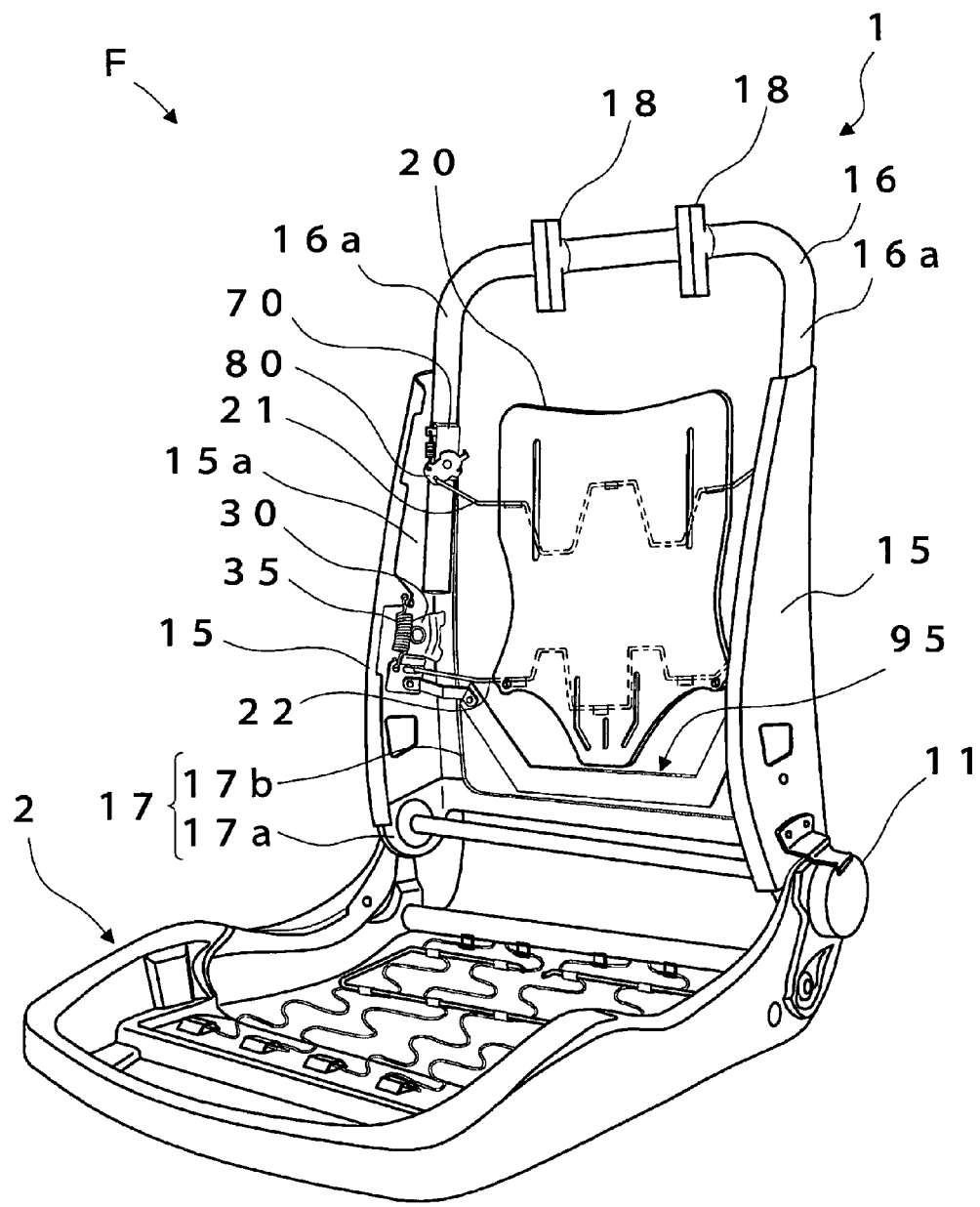
FIG. 33 is an overall perspective view of a seat frame according to another variation on the fourth embodiment.

Furthermore, as illustrated by the example shown in FIG. 33, the lower left and right pivoting members 30 are linked by a coupling member 95 that moves or rotates the pivoting members 30 at the same time. In the present embodiment, multiple long plate members are used as the coupling member 95, but the coupling member 95 can be configured of a wire, a linkage, or the like. By employing such a configuration, the left and right pivoting members 30 move or rotate in synchronization, and thus variations in the load on the left and right are suppressed. For this reason, it is possible to cause the occupant to move toward the rear of the vehicle in a stable manner.

The impact reduction members according to the aforementioned embodiments (that is, the pivoting members 30, the slide members 60, and the pivoting members 80) have the aforementioned rotational or mobile properties with respect to tension occurring via the wires 22 and 21, and therefore in the case where a rear-end collision has occurred, the occupant sinks into the seat back cushion 100 of the seat back S1 with certainty and with efficiency.

At this time, by sinking into the seat back S1, the back region of the occupant moves backward, but because the position of the headrest S3 does not change relative thereto, the gap between the headrest S3 and the head region of the occupant is reduced; accordingly, the head region is supported by the headrest S3, which has an effect of effectively reducing impacts on the neck region.

Although the aforementioned embodiments illustrate examples in which the impact reduction member is provided in both of the side frames 15, the configuration may be such that the impact reduction member is provided only in one of the side frames 15. In this case, the side frame 15 in which the impact reduction member is not provided can be configured so that the coupling member (the wires 21 and 22) lock directly thereinto.

In addition, according to the aforementioned embodiments, when the occupant sinks into the seat back S1, because movement of the seat back S1 is not associated with the forward movement of the headrest S3, there is little loss in the movement energy of the occupant in the rearward direction at the time of a rear-end collision, which makes it possible to cause the occupant to sink more deeply into the seat back S1.

In this manner, the vehicle seat S according to the present invention has characteristics such as the aforementioned impact reduction member, and thus causes the occupant to sink deeply into the seat back S1 at the time of a rear-end collision, which effectively reduces impacts on the neck region and the like of the occupant; however, it is desirable for the occupant to sink as deeply as possible into the seat back S1 at the time of a rear-end collision. Accordingly, it is preferable to provide a seat back cushion having a configuration that efficiently transmits the load exerted on the seat back S1 from the upper body of the occupant to the pressure receiving member 20 without interfering with the sinking of the occupant. Hereinafter, a seat back cushion suited to the efficient transmission of a load exerted on the seat back S1 from the upper body of the occupant, and a pressure receiving member suited to increasing the degree by which the occupant sinks into the seat back S1, will be described using FIG. 34 through FIG. 38.

Figure 34:
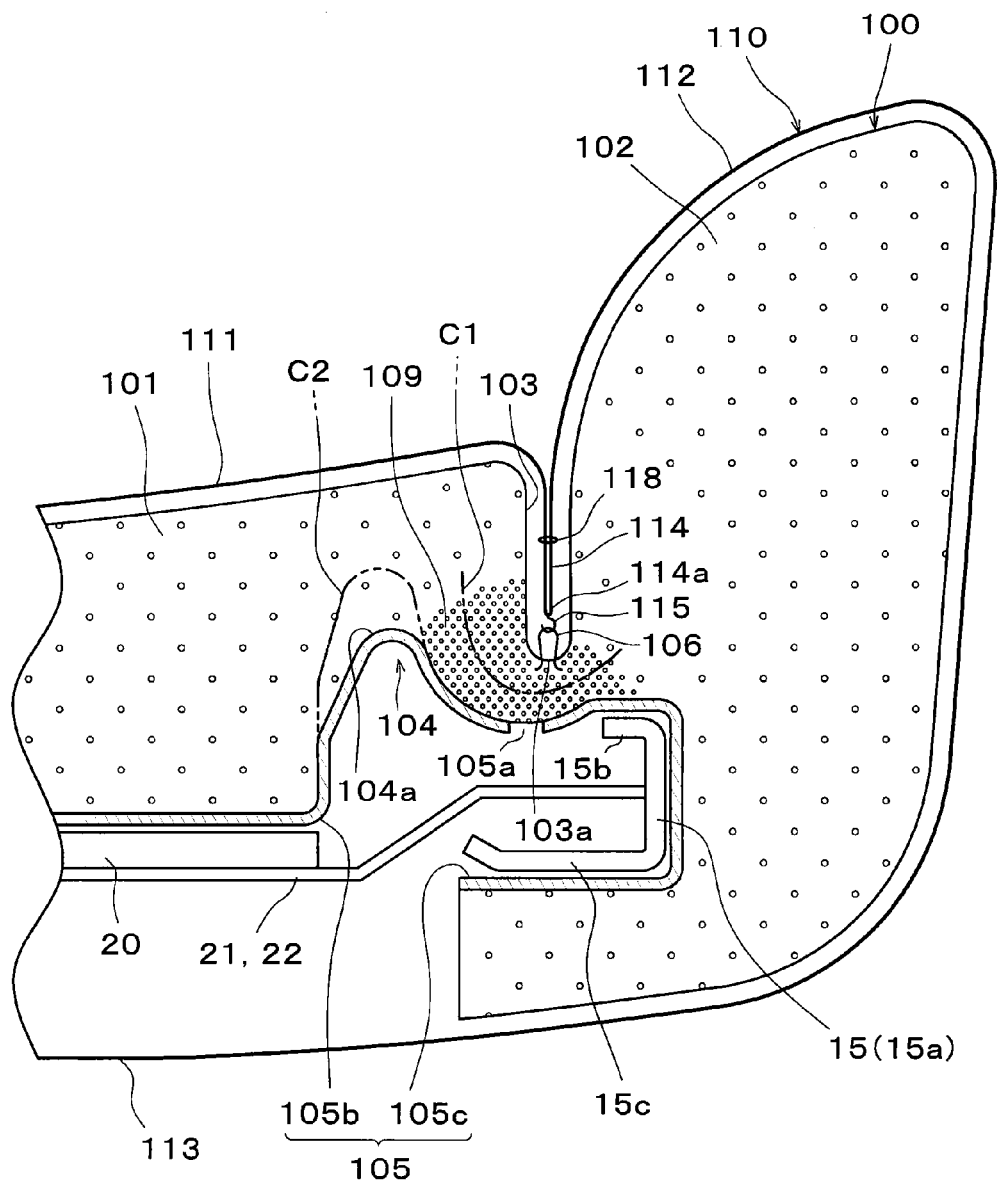
FIG. 34 is a cross-sectional view taken along the B-B line shown in FIG. 1.
Figure 36:
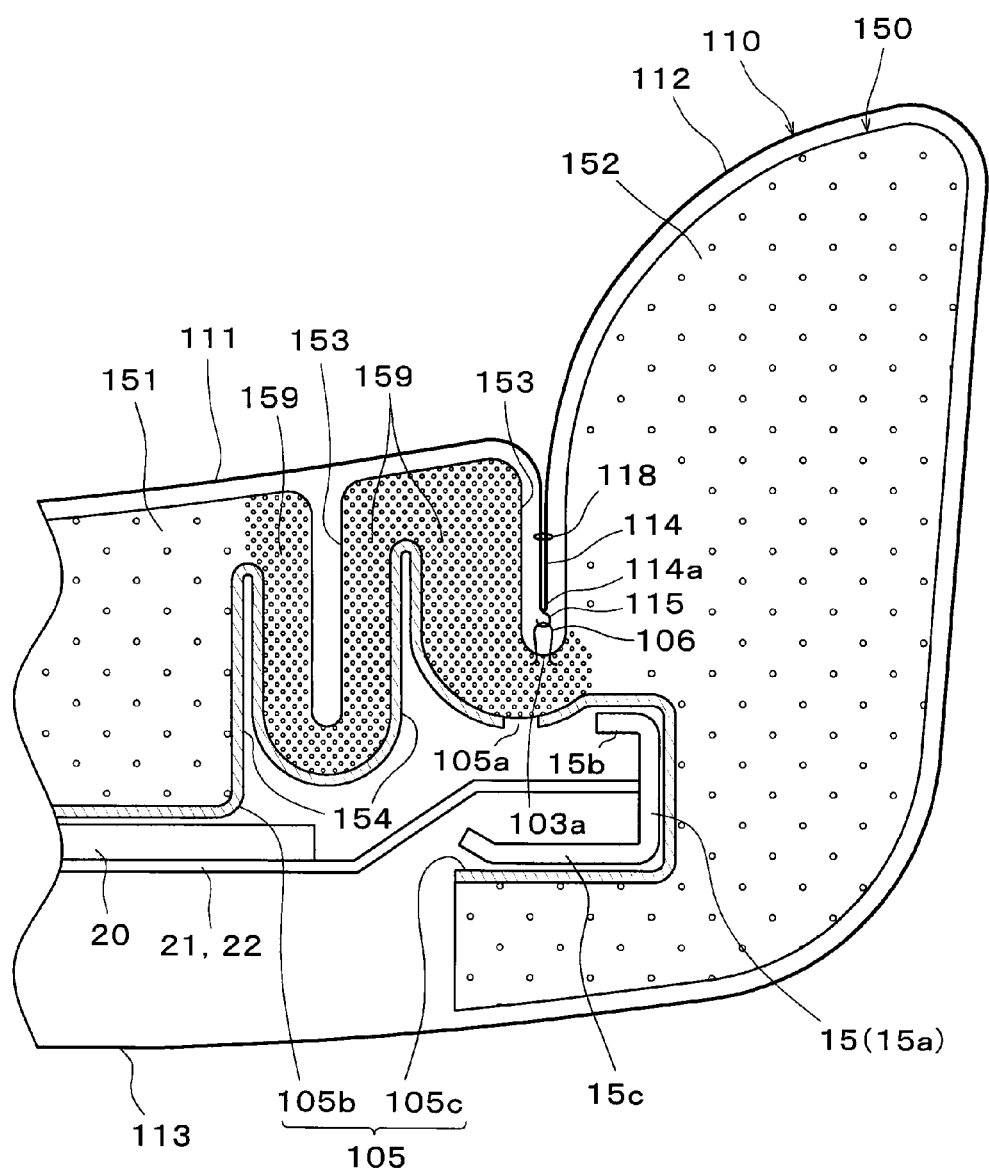
FIG. 36 is a cross-sectional view similar to that shown in FIG. 34, illustrating a variation on the seat back cushion.

FIG. 34 is a cross-sectional view taken along the B-B line shown in FIG. 1, FIG. 35A is a horizontal cross-sectional view of a seat back cushion in a normal state, FIG. 35B is a horizontal cross-sectional view of a seat back cushion at the time of a rear-end collision, and FIG. 36 is a similar cross-sectional view as that in FIG. 34, illustrating a variation on the seat back cushion. Note that the seat back cushion described hereinafter can be disposed in any of the seat back frames 1 illustrated in the foregoing embodiments in the same manner.

As shown in FIG. 34, the seat back cushion 100 is provided on the outside of the seat back frame 1, and covering the front of the pressure receiving member 20 and the side frames 15 and the sides and the back of the side frames 15. The skin material 110, configured of cloth, leather, or the like, is provided on the outside of the seat back cushion 100.

The seat back cushion 100 includes a central portion 101 that supports the upper body area of the occupant and side portions 102 provided on both sides of the central portion 101 in the left and right directions (see FIG. 35 as well) to be continuous with the central portion 101. The side portions 102 are normally configured to protrude slightly more forward than the central portion 101 and support the sides of the body of the occupant, but the embodiment is not limited thereto, and the side portions 102 may be formed to be approximately flush with the central portion 101. In this case, it is preferable to indicate the position in which the occupant should sit using stitches in the skin material, a design, or the like, thus enabling the occupant to sit with his or her upper body aligned in front of the pressure receiving member 20.

Front surface grooves 103, configured of recesses provided continuously in the upward and downward directions, are formed in the front surface of the seat back cushion 100 along the border between the central portion 101 and the left and right side portions 102, and serve as examples of a front surface recess. Rear surface grooves 104, serving as examples of a rear surface recess that extends continuously in the upward and downward directions, are formed in the rear surface of the seat back cushion 100 along the border between the central portion 101 and the left and right side portions 102.

The rear surface grooves 104 are disposed on the insides of the respective front surface grooves 103 to the left and right thereof. Accordingly, connection portions 109 between the central portion 101 and the side portions 102 (portions indicated by the dark hatching) extend inward from the side portions 102 in the left and right directions, respectively, and then extend forward, as indicated by a connection portion center line C1, shown in FIG. 34. Because the rear surface grooves 104 are provided, the seat back cushion 100 is thinner between base portions 104a of the rear surface grooves 104 and the front surface of the seat back cushion 100. Accordingly, it is easy for the connection portions 109 to deform, which makes it easy for the central portion 101 to move backwards relative to the side portions 102.

The rear surface grooves 104 are disposed so that the base portions 104a thereof are positioned further forward than base portions 103a of the surface grooves 103. Accordingly, as indicated by the connection portion center line C1 shown in FIG. 34, the connection portions 109 have a shape in which the inside portions thereof in particular extend in the forward direction, or in other words, have a shape that is long in the forward direction, and thus it is easier for the central portion 101 to move backward relative to the side portions 102.

Locking rings 106, which secure the skin material 110, mentioned below, are provided in multiple at the top and bottom (although only one as shown in the diagrams) in the base portions 103a of the surface grooves 103.

The skin material 110 includes a central skin portion 111 that covers the front surface of the central portion 101 of the seat back cushion 100, shoulder skin portions 112 that cover the side portions 102, and a rear skin portion 113 that covers the rear surface of the seat back S1. The areas where the central skin portion 111 and the shoulder skin portions 112 connect are insertion areas 114 that are inserted into the front surface grooves 103, and seams are created in the insertion areas 114 by seam portions 118, which prevent the insertion areas 114 from expanding. Hooks 115 are provided at tip ends 114a (in the lower side of FIG. 34) of the insertion areas 114. The hooks 115 are provided in correspondence with the locking rings 106, and engage with respective locking rings 106.

The deeper the depth of the rear surface grooves 104 is, the easier it is for the central portion 101 to move in the backward direction due to the deformation of the connection portions 109; accordingly, it is desirable for the positions of the base portions 104a of the rear surface grooves 104 to be further forward than the tip ends 114a of the insertion areas 114, as with the shape of the rear surface grooves 104 indicated by the imaginary line C2 in FIG. 34.

A back fabric 105 for reinforcing the seat back cushion 100 is provided on the rear surface of the seat back cushion 100. This back fabric 105 uses a woven fabric, a nonwoven fabric, a plastic sheet, or the like. Cuts 105a that are continuous in the upward and downward directions are formed in the back fabric 105 in locations corresponding to the rear surfaces of the connection portions 109 (that is, locations corresponding to the borders). As shown in FIG. 34, these cuts 105a may be formed as so-called slits so that the back fabric 105b corresponding to the central portion 101 and the back fabric 105c corresponding to the side portions 102 are separated by a predetermined distance in the left and right directions, or, although not shown, may be formed by cutting the back fabric 105 with a utility knife or the like so that the back fabric 105b and the back fabric 105c are almost unseparated in the left and right directions. The cuts 105a make it easy for the connection portions 109 to deform even in the case where the seat back cushion 100 is reinforced by the back fabric 105.

The deformation of this seat back cushion 100 at the time of a rear-end collision will be described hereinafter with reference to FIG. 35. As illustrated in FIG. 35(a), normally, the inner end of the connection portion center line C1 faces in essentially the forward direction. When a rear-end collision occurs, as shown in FIG. 35(b), the central portion 101 is pushed backward relative to the side portions 102 by the load $F_1$ of the occupant, the connection portions 109 deform in the backward direction, and the inner end of the connection portion center line C1 faces more to the side (the inside) than in FIG. 35(a). In this manner, because the connection portions 109 deform while changing their orientations like an arm, it is easy for the central portion 101 to move significantly backward relative to the side portions 102. In other words, when the occupant moves backward at the time of a rear-end collision, it is difficult for the seat back cushion 100 to act as resistance, and thus the load from the upper body of the occupant on the seat back S1 (the central portion 101 of the seat back cushion 100) is efficiently transmitted to the pressure receiving member 20.

Furthermore, with the vehicle seat S according to the present embodiment, the base portions 104a of the rear surface grooves 104 are positioned further forward than the base portions 103a of the surface grooves 103, the tip ends 114a of the insertion areas 114 in the skin material 110, and the like, which makes the connection portions 109 particularly easy to deform; this in turn makes it easy for the central portion 101 to move backward relative to the side portions 102.

In addition, although the vehicle seat S includes the back fabric 105 on the rear surface of the seat back cushion 100, the back fabric 105 has the cuts 105a extending in the upward and downward directions in correspondence with the connection portions 109, and thus it is difficult for the back fabric 105 to interfere with the deformation of the connection portions 109 at the time of a rear-end collision, which in turn makes it easier for the central portion 101 to move backward relative to the side portions 102.

In addition, the vicinity of the areas in the side frames 15 at which the pivoting members 30 are disposed are almost entirely covered by the front edges 15b and rear edges 15c in which the edges of the side frames 15 are bent to extend inward in the left and right directions, and thus other members such as cushions, harnesses, and the like are prevented from entering and becoming caught in front and back of the pivoting members 30, which makes it possible to secure a sufficient stroke for the pivoting members 30. Accordingly, the reliability of causing the occupant to sink deeply into the seat back S1 is increased.

Although various embodiments of the seat back cushion 100 have been described thus far, many modifications to the present invention can be carried out, as indicated by the variations described hereinafter. Note that in the aforementioned embodiments and the variations described hereinafter, members such as the seat back cushion 100, harnesses, and the like are disposed to be contained within the seat back frame 1, and thus it is useful to secure even small amounts of space within the seat back S1 to make it easier for the occupant to sink into the seat back S1.

Although the surface grooves 103 extending continuously upward and downward are given as examples of the front surface recesses in the aforementioned embodiments, the front surface recesses may be recesses arranged intermittently upward and downward. However, the connection portions 109 can deform more easily if the front surface recesses are groove shapes configured of recesses formed in a continuous manner, as in the aforementioned embodiments. Although the rear surface grooves 104 extending continuously upward and downward are given as examples of the rear surface recesses in the aforementioned embodiments, the rear surface recesses may be recesses arranged intermittently upward and downward. However, the connection portions 109 can deform more easily if the rear surface recesses are groove shapes configured of recesses formed in a continuous manner, as in the aforementioned embodiments.

Although cuts extending continuously in the upward and downward directions are indicated as examples of the cuts in the back fabric 105 in the aforementioned embodiments, the cuts according to the present invention may be so-called perforation-shaped cuts extending intermittently in the upward and downward directions.

Although the aforementioned embodiments describe only one each of the front surface recess and the rear surface recess, a connection portion 159 of a seat back cushion 150 may be formed in an accordion shape by providing front surface grooves 153 as the front surface recesses and rear surface grooves 154 as rear surface recesses in an alternating fashion, as shown in FIG. 36. According to this embodiment, the connection portion 159 deforms more easily, which makes it easier for a central portion 151 to move backward relative to side portions 152.

Although the back fabric 105 is provided on the rear surface of the seat back cushion 100 in the aforementioned embodiments, a stay cloth similar to the back fabric 105 may be provided spanning across at least the central portion 101 and the side portions 102 of the front surface of the seat back cushion 100. In this case, in order to make it easier for the connection portions 109 to deform at the areas corresponding to the borders between the central portion 101 and the side portions 102, it is preferable to provide a fractured portion, or in other words, portions cut continuously upward and downward, portions cut intermittently such as perforations, or portions that are thinner and weaker, as with the cuts 105a in the back fabric 105. For example, it is preferable to provide perforations extending upward and downward at areas where the stay cloth applied to the front surface of the seat back cushion 100 is stretched over the front surface recess (the surface grooves 103). By doing so, the load exerted on the stay cloth at the time of a rear-end collision will be concentrated on the perforated portion, and the stay cloth will tear and the connection portions 109 will break in some cases as a result; this makes it easier for the central portion 101 to move in the backward direction.

Furthermore, this type of stay cloth may be provided on the rear of the skin material 110 by adhering or sewing the stay cloth thereto, rather than adhering the stay cloth to the seat back cushion 100. In this case, it is preferable to provide a fractured portion in the stay cloth extending upward and downward in the area that corresponds to the borders between the central portion 101 and the side portions 102, and corresponding, for example, to the insertion areas 114. This also ensures that the load occurring at the time of a rear-end collision is concentrated on the areas of the skin material 110 corresponding to the fractured portions of the stay cloth, and thus the stay cloth and skin material 110 break easily at the fractured portions, making it easier for the central portion 101 of the seat back cushion 100 to move backward.

Furthermore, fractured portions may be provided in the skin material 110 itself, in areas corresponding to the borders between the central portion 101 and the side portions 102 in the seat back cushion 100. This makes it easier for the skin material 110 to break at the fractured portions at the time of a rear-end collision and the central portion 101 to move backward.

In addition, by making it easy for the pressure receiving member 20 to deform, it is made easier for the occupant to move backward at the time of a rear-end collision.

Figure 37A:
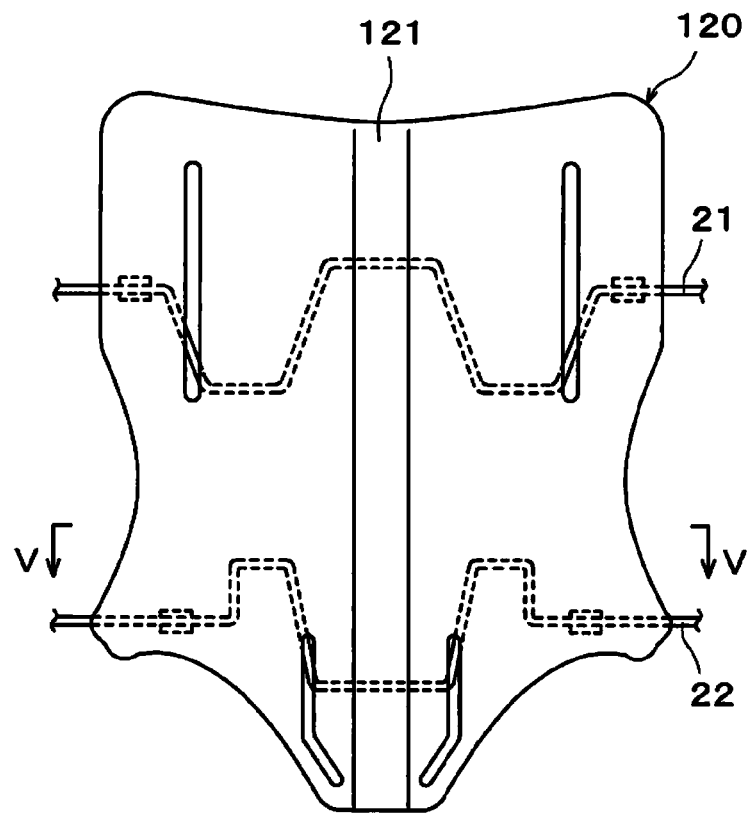
FIGS. 37A, B are front and top view diagrams illustrating a first variation on a pressure receiving member.
Figure 37B:
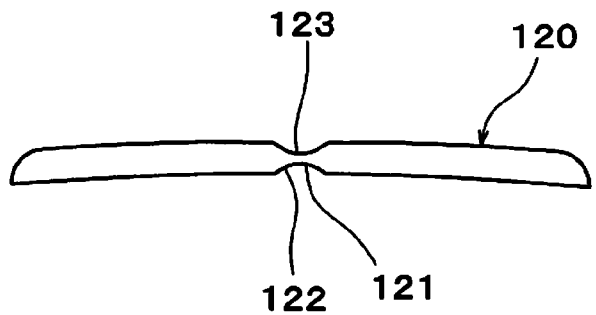
Figure 38A:
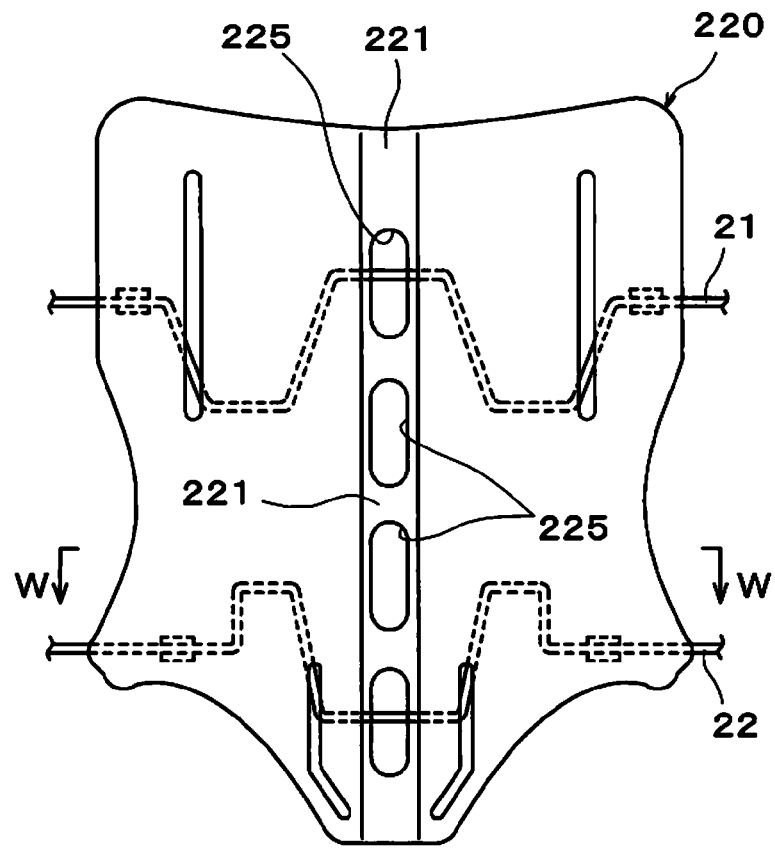
FIGS. 38A, B are front and top view diagrams illustrating a second variation on a pressure receiving member.
Figure 38B:
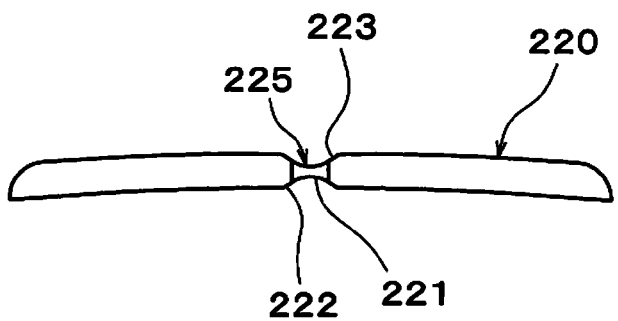

FIGS. 37A and 38B are front and top view diagrams illustrating first and second variations on the pressure receiving member, where FIG. 37A is a front view illustrating the first variation on the pressure receiving member, FIG. 37B is a cross-sectional view taken along the V-V line shown in FIG. 37A, FIG. 38A is a front view illustrating the second variation on the pressure receiving member, and FIG. 38B is a cross-sectional view taken along the W-W line shown in FIG. 38A.

As shown in FIGS. 37A and B, a pressure receiving member 120 according to the first variation has a thin portion 121 formed in the center in the horizontal direction, extending vertically across the entirety of the pressure receiving member 120. The thin portion 121 is formed so that a recess 122 is provided in the front surface of the pressure receiving member 120 and a recess 123 is provided in the rear surface of the pressure receiving member 120. The upper and lower wires 21 and 22 are configured of a material and at a diameter that is makes the wires suitably easy to deform, so as not to interfere with the bending of the pressure receiving member 120 at the thin portion 121. Providing such a thin portion 121 makes it easy for the pressure receiving member 120 to bend at the thin portion 121 at the time of a rear-end collision, and makes it easy for the occupant to move backward. Note that the thin portion 121 may also be provided to extend only partway in the upward and downward directions of the pressure receiving member 120.

On the other hand, as shown in FIGS. 38A and B, a pressure receiving member 220 according to the second variation has a thin portion 221 formed in the center in the horizontal direction, extending vertically across the entirety of the pressure receiving member 220, and holes 225 are formed to be arranged intermittently in the thin portion 221. The thin portion 221 is formed so that a recess 222 is provided in the front surface of the pressure receiving member 220 and a recess 223 is provided in the rear surface of the pressure receiving member 220. Providing such a thin portion 221 and the holes 225 makes it easy for the pressure receiving member 220 to fracture at the thin portion 221 at the time of a rear-end collision, and makes it easy for the occupant to move backward.

When the pressure receiving member within the seat back is pushed by a load that is greater than or equal to a predetermined load by the upper body of the occupant at the time of a rear-end collision and the upper body of the occupant sinks into the seat back, it is desirable for the occupant to sink as deeply as possible into the seat back. According to the vehicle seat described in the aforementioned embodiments, the load from the upper body of the occupant on the seat back at the time of a rear-end collision can efficiently be transmitted to the pressure receiving member, and thus the upper body of the occupant sinks significantly into the seat back.

Although the aforementioned embodiments describe the seat back S1, which is a front seat in an automobile, as a specific example, the present invention is not limited thereto, and the same configurations can of course be applied in the seat backs of the rear seat as well.

| TABLE OF REFERENCE CHARACTERS | |
|---|---|
| S | vehicle seat |
| S1 | seat back |
| S2 | seat top portion |

TABLE OF REFERENCE CHARACTERS

| | |
|---|---|
| S3 | headrest |
| F | seat frame |
| 1 | seat back frame |
| 2 | seating frame |
| 2a, 3a, 100, 150 | cushion pad (seat back cushion, padding material) |
| 2b, 3b, 110 | skin material |
| 11 | reclining mechanism |
| 11a | rotation shaft |
| 15 | side frame |
| 15a | side plate |
| 15b | front edge |
| 15c | rear edge |
| 15d | protruding portion |
| 15e | cutout portion |
| 15f | long hole |
| 16 | upper frame |
| 16a | side surface portion |
| 17 | lower frame |
| 17a | extension portion |
| 17b | middle portion |
| 18 | pillar support portion |
| 19 | headrest pillar |
| 20 | pressure receiving member (supporting member) |
| 20a | recess portion |
| 21, 22 | wire (coupling member; supporting member) |
| 21a, 21e, 21f, 22a, 22e, 22f | protruding and recessed portions |
| 21b, 22b | center area (supporting member) |
| 22c | hook portion |
| 21d, 22d | end area (coupling member) |
| 23 | linking wire |
| 24 | claw portion |
| 30, 80 | pivoting member (impact reduction member) |
| 30a, 80a | base portion |
| 30b | first upright portion |
| 30c | formation portion |
| 30d | second upright portion |
| 31, 81 | locking portion (linking portion) |
| 32, 82 | shaft portion |
| 32a | shaft member |
| 32b | shaft hole |
| 32c | hole |
| 32d | matching member |
| 33, 34, 83, 84 | locking hole |
| 35, 85 | extension spring (biasing element) |
| 35a | hook |
| 37 | attachment hook |
| 39, 89 | rotation blocking portion |
| 39a, 39b, 89a, 89b | stopper portion |
| 40 | wiring hole |
| 50 | airbag apparatus |
| 55 | electrical component unit |
| 60 | slide member (impact reduction member) |
| 61 | sliding portion |
| 62 | locking portion (linking portion) |
| 63 | contact portion |
| 63a | first contact portion |
| 63b | second contact portion |
| 64 | torsion spring (biasing element) |
| 64a | coil portion |
| 64b | one end |
| 64c | other end |
| 65 | guide pin |
| 65a | shaft portion |
| 65b | end portion |
| 65c | linking spring |
| 65d | pullout stopping member |
| 66 | holding pin |
| 67 | locking pin |
| 68 | guide surface |
| 68a | arc-shaped recess |
| 68b | arc-shaped protrusion |
| 70 | base section |
| 71 | locking protrusion |
| 72 | side surface |
| 80b | extending portion |
| 80d | cutout portion |
| 90 | wire (linking portion) |
| 91 | bent area |
| 95 | long plate member (coupling member) |
| 101, 151 | central portion |
| 102, 152 | side portion |
| 103, 153 | front surface groove |
| 103a, 104a | base portion |
| 104, 154 | rear surface groove |
| 105, 105b, 105c | back fabric |
| 105a | cut |
| 106 | locking ring |
| 109, 159 | connection portion |
| 111 | central skin portion |
| 112 | shoulder skin portion |
| 113 | rear skin portion |
| 114 | insertion area |
| 114a | tip end |
| 115 | hook |
| 118 | seam portion |
| 120, 220 | pressure receiving member |
| 121, 221 | thin portion |
| 122, 123, 222, 223 | recess |
| 225 | hole |

The invention claimed is:

1. A vehicle seat comprising:
a seat back frame including at least side portions located on both sides of the seat back frame and an upper portion disposed in an upper area of the seat back frame;
a headrest disposed in the upper area of the seat back frame;
a supporting member that supports a body of an occupant, and moves independently from the headrest; and
an impact reduction member that is disposed in at least one of the side portions of the seat back frame, is linked to the supporting member, and is movable independently from the headrest under a predetermined impact load,
wherein:
the impact reduction member is rotatably supported to the side portion via an axis;
a rotating movement of the impact reduction member toward a rear of the vehicle moves a lower part of the supporting member more towards the rear a greater distance than an upper part of the supporting member and moves an entirety of the supporting member toward the rear of the vehicle under the predetermined impact load that is greater than a normal seating load; and
the impact reduction member is disposed in an upper part in at least one of the side portions, and is rotatable under the predetermined impact load.

2. The vehicle seat according to claim 1, wherein the supporting member is linked, by a deformable coupling member, to each of the side portions in at least an upper part and a lower part of the supporting member, and the lower part is a location that corresponds to a lower back region of the occupant.

3. The vehicle seat according to claim 1, wherein:
the seat back frame includes a lower portion disposed in a lower area; and
the impact reduction member is disposed within a range enclosed by the seat back frame.

4. The vehicle seat according to claim 1, wherein the impact reduction member is disposed in a range that is below an upper end of the supporting member.

5. The vehicle seat according to claim 1, wherein:
the seat back frame includes a pipe portion that spans across the side portions and the upper portion, and a reclining mechanism having a rotation shaft; and the impact reduction member is disposed between a lower end of the pipe portion and the upper portion.

6. The vehicle seat according to claim 1, wherein a disposal range for an airbag apparatus is formed in the side portions of the seat back frame, and the impact reduction member is disposed between an upper end and a lower end of the disposal range for the airbag apparatus.

7. The vehicle seat according to claim 1, wherein:
the impact reduction member is an upper impact reduction member;
the vehicle seat further comprising:
a lower impact reduction member that is disposed in a lower part in the at least one of the side portions;
the upper and lower impact reduction members being rotatable under the predetermined impact load.

8. The vehicle seat according to claim 7, wherein a linking portion between the lower impact reduction member and the supporting member moves upward under the predetermined impact load.

9. The vehicle seat according to claim 7, wherein a linking portion between the lower impact reduction member and the supporting member moves in a horizontal direction and then moves upward under the predetermined impact load.

10. The vehicle seat according to claim 7, wherein a linking portion between the lower impact reduction member and the supporting member moves downward and then moves upward under the predetermined impact load.

11. The vehicle seat according to claim 7, wherein a linking portion between the lower impact reduction member and the supporting member moves upward under the predetermined impact load after a load received by the supporting member from the occupant has passed a maximum load point.

12. The vehicle seat according to claim 7, wherein a recess portion is formed in the supporting member in an area that opposes the seat back frame, and the lower impact reduction member is disposed in a location that opposes the recess portion of the supporting member.

13. The vehicle seat according to claim 7, wherein the upper impact reduction member disposed in the upper part of the side portion is smaller than the lower impact reduction member disposed in the lower part of the side portion.

* * * * *